United States Patent
Yano et al.

(10) Patent No.: US 9,760,280 B2
(45) Date of Patent: Sep. 12, 2017

(54) TOUCH-PANEL INPUT DEVICE

(71) Applicant: Rohm Co., Ltd., Kyoto (JP)

(72) Inventors: Sigehide Yano, Kyoto (JP); Kazunori Hisa, Kyoto (JP); Takashi Oki, Kyoto (JP); Masahide Tanaka, Osaka (JP)

(73) Assignee: Rohm Co., Ltd., Kyoto (JP)

( * ) Notice: Subject to any disclaimer, the term of this patent is extended or adjusted under 35 U.S.C. 154(b) by 6 days.

(21) Appl. No.: 14/978,082

(22) Filed: Dec. 22, 2015

(65) Prior Publication Data

US 2016/0188200 A1 Jun. 30, 2016

Related U.S. Application Data

(63) Continuation of application No. 13/579,378, filed as application No. PCT/JP2011/053347 on Feb. 17, 2011, now Pat. No. 9,250,800.

(30) Foreign Application Priority Data

| Feb. 18, 2010 | (JP) | 2010-033557 |
| Mar. 18, 2010 | (JP) | 2010-061817 |
| Mar. 19, 2010 | (JP) | 2010-063751 |
| Apr. 2, 2010 | (JP) | 2010-085948 |
| Apr. 20, 2010 | (JP) | 2010-096851 |
| Apr. 26, 2010 | (JP) | 2010-100795 |

(51) Int. Cl.
*G06F 3/0488* (2013.01)
*G06F 3/01* (2006.01)
(Continued)

(52) U.S. Cl.
CPC ......... *G06F 3/04883* (2013.01); *G06F 3/018* (2013.01); *G06F 3/0235* (2013.01); *G06F 3/045* (2013.01); *G06F 3/04845* (2013.01); *G06F 2203/04104* (2013.01); *G06F 2203/04806* (2013.01); *G06F 2203/04808* (2013.01)

(58) Field of Classification Search
None
See application file for complete search history.

(56) References Cited

U.S. PATENT DOCUMENTS

| 6,958,749 B1 | 10/2005 | Matsushita et al. |
| 2003/0052972 A1 | 3/2003 | Tanaka et al. |

(Continued)

FOREIGN PATENT DOCUMENTS

| EP | 1854678 | 11/2007 |
| GB | 2 331 204 | 5/1999 |

(Continued)

OTHER PUBLICATIONS

International Search Report for PCT/JP2011/053347 (May 24, 2011).

*Primary Examiner* — Kenneth B Lee, Jr.
(74) *Attorney, Agent, or Firm* — Fish & Richardson P.C.

(57) ABSTRACT

A touch-panel input device as disclosed in the specification comprises a touch panel and an input controller capable of switching between a right-hand two-point touch input sensing mode suitable for the placement of right fingers and a left-hand two-point touch input sensing mode suitable for the placement of left fingers, wherein the input controller senses two-point touches on the touch panel in either of these input sensing modes.

12 Claims, 36 Drawing Sheets

(51) Int. Cl.
  *G06F 3/023* (2006.01)
  *G06F 3/0484* (2013.01)
  *G06F 3/045* (2006.01)

(56) References Cited

U.S. PATENT DOCUMENTS

| | | |
|---|---|---|
| 2004/0049743 A1 | 3/2004 | Bogward |
| 2005/0046621 A1 | 3/2005 | Kaikuranta |
| 2007/0177804 A1 | 8/2007 | Elias et al. |
| 2009/0102809 A1 | 4/2009 | Mamba et al. |
| 2009/0109191 A1 | 4/2009 | Felder et al. |
| 2009/0128505 A1 | 5/2009 | Partridge et al. |
| 2009/0146963 A1 | 6/2009 | Yeh et al. |
| 2009/0287999 A1 | 11/2009 | Ooi et al. |
| 2010/0013780 A1 | 1/2010 | Ikeda et al. |
| 2010/0020221 A1* | 1/2010 | Tupman ............. G06F 3/04883 348/333.01 |
| 2010/0088641 A1 | 4/2010 | Choi |
| 2010/0259499 A1 | 10/2010 | Kaikuranta et al. |
| 2011/0019058 A1 | 1/2011 | Sakai et al. |
| 2011/0019239 A1 | 1/2011 | Kojima et al. |
| 2011/0117960 A1 | 5/2011 | Miura |
| 2011/0126097 A1 | 5/2011 | Isono |
| 2011/0128248 A1 | 6/2011 | Nakata et al. |
| 2013/0271401 A1 | 10/2013 | Sakai et al. |

FOREIGN PATENT DOCUMENTS

| | | |
|---|---|---|
| JP | 63-115147 | 5/1988 |
| JP | 4-287117 | 10/1992 |
| JP | 5-066888 | 3/1993 |
| JP | 6-38083 | 2/1994 |
| JP | 8-054976 | 2/1996 |
| JP | 8-179868 | 7/1996 |
| JP | 08-184449 | 7/1996 |
| JP | 11-032245 | 2/1999 |
| JP | 11-143604 | 5/1999 |
| JP | H11-212726 | 8/1999 |
| JP | 2000-163031 | 6/2000 |
| JP | 2000-330946 | 11/2000 |
| JP | 2001-060143 | 3/2001 |
| JP | 2001-134382 | 5/2001 |
| JP | 2001-160950 | 6/2001 |
| JP | 2001-290585 | 10/2001 |
| JP | 2003-529161 | 9/2003 |
| JP | 2003-344059 | 12/2003 |
| JP | 2004-333872 | 11/2004 |
| JP | 2004-343476 | 12/2004 |
| JP | 2005-277470 | 10/2005 |
| JP | 2006-064547 | 3/2006 |
| JP | 2006-085370 | 3/2006 |
| JP | 2007-516481 | 6/2007 |
| JP | 2007-279638 | 10/2007 |
| JP | 2007-302154 | 11/2007 |
| JP | 2008-017130 | 1/2008 |
| JP | 2008-027183 | 2/2008 |
| JP | 2009-104268 | 5/2009 |
| JP | 2009-105919 | 5/2009 |
| JP | 2009-129449 | 6/2009 |
| JP | 2009-134444 | 6/2009 |
| JP | 2009-146191 | 7/2009 |
| JP | 2009-146374 | 7/2009 |
| JP | 2009-525538 | 7/2009 |
| JP | 2009-239424 | 10/2009 |
| JP | 2009-276926 | 11/2009 |
| JP | 2009-289157 | 12/2009 |
| JP | 2010-008823 | 1/2010 |
| JP | 2010-026641 | 2/2010 |
| JP | 2010-026710 | 2/2010 |
| JP | 2010-048661 | 3/2010 |
| JP | 2010-062628 | 3/2010 |
| JP | 2011-003074 | 1/2011 |
| JP | 2011-502314 | 1/2011 |
| JP | 2011-028345 | 2/2011 |
| JP | 2011-050038 | 3/2011 |
| JP | 2012-504837 | 2/2012 |
| WO | 2009-145024 | 12/2009 |
| WO | 2010-008088 | 1/2010 |

* cited by examiner

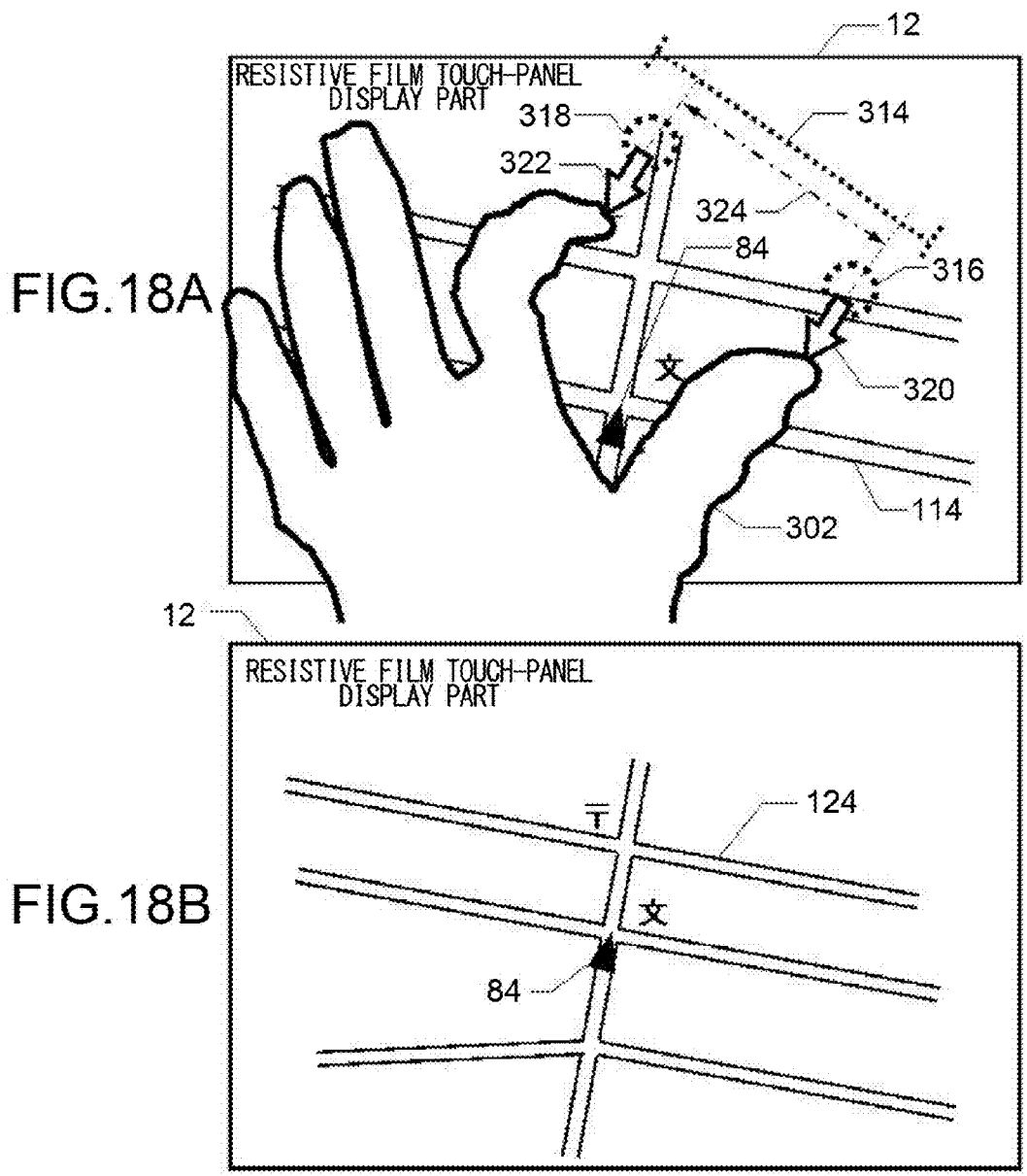

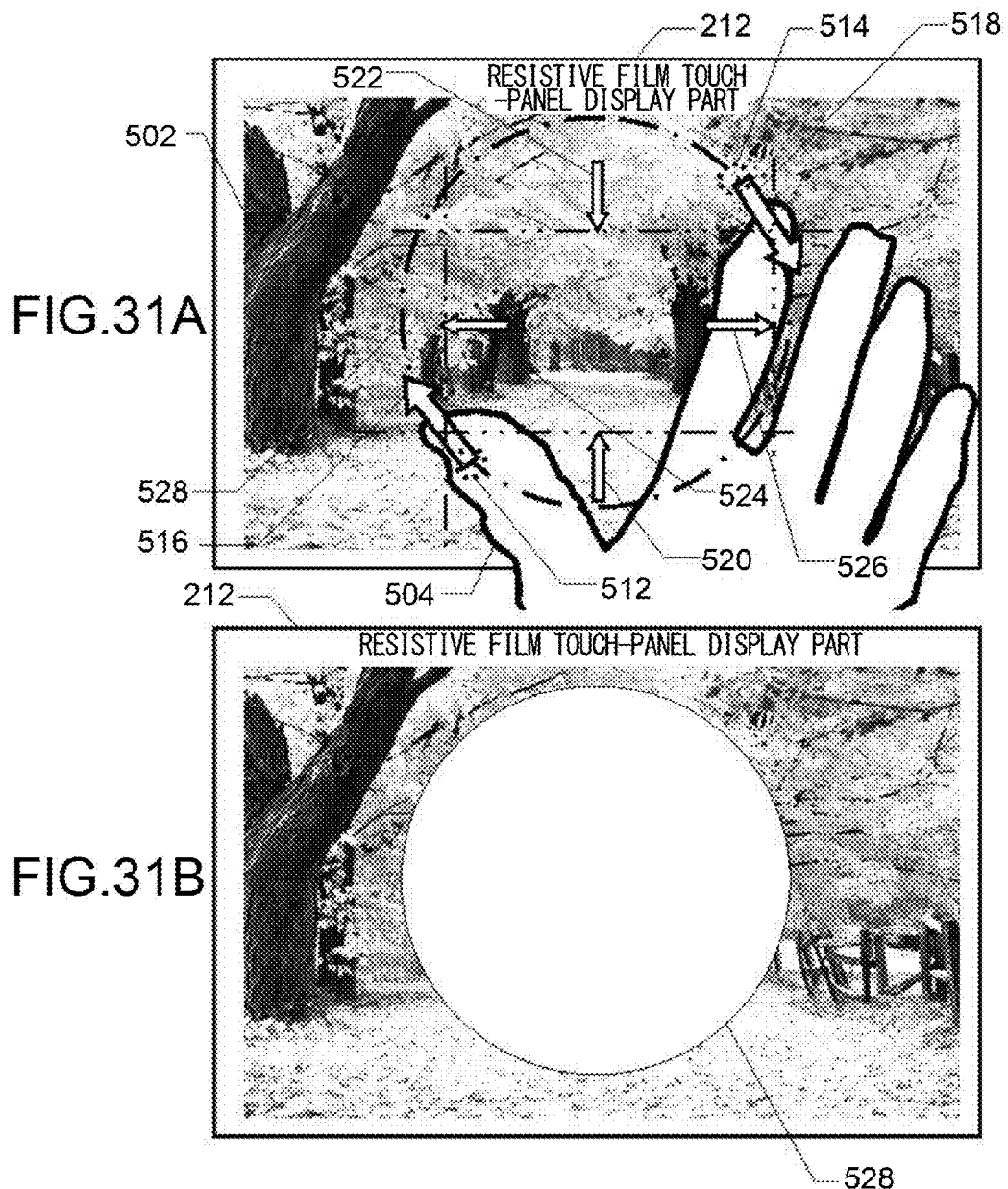

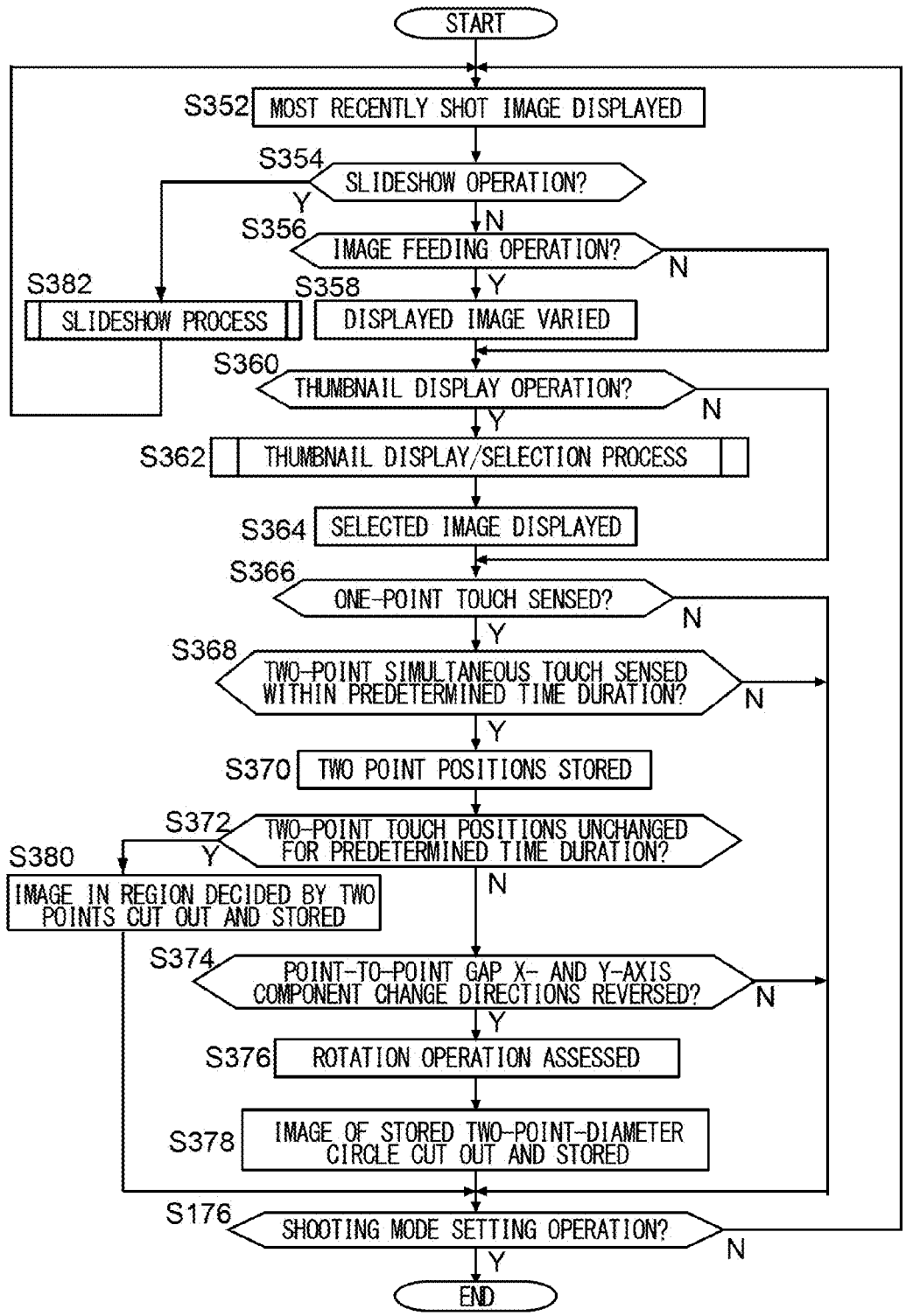

TOUCH-PANEL INPUT DEVICE

TECHNICAL FIELD

The present invention relates to a touch-panel input device.

BACKGROUND ART

Various proposals have been made regarding the operations of digital cameras; for example, a digital camera having a touch panel is proposed in Patent Literature 1.

Various proposals have also been made regarding touch-panel input devices; for example, an analog resistive film touch panel capable of detecting two-point touches is proposed in Patent Literatures 2 and 3.

Proposed in Patent Citation 4 is a digital camera comprising a display device capable of acting as a dial button of a touch panel, wherein a camera lens is capable of rotating, whereby usually the camera lens faces in the direction of arrow D and the display device faces the observing user.

LIST OF CITATIONS

Patent Literature

Patent Literature 1: Japanese Laid-open Patent Application No. 2009-105919
Patent Literature 2: Japanese Laid-open Patent Application No. 2009-146191
Patent Literature 3: Japanese Laid-open Patent Application No. 2010-26641
Patent Literature 4: Japanese Laid-open Patent Application No. 11-32245

SUMMARY OF INVENTION

Technical Problem

However, there are various problems that must be examined in detail in the operations of digital cameras and the practical application of touch panels, and examinations in the practical aspects of touch panels capable of multi-point sensing in particular are as of yet insufficient.

In view of the matters described above, an object of the present invention is to provide a practical touch-panel input device in which a touch panel capable multi-point sensing is put into practical application.

Solution to Problem

To achieve the objective described above, the touch-panel input device according to the present invention has a touch panel, and an input controller for sensing a two-point touch on the touch panel in either a two-point touch input sensing mode for a right hand suitable for the placement of right fingers or a two-point touch input sensing mode for a left hand suitable for the placement of left fingers, the input controller being capable of switching between the two input sensing modes.

Advantageous Effects of the Invention

According to the present invention, it is possible to provide a practical touch-panel input device in which a touch panel capable multi-point sensing is put into practical application.

BRIEF DESCRIPTION OF DRAWINGS

FIG. 18(A) and FIG. 18(B) A screen view of when a map shrinking is performed regardless of where the absolute positions of the two points are, from the state of FIG. 5(A), in Example 3.

FIG. 31(A) and FIG. 31(B) A screen view showing another playback image displayed on the resistive film touch-panel display part of either Example 2 of FIG. 14 or Example 4 of FIG. 20.

FIG. 32 A flowchart showing the details of step S174 of FIG. 16 or FIG. 24 along with step S176.

DESCRIPTION OF EMBODIMENTS

EXAMPLE 1

Figure 1:
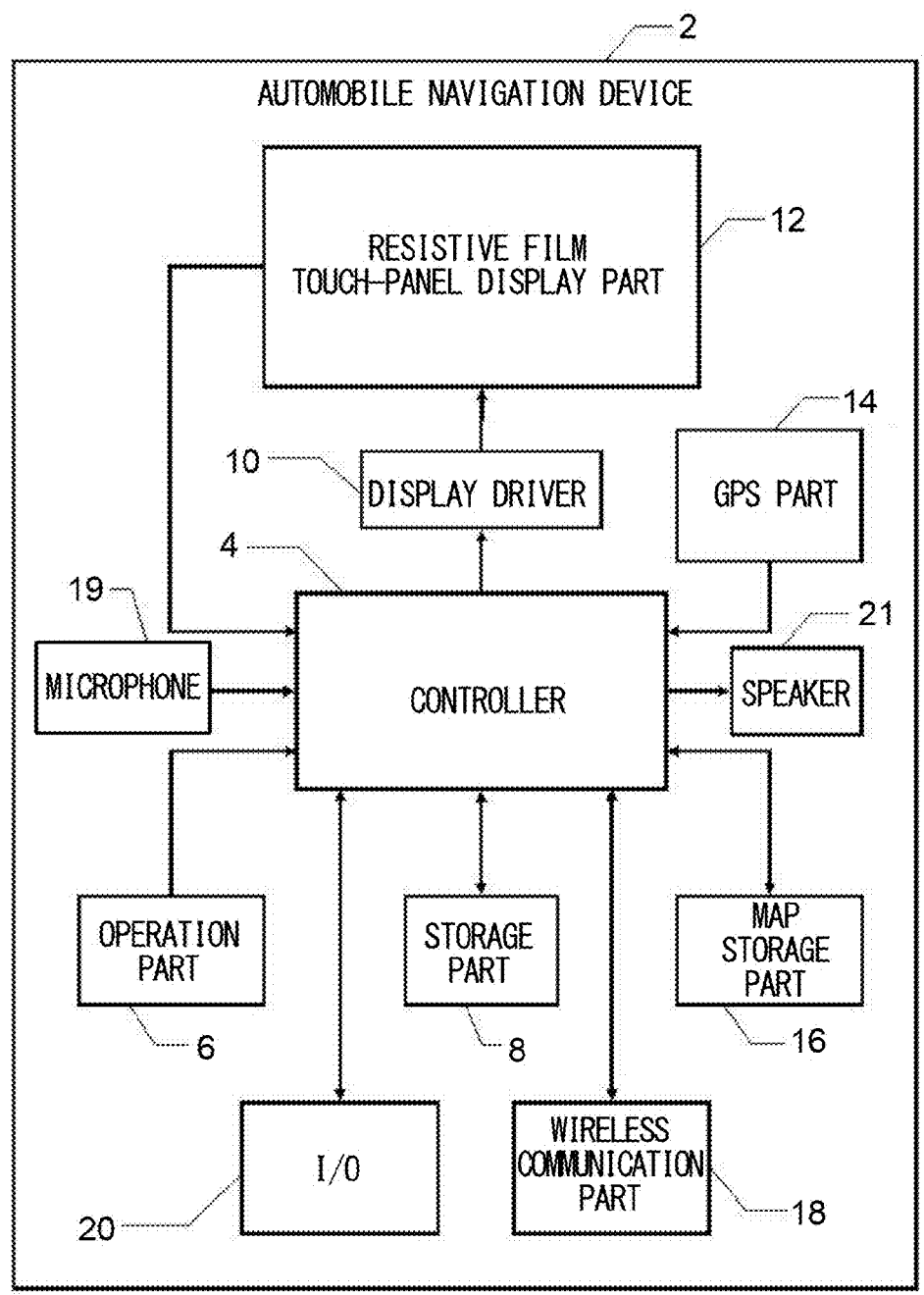
FIG. 1 A block diagram showing Example 1 of the touch-panel input device according to an embodiment of the present invention.

FIG. 1 is a block diagram showing Example 1 of the touch-panel input device according to an embodiment of the present invention. Example 1 constitutes a navigation device (hereinbelow an automobile navigation device) 2 of a vehicle, having a controller 4 composed of a computer for controlling the entire device, the automobile navigation device 2 being controlled according to the operation of an operation part 6 by a driver. The function of the controller 4 is executed by software stored in a storage part 8. The storage part 8 temporarily stores various data needed in the control of the automobile navigation device 2. The controller 4 controls the display of a resistive film touch-panel display part 12 via a display driver 10, and performs both a GUI display needed in the operation of the operation part 6 and a display of the control results.

The resistive film touch-panel display part 12 is both a display part and a touch-panel input device, as well as being a GUI operation part for performing input operations by direct touching of the display. The resistive film touch-panel display part 12 is connected to the controller 4 by four output lines (in FIG. 1, a single line showing the information transmission direction is depicted for the sake of simplicity) for outputting top, bottom, left, and right touch position information, and the controller 4 can sense two-point touch positions and their movements by analyzing the outputs of these four lines. The details of the input according to this two-point touch position sensing are described hereinafter.

Based on a GPS system and through satellites and neighborhood broadcasting stations, a GPS part 14 obtains information of latitude, longitude, and altitude, which is absolute position information of the vehicle in which the automobile navigation device 2 is installed, and sends this information to the controller 4. The controller 4 processes the absolute position information from the GPS part 14 and causes the position of the vehicle on a map provided by a map storage part 16 to be displayed on the resistive film touch-panel display part 12.

The automobile navigation device 2 comprises a wireless communication part 18 and a cable-connected I/O part 20, which are for wireless external communication for functions such as updating map information stored in the map storage part 16. The wireless communication part 18 may use normal telephone lines, or it may be a designated close-range wireless communication part. Other than procuring map information, the wireless communication part 18 and the I/O part 20 can also communicate with an external source and procure this information when there is a function version upgrade or maintenance data for the car navigation system or the GPS system. In addition to being performed by operations from the operation part 6 or the resistive film touch-panel display part 12, operation information input to the controller 4 can also be performed by voice from a microphone 19. In addition to being displayed on the resistive film touch-panel display part 12, information output to the driver or another user can be performed by voice through a speaker 21.

FIGS. 2 through 9 are display screen views for describing the display in the resistive film touch-panel display part (hereinbelow shortened to "display part") 12 of FIG. 1 and the various functions associated with two-point touch sensing. In the automobile navigation device 2, it is normal for the display part 12 to be placed in the central vicinity of the vehicle, but an example of a case of an automobile with the steering wheel on the right side is used to describe the manner in which the driver or a passenger seat occupant utilizes the touch panel in the display part 12 to perform various GUI operations.

Figure 2A:
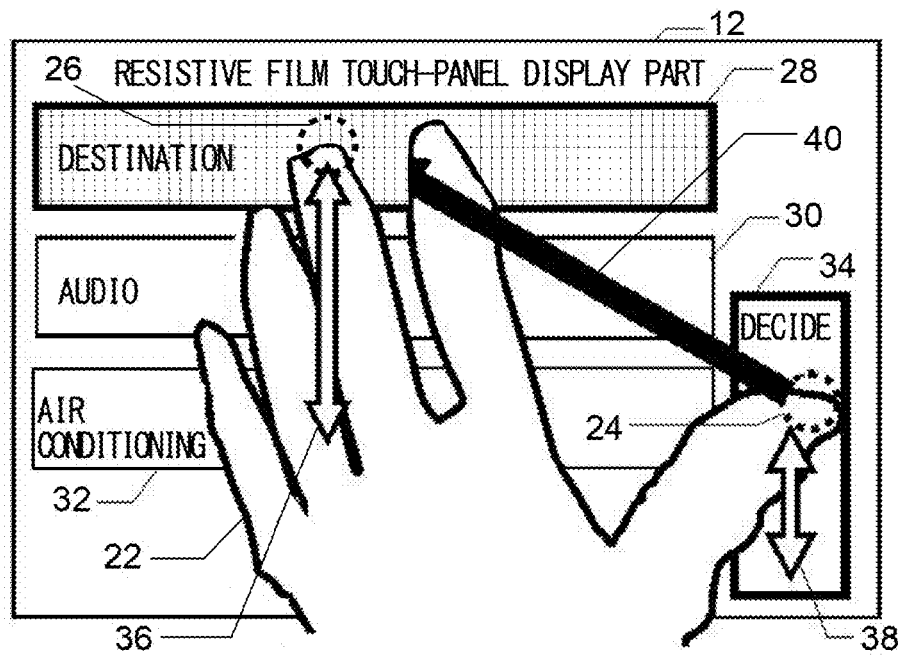
FIG. 2(A) and FIG. 2(B) A display screen view of a case of a menu selection operation being performed with the left hand from the driver seat of an automobile with the steering wheel on the right side in the resistive film touch-panel display part of FIG. 1.

First, FIG. 2 shows a case of performing a GUI operation of touching a menu displayed on the display part 12 to make a menu selection. FIG. 2 is a case in which the driver is performing the operation, and in this case, the hand performing the operation is a left hand 22. Using the thumb and any other desired finger (the middle finger, for example) in two-point touching has the most degree of freedom in the various operations, but when the driver sitting in the driver seat has naturally placed the left hand 22 on the display part 12, the tip of the thumb is in a lower position than the tip of the other finger as shown in FIG. 2(A). Consequently, a line joining the touch position 24 of the thumb and the touch position 26 of any other desired finger (the middle finger, for example, and the description hereinbelow uses the middle finger as an example) will normally be slanted downward and to the right (when the touch position 24 is seen from the touch position 26 on the display part 12).

When the controller 4 senses based on information from the display part 12 that two points at a right downward slant are simultaneously being touched, the controller 4 issues a command to the display driver 10 to display a left hand menu layout such as the one in FIG. 2 on the display part 12. To be more specific, in the left hand menu layout, a destination menu 28, an audio menu 30, and an air conditioning menu 32, which are expected to be touched by fingers of the left hand 22 other than the thumb, are placed in the upper left of the display part 12, and a decide area 34 expected to be touched by the thumb is placed in the lower right of the display part 12. In the stage in which the controller 4 issues a command for a left hand menu display, the absolute positions of the touch position 24 of the thumb and the touch position 26 of the middle finger may be anywhere, and the determined information is merely that the line joining the two points of the simultaneous touching is relatively slanted downward and to the right.

Next, the menu selection in such a left hand menu layout will be described. When it is assessed that the middle finger has touched one of the menus (e.g., the destination menu 28) and the thumb has simultaneously touched the decide area 34, for example, the absolute positions of the touch position 24 of the thumb and the touch position 26 of the middle finger are detected, and in response, the destination menu 28 and the decide area 34 where touches are sensed are displayed in bold frames as in FIG. 2(A). In this state, another menu can be selected by displacing the touch position of the middle finger while keeping the thumb touched to the decide area 34, and in response, the bold frame display moves from the destination menu 28 to the audio menu 30 or the air conditioning menu 32. Such a movement of the menu selection is made possible by the left hand 22 moving up and down in parallel, as shown by the white arrow 36. The decide area 34 is set to be long so that this touching state is maintained even if the thumb moves up and down in parallel as shown by the white arrow 38 due to such a parallel movement of the left hand 22.

The variation of menu selection is not limited to a case of the left hand 22 moving up and down in parallel as described above, and any desired two-point touches can also be performed according to the natural movement of the left hand 22. Examples of other movements of the hand are explained hereinafter. It is also not always necessary to move the hand while preserving the two-point touching state as described above, and one finger may be completely removed from the display part 12, after which the screen may be touched with the middle finger and thumb in order to make a new selection. The two-point touches also need not be completely simultaneous, and the decide area 34 may be touched with the thumb after first touching any of the menus with the middle finger. Conversely, after first touching the decide area 34 with the thumb, this may be used as a fulcrum to touch any of the menus with the middle finger. In a menu selection screen after the left hand menu layout has been displayed as in FIG. 2, as long as two-point simultaneous touch state of the decide area 34 and any of the menus 28, 30, 32 is not detected, none of the menus 28, 30, 32 or the decide area 34 will change to a bold frame display in reaction.

Figure 2B:
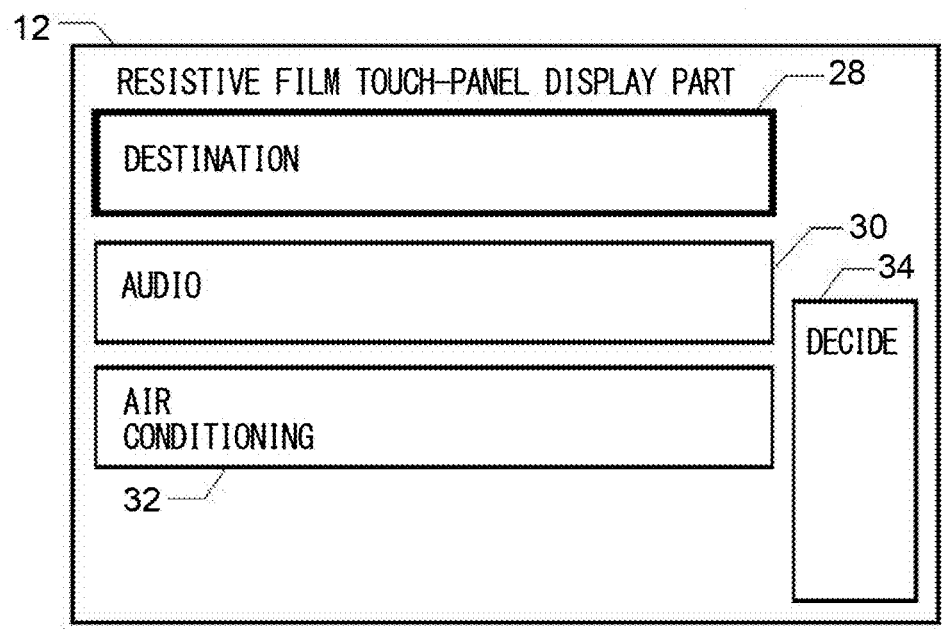

To confirm the menu selection, the thumb is slid toward the middle finger as shown by the black arrow 40 while keeping the middle finger and the thumb touched to the screen, in a state in which the destination menu 28 and the decide area 34 are in a bold frame display as in FIG. 2(A), for example. The decide area 34 is dragged toward the destination menu 28 by this thumb movement, and the selection of the destination menu 28 is confirmed when the two menus are dragged into overlapping each other, for example. When the left hand 22 is removed from the display part 12, the display color changes in the destination menu 28 in which the selection has been confirmed as shown in FIG. 2(B), and a confirmation of the menu selection is displayed.

Figure 3A:
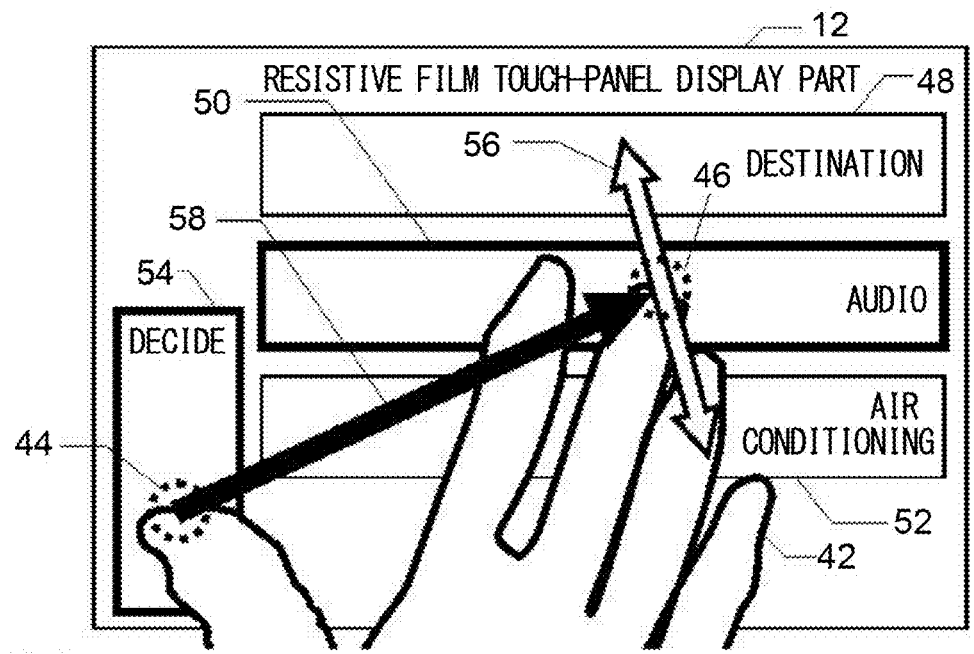
FIG. 3(A) and FIG. 3(B) A display screen view of a case of a menu selection operation being performed with the right hand from the passenger seat of an automobile with the steering wheel on the right side in the resistive film touch-panel display part of FIG. 1.

FIG. 3 is a display screen view of a case of the display part 12 being operated from the passenger seat of an automobile with the steering wheel on the right side, in which case the operating hand is the right hand 42. When the occupant sitting in the passenger seat naturally places the right hand 42 on the display part 12, the tip of the thumb of the right hand 42 is positioned lower than the tip of the other finger as shown in FIG. 3(A). Consequently, a line joining the touch position 44 of the thumb and the touch position 46 of the middle finger will normally be slanted downward and to the left (when the touch position 44 is seen from the touch position 46 on the display part 12).

In this case, when the controller 4 senses based on information from the display part 12 that two points at a left downward slant are simultaneously being touched, the controller 4 issues a command to the display driver 10 to display a right hand menu layout such as the one in FIG. 3 on the display part 12. To be more specific, in the right hand menu layout, a destination menu 48, an audio menu 50, and an air conditioning menu 52 are placed in the upper right of the display part 12, and a decide area 54 expected to be touched by the thumb is placed in the lower left of the display part 12. The layout of when the right hand 42 is used to operate the display part 12 from the left in FIG. 3 is bilaterally symmetrical with the case of the left hand 22 being used to operate the display part 12 from the right as in FIG. 2. The operation is therefore the same in terms of sensation, and there is no confusion. As with the case of a left hand layout decision, in the stage in which the controller 4 issues a command for a right hand menu display, the determined information is merely that the line joining the two points of the simultaneous touching is relatively slanted downward and to the left.

Next, the menu selection in the right hand layout of FIG. 3 will be described. This layout is essentially the same as the left hand layout of FIG. 2, and a simple description is therefore given with focus on the different parts. For example, when it is assessed that the middle finger is touched to one of the menus (e.g., the audio menu 50) and the thumb is simultaneously touched to the decide area 54, the absolute positions of the touch position 44 of the thumb and the touch position 46 of the middle finger are detected in the same manner as FIG. 2, and in response, the audio menu 50 and the decide area 54 where touches are sensed are displayed in bold frame as in FIG. 3(A). Hereinbelow, FIG. 3 is used to show an example of two-point touches by a hand movement different from that of FIG. 2, but needless to say, two-point touches by natural hand movements are possible that are not limited to FIG. 2 or 3.

In FIG. 3, the touch position 46 of the middle finger can be displaced by using the touch of the thumb to the decide area 54 as a fulcrum around which to rotate the right hand 42 as shown by the white arrow 56, and another menu can be selected. The thumb need not be kept in place, and may be moved naturally within the decide area 54. In response to such a movement of the touch position 46 of the middle finger, the bold frame display moves from the audio menu 50 to the destination menu 48 or the air conditioning menu 52.

Such a variation of menu selection need not be performed while the two-point touching state is preserved as described above, and one finger may be completely removed from the display part 12, after which the screen may be touched with the middle finger and thumb in order to make a new selection, similar to the case of FIG. 2(A). Also similar to the case of FIG. 2(A), the two-point touching need not be completely simultaneous. This is because even in a right hand layout as in FIG. 3, in a menu selection screen after this layout has been displayed, as long as a two-point simultaneous touch state is not detected in any of the menus 48, 50, 52 and the decide area 54, the menus 48, 50, 52 and the decide area 54 do not change to a bold frame display in reaction.

Figure 3B:
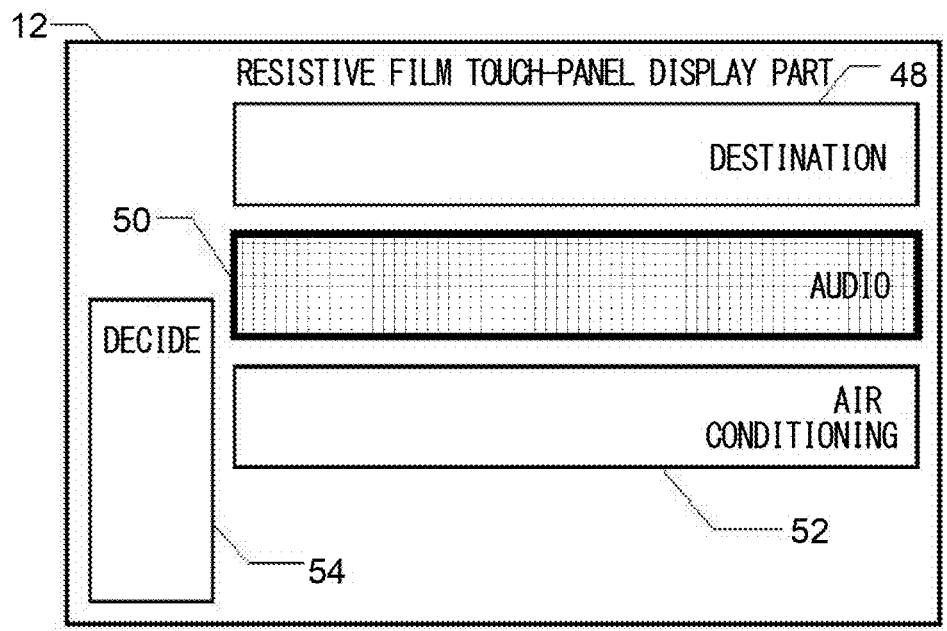

The confirmation of the menu selection is similar to FIG. 2(A), and in a state in which the audio menu 50 and the decide area 54 have a bold frame display as in FIG. 3(A), for example, the thumb is slid toward the middle finger as shown by the black arrow 58 while the middle finger and thumb are kept touched to the screen, and when the decide area 54 is dragged toward the audio menu 50, a selection of the audio menu 50 is confirmed at the time point when the two overlap. When the right hand 42 is removed from the display part 12, the display color of the audio menu 50 in which the selection is confirmed changes as shown in FIG. 3(B), and a confirmation of the menu selection is displayed.

Even when a right downward slanted two-point touching state is sensed, in cases in which the vehicle is traveling, the controller 4 does not display the left hand layout of FIG. 2, but instead informs the driver that "menu-varying operation by driver is prohibited during travel" through a display on the display part 12 or an announcement on the speaker 21. The purpose of this is to prevent accidents caused by the driver operating while traveling. When the controller 4 has sensed a left downward slanted two-point touching state, the right hand layout of FIG. 3 is displayed both when the vehicle has stopped and when the vehicle is traveling, and when the vehicle is traveling, and varying the menu therefore falls to the occupant in the passenger seat when the vehicle is traveling. When the right hand layout is displayed, it is not impossible for the drive to make left downward slanted two-point touches with the right hand (or with an unnatural orientation of the left hand), but the driver is thoroughly informed in advance in the user's manual so as to not engage in such dangerous behavior.

Figure 4A:
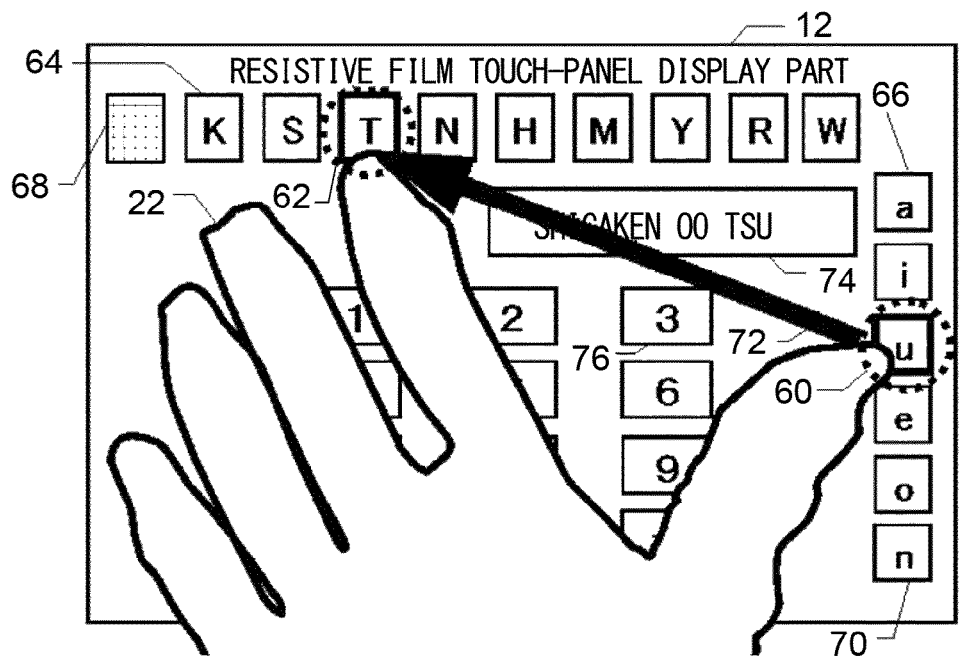
FIG. 4(A) and FIG. 4(B) A display screen view of a case of a destination input operation being performed in the resistive film touch-panel display part of FIG. 1.

FIG. 4 shows a display screen view for inputting destination, displayed automatically by the destination menu selection being decided in the same manner as in FIG. 2(B). FIG. 4(A) is a left hand layout, and, similar to FIG. 2(A), is displayed by the sensing of a relative right downward slant in the line joining the two touched points. In FIG. 4, the relative positions of two points are sensed, which are the touch position 60 of the thumb and the touch position 62 of a finger other than the thumb (the index finger is used as an example in FIG. 4).

In the left hand layout of a display screen for inputting destination shown in FIG. 4(A), a consonant button group 64 expected to be touched by fingers other than the thumb of the left hand 22 and containing the letters "K," "S," "T," "N," "H," "M," "Y," "R," and "W" (for the sake of simplicity, the numeral is appended only to "K" as a representation) is placed in the top end vicinity of the screen of the display part 12, and these letters respectively mean each of the Japanese syllabary columns "a ka sa ta na ha ma ya ra wa," except for "a." A vowel button group 66 expected to be touched by the thumb and containing the letters "a," "i," "u," "e," and "o" (for the sake of simplicity, the numeral is appended only to "a" as a representation) is placed in the right end vicinity of the screen of the display part 12, and these letters respectively mean each of the Japanese syllabary rows "a i u e o".

Next, kana character inputs in a left hand layout such as the above will be described. When it is assessed that the index finger is touching one of the consonant button group 64 (e.g., "T") and the thumb is simultaneously touching one of the vowel button group 66 (e.g., "u"), for example, the absolute positions of the touch position 60 of the thumb and the touch position 62 of the index finger are detected, and in response, the consonant button "T" and the vowel button "u" where touches are sensed as displayed in bold frame as in FIG. 4(A). This combination means what is written as "Tu" in roman letters, which is the kana "tsu". Thus, it is possible to indicate any desired combinations of consonants and vowels by a two-point touch of any consonant button with a finger other than the thumb and a vowel button with the thumb. Kana under the column "a" of the syllabary can be indicated by a touch of the blank button 68 with a finger other than the thumb and a two-point touch of a vowel button with the thumb. Furthermore, the kana "n" can be indicated by a touch of the blank button 68 with a finger other than the thumb and a two-point touch of an "n" button 70 with the thumb.

Voiced consonants, p-sounds, syllabic nasals, glottal stops, contracted sounds, and other inputs are not possible with the inputs described above, but since a destination input is not a new input but is information for retrieving place names and the like originally registered on the map, such input portions are automatically revised to voiced consonants, p-sounds, syllabic nasals, glottal stops, and contracted sounds by being estimated by software from the sequence of inputted character strings due to the strings increasing. When the number of vowel buttons is increased to include "G," "P," "Ky," and the like in the display part 12, it is also possible to input voiced consonants, p-sounds, syllabic nasals, glottal stops, and contracted sounds directly.

With kana inputs as well, two-point touches need not be completely simultaneous, and the index finger may first touch any button of the consonant button group 64 or the blank button 68 after which the thumb may touch any button of the vowel button group 66 or the "n" button 70, or these two actions may be reversed. To confirm the input of a kana indicated by a two-point combination, with the "T" button of the consonant button group 64 and the "u" button of the vowel button group 66 being displayed in bold frame as in FIG. 4(A), for example, the thumb is slid toward the index finger as shown by the black arrow 72 while the index finger and the thumb are kept touched to the screen. Due to this thumb movement, the "u" button of the vowel button group 66 and the decide area 34 of the consonant button group 64 are dragged toward the destination menu 28, and when the two buttons are near enough to each other by at least a predetermined amount, for example, the input of a kana according to this consonant and vowel combination is confirmed. This new input-confirmed kana is displayed in large font after already confirmed characters in an input window 74, as shown by the "tsu." By dragging and affixing the vowel button to the consonant button as described above, the operation of confirming the kana has a sensation equivalent to writing kana in roman letters and does not feel strange. This is fitting for inputting roman letters in Japanese, but is also fitting for inputting Hangul characters, which have a similar character structure of consonant and vowel combinations. In the case of Hangul characters, the appending of a patchim is inputted by subsequently indicating a combination of consonant button and a patchim button placed in the row of the vowel button group as is the "n" button 70 or 80 in FIG. 4, after the essential configuration of the character has been inputted.

On the display screen for inputting destination of FIG. 4, numeric keypad buttons 76 for inputting numerals are also displayed in the central vicinity of the screen of the display part 12. The placement of such numeric keypad buttons 76 is made possible by placing the consonant button group 64 in the screen's top end vicinity of the display part 12, placing the vowel button group 66 in the screen's right end vicinity of the display part 12, and ensuring an empty space in the center of the screen. Numeral input by the numeric keypad buttons 76 is normally performed by a one-point touch of touching any of the numeric keypad buttons 76. In this case, to avoid mistakes with the first point touch of two-point touches of any desired position in deciding the left hand layout, a one-point touch of the numeric keypad buttons 76 is sensed, after which, upon elapse of a predetermined time duration (e.g., one second), it is ascertained that there is no subsequent second point touch and a numerical input is confirmed. Conversely, in the case of a two-point touch, although there is no need for the touches to be simultaneous, the user is requested to make the second point touch following within predetermined time duration after the first point touch. Thus, the distinction between a one-point touch and a two-point touch is made by setting the predetermined time duration.

Figure 4B:
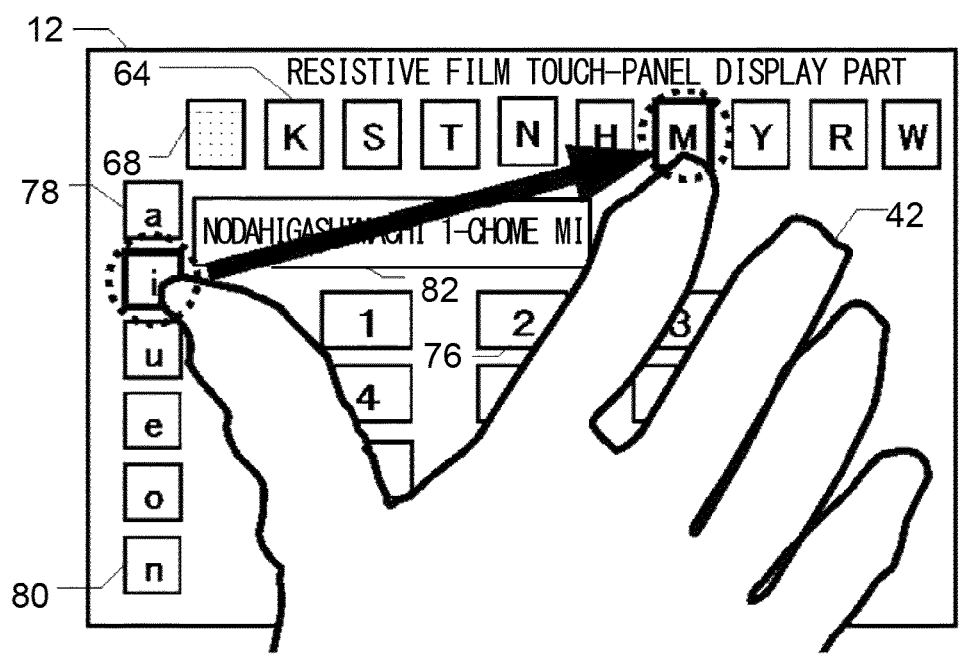

FIG. 4(B) is a left hand layout for inputting destination, and is displayed by the sensing of a relatively left downward slant in the line joining the two touched points together, similar to FIG. 3(A). In the right hand layout shown in FIG. 4(B), the consonant button group 64 and the blank button 68, which are expected to be touched by a finger of the right hand 42 other than the thumb, are placed in the screen's top end vicinity of the display part 12, similar to FIG. 4(A). For the sake of convenience in the operation at this time, the positions of these buttons are shifted slightly to the right and laid out. However, the consonant placement order itself is the same as in FIG. 4(A) in order to avoid confusion. When there is any leeway in the layout, the layout of the consonant button group 64 and the blank button 68 may be entirely common between the left hand layout of FIG. 4(A) and the right hand layout of FIG. 4(B).

In the right hand layout in FIG. 4(B), a vowel button group 78 and an "n" button 80 expected to be touched by the thumb of the right hand 42 are placed in the screen's left end vicinity of the display part 12, unlike the left hand layout of FIG. 4(A). The longitudinal button arrangement itself, however, is the same as in FIG. 4(A) in order to avoid confusion. With a right hand layout, such a layout makes it possible to input kana with a natural orientation of the right hand, similar to FIG. 3(A). A description is not given of the indication of kana by a combination of a consonant button and a vowel button and the confirmation of kana input by dragging the vowel button in the right hand layout of FIG. 4(B), because these are similar to the case of the left hand layout of FIG. 4(A). An input window 82 is shifted toward the left of the screen in FIG. 4(B) so as to not be under the shadow of the hand. The placement of numeric keypad buttons 76 in the right hand layout of FIG. 4(B) is common with that of the left hand layout of FIG. 4(A).

As a result of inputting a destination according to FIG. 4, when the desired destination is displayed on the input window 74 or 82, a map including the position of the automobile is displayed on the display part 12 when the input window 74 or 82 is touched, and navigation is initiated. Similar to FIG. 2, when a right downward slanted two-point simultaneous touch state is sensed but the vehicle is traveling, the controller 4 does not display the left hand layout of FIG. 4(A) but instead informs the driver that "menu-varying operation by driver is prohibited during travel" through a display on the display part 12 or an announcement on the speaker 21.

Figure 5A:
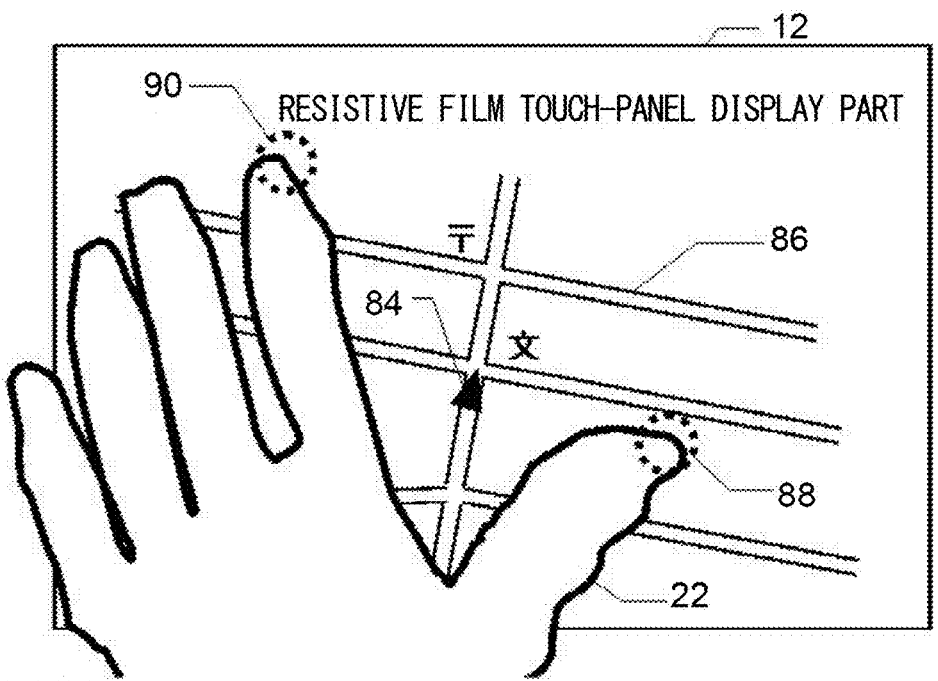
FIG. 5(A) and FIG. 5(B) A screen view for describing the difference between a left-hand operation and a right-hand operation in a case in which the map enlarging or shrinking operation is performed during travel in the resistive film touch-panel display part of FIG. 1.
Figure 5B:
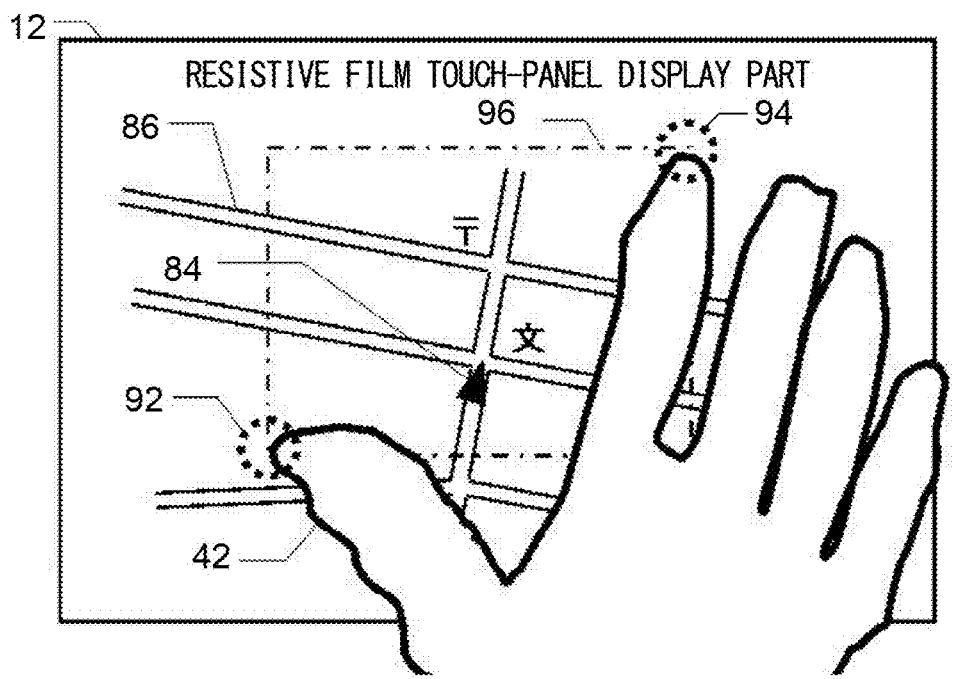

FIGS. 5(A) and 5(B) to FIGS. 9(A) and 9(B) are screen views for describing an enlarging/shrinking operation of the map in a state in which a map 86 including the automobile's position 84 is displayed on the display part 12 and navigation is being performed. First, FIG. 5 is a screen view for describing the difference between a left-hand operation and a right-hand operation while traveling. In the case of an automobile with the steering wheel on the right side as described above, the left-hand operation is performed by the driver and the right-hand operation is performed by the occupant of the passenger seat. Due to this difference, the right-hand operation and the left-hand operation are configured differently in the present invention, danger is prevented so as to not impose a load on the driver, and an operation that better reflects the intention can be performed by the occupant of the passenger seat.

In FIG. 5(A), it is sensed that there is a relative right downward slant in the line joining the two points of the touch position 88 of the thumb and the touch position 90 of the index finger, and as a result, it is discerned that a left-hand operation is being used. In this case, regardless of where the absolute positions of the two points are, the following process is performed using their relative positions as information, and the process is performed based only on natural touches of the left hand 22 without requesting accurate touch positions from the driver. In FIG. 5(B), it is sensed that there is a relative left downward slant in the line joining the two points of the touch position 92 of the thumb and the touch position 94 of the index finger, and as a result, it is discerned that a right-hand operation is being used. In this case, the absolute positions of the two points of the touch position 92 of the thumb and the touch position 94 of the index finger are sensed, a rectangular region 96 whose diagonal is the line connecting these two points is discerned to perform the following process, and the amount of information is therefore greater. In the case of a right-hand operation by the occupant for this discernment, an accurate two-point touch is anticipated.

Figure 6A:
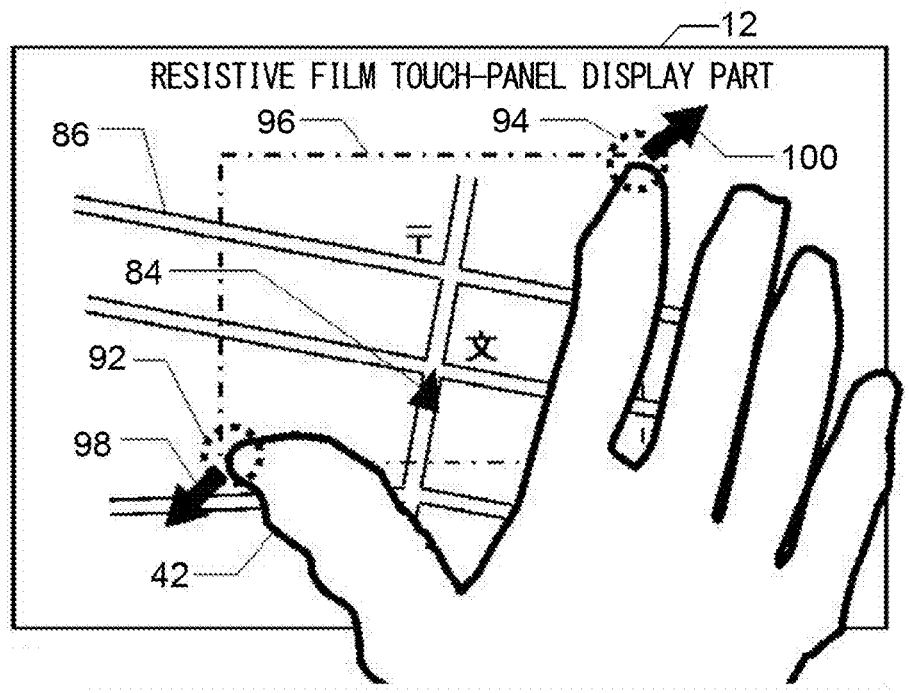
FIG. 6(A) and FIG. 6(B) A screen view showing the operation of enlarging the rectangular region decided by the absolute positions of the two points to fill most of the resistive film touch-panel display part from the state of FIG. 5(B).
Figure 6B:
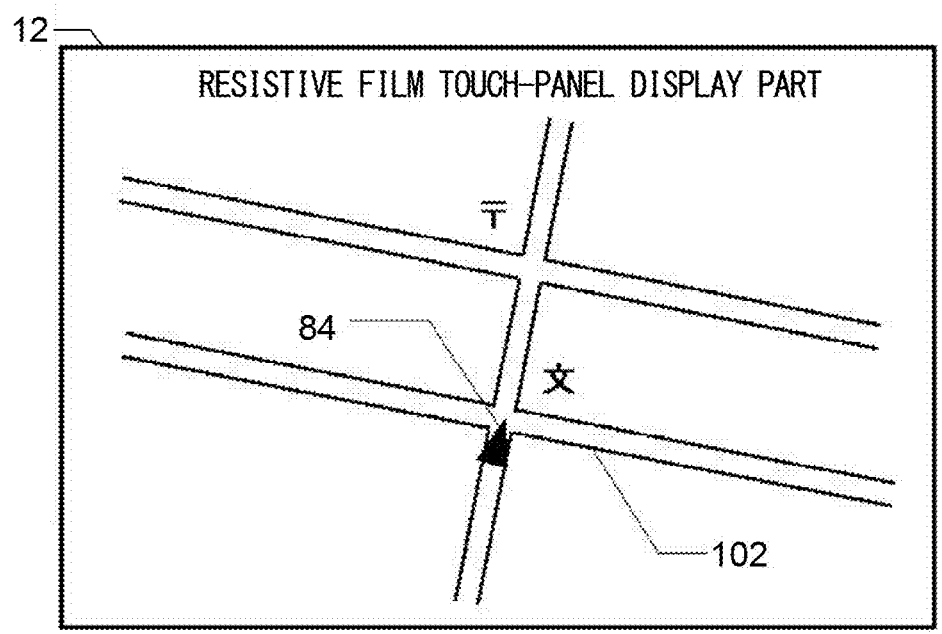

FIG. 6(A) and FIG. 6(B) is a screen view showing an operation for enlarging the rectangular region 96 to cover most of the display part 12 in a case in which this region is discerned in the map 86 as in FIG. 5(B). To enlarge the rectangular region 96, the thumb and the index finger are slid respectively away from each other from their respective touch positions 92 and 94 as shown by the black arrows 98 and 100, as shown in FIG. 6(A), after which the right hand 42 is removed from the display part 12. The controller 4 discerns this movement as an enlarging operation and enlarges the map portion in the rectangular region 96 of FIG. 6(A) to cover most of the display part 12 as in the map 102 of FIG. 6(B). Thus, in the right-hand operation during travel, the desired portion of the displayed map can be cut out and enlarged to fill most of the display part 12.

Figure 7A:
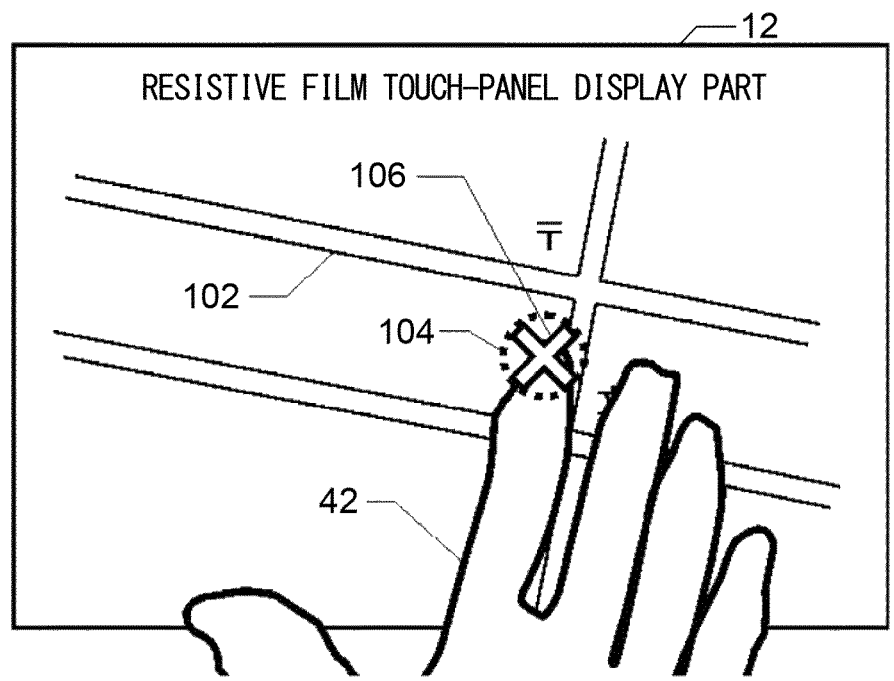
FIG. 7(A) and FIG. 7(B) A screen view showing the operation of shrinking the map to a broad area centered on a desired point with a predetermined shrinkage ratio, in a case in which there is a record of the map being enlarged after going through the route of FIG. 6(A) and FIG. 6(B).
Figure 7B:
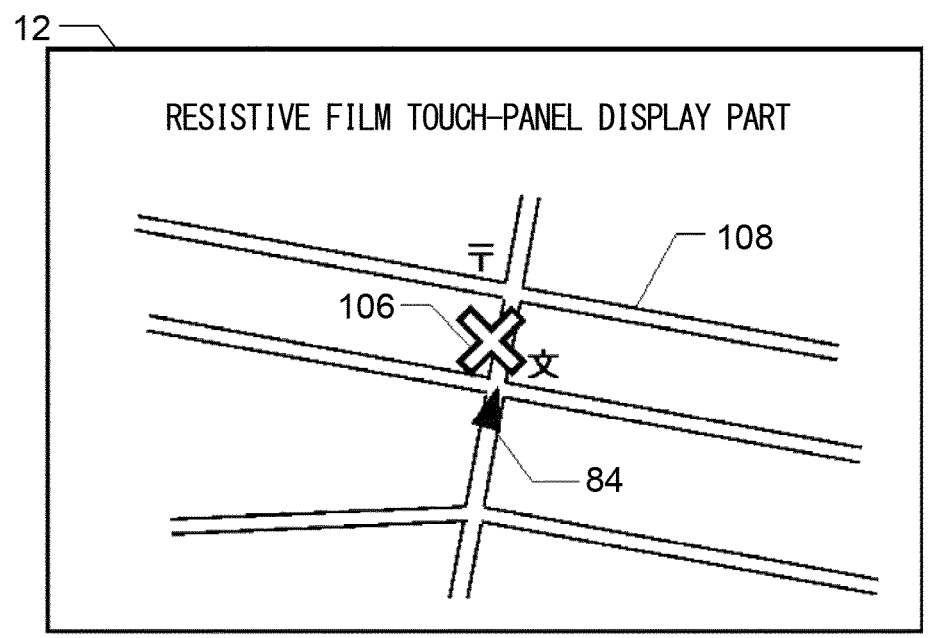

FIG. 7(A) and FIG. 7(B) is a screen view showing an operation for shrinking the map 102 to a broad area centered on a desired point with a predetermined shrinkage ratio, in a case in which there is a record of the map being enlarged after going through the route of FIG. 6(A) and FIG. 6(B). In other words, the case of a record of the operation theretofore being performed by the right hand 42 corresponds to this shrinking operation. In FIG. 7(A), a center position 106 of the map after shrinking is decided by sensing a touch point 104 of the index finger of the right hand 42. Since this case is one of a one-point touch, upon elapse of a predetermined time duration (e.g., one second) for distinguishing that the touch is the first point touch of a two-point touch, it is discerned that the touch is a one-point touch after which there will be no second point touch. When the right hand 42 is then removed from the display part 12 after the center position 106 has been decided, a shrunk map 108 is displayed so that the center position 106 comes to the center of the map as shown in FIG. 7(B). The shrinkage ratio at this time is such that the map shrinks at a predetermined rate each time a one-point touch is performed; therefore, when the desire is to further shrink the map, a one-point touch is repeated by the index finger. It is optional to vary the center point of enlarging during these operations.

FIGS. 6 and 7 were described as right-hand operations of cases in which left downward slanted two-point touches were sensed, but in cases in which the vehicle has stopped, as well as cases in which right downward slanted two-point touches are sensed, a rectangular region such as that of FIG. 5(B) is set. This is because an accurate operation may be requested of the driver without any danger in cases in which the vehicle is not being driven, and by stopping the vehicle, the driver can enlarge the desired area region in the map and can shrink the map centered on a desired single point.

Figure 8A:
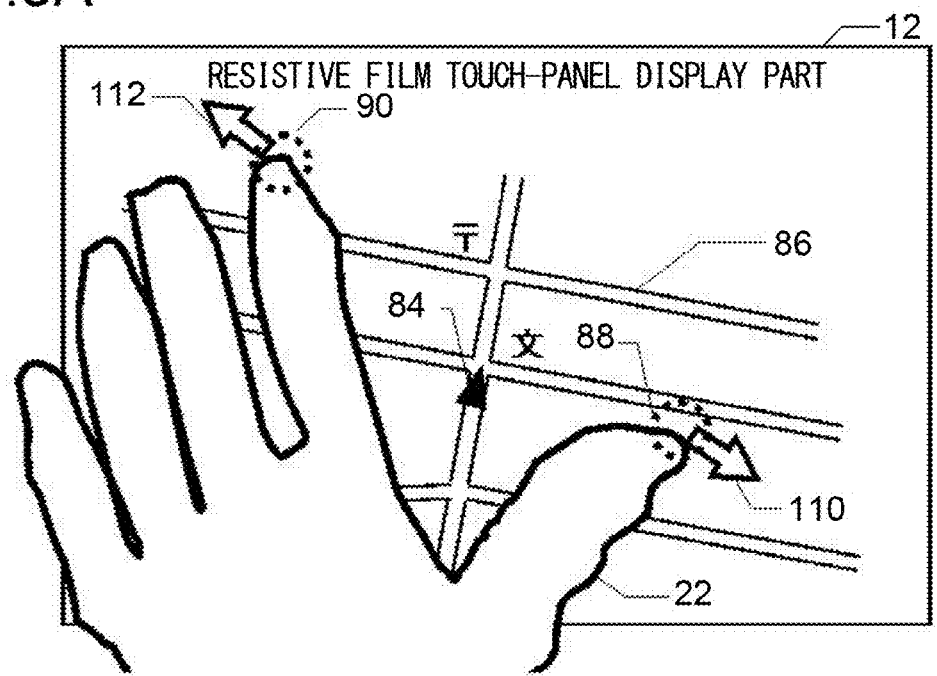
FIG. 8(A) and FIG. 8(B) A screen view of an instance when a map enlargement operation is performed regardless of where the absolute positions of the two points are, from the state of FIG. 5(A).
Figure 8B:
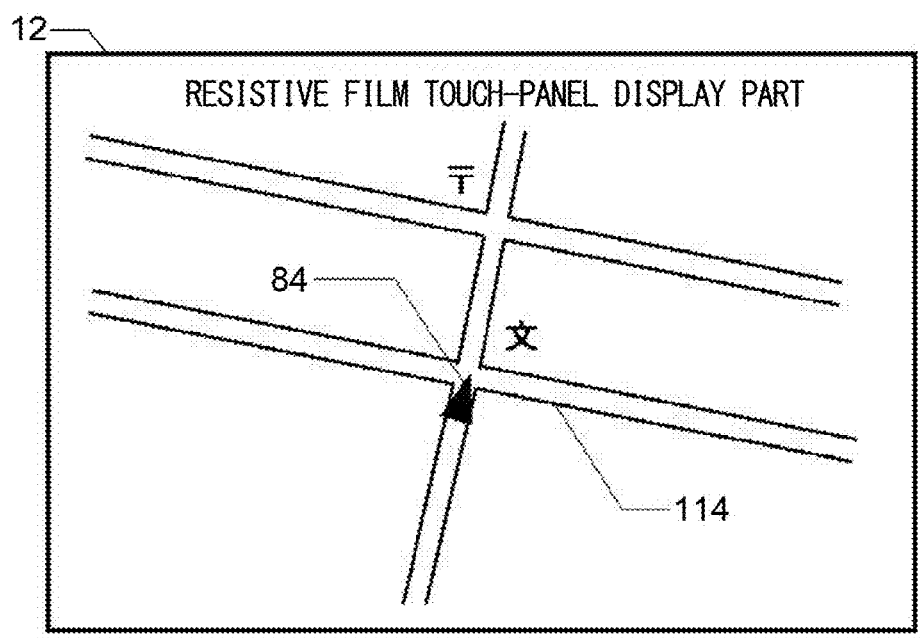

FIG. 8(A) and FIG. 8(B) is a main screen view of an instance when a map enlargement operation is performed in a case in which the only thing sensed is a relative right downward slant in the line joining the two points of the touch position 88 of the thumb and the touch position 90 of the index finger, regardless of where the absolute positions of the two points are, as in FIG. 5(A). To enlarge the map in this state, the thumb and the index finger are slid apart from their respective touch positions 88 and 90 as shown by the white arrows 110 and 112, as shown in FIG. 8(A), after which the left hand 22 is removed from the display part 12. The controller 4 discerns this movement as an enlarging operation and displays the map 114 enlarged at a predetermined magnification on the display part 12, with the center of the map kept in place as shown in FIG. 8(B). Thus, with a left-hand operation during travel, only that the enlarging operation is being performed is sensed without an indication of a position on the map, and the map is enlarged with the center kept in place. Since the enlargement ratio is also not indicated, the map is enlarged at a predetermined rate every time a single enlarging operation is sensed. Consequently, when there is a desire to enlarge the map further, the operation of separating the two-point touch positions is repeated.

Figure 9A:
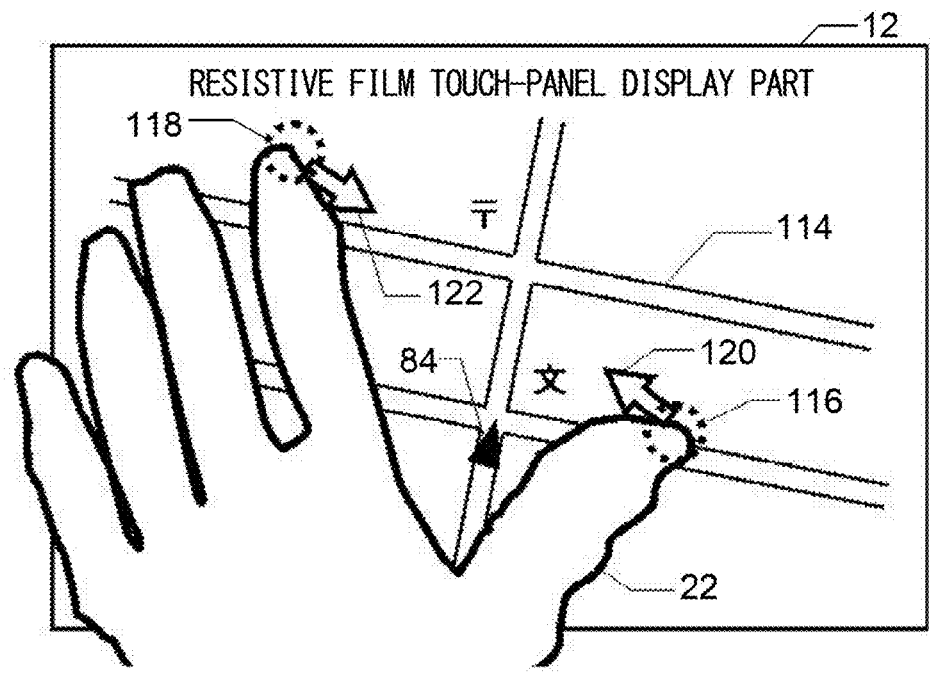
FIG. 9(A) and FIG. 9(B) A screen view of an instance when a map shrinking operation is performed regardless of where the absolute positions of the two points are, from the state of FIG. 5(A).
Figure 9B:
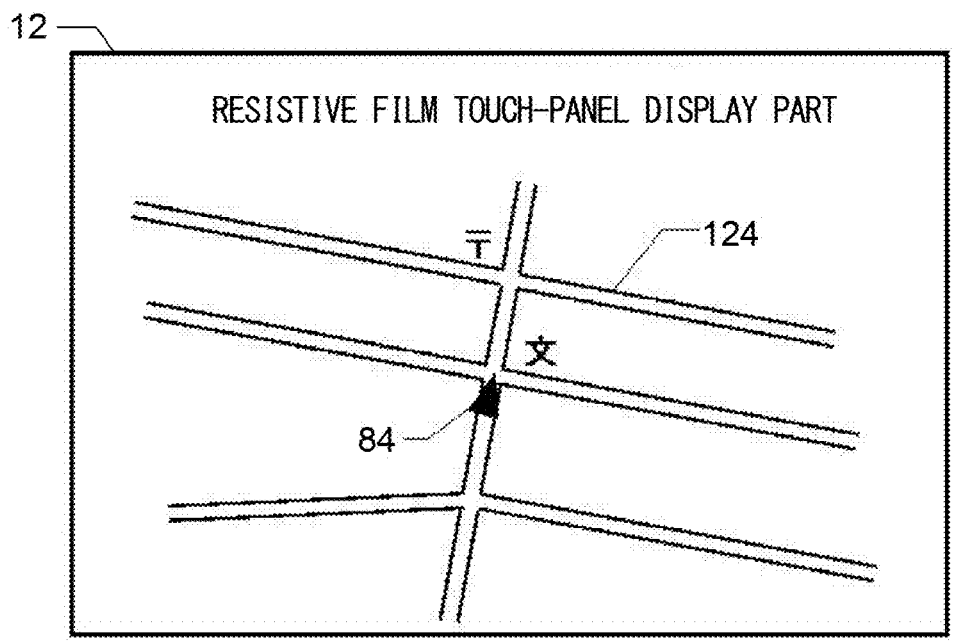

FIG. 9(A) and FIG. 9(B) is a main screen view of an instance when a map shrinking operation, the opposite of FIG. 8(A) and FIG. 8(B), is performed in a case in which the only thing sensed is a relative right downward slant in the line joining the two points of the touch position 88 of the thumb and the touch position 90 of the index finger, regardless of where the absolute positions of the two points are, as in FIG. 5(A). To shrink the map 114 in this state, the thumb and the index finger are slid towards each other from their respective touch positions 116 and 118 as shown by the white arrows 120 and 122, as shown in FIG. 9(A), after which the left hand 22 is removed from the display part 12. The controller 4 discerns this movement as a shrinking operation and displays the map 124 shrunk at a predetermined magnification on the display part 12, with the center of the map kept in place as shown in FIG. 9(B). Thus, shrinking is performed in the case of a shrinking operation with a left-hand operation during travel. Since the shrinkage ratio is also not indicated, the map is shrunk at a predetermined rate every time a single shrinking operation is sensed. Consequently, when there is a desire to shrink the map further, the operation of bringing the two-point touch positions closer is repeated.

Figure 10:
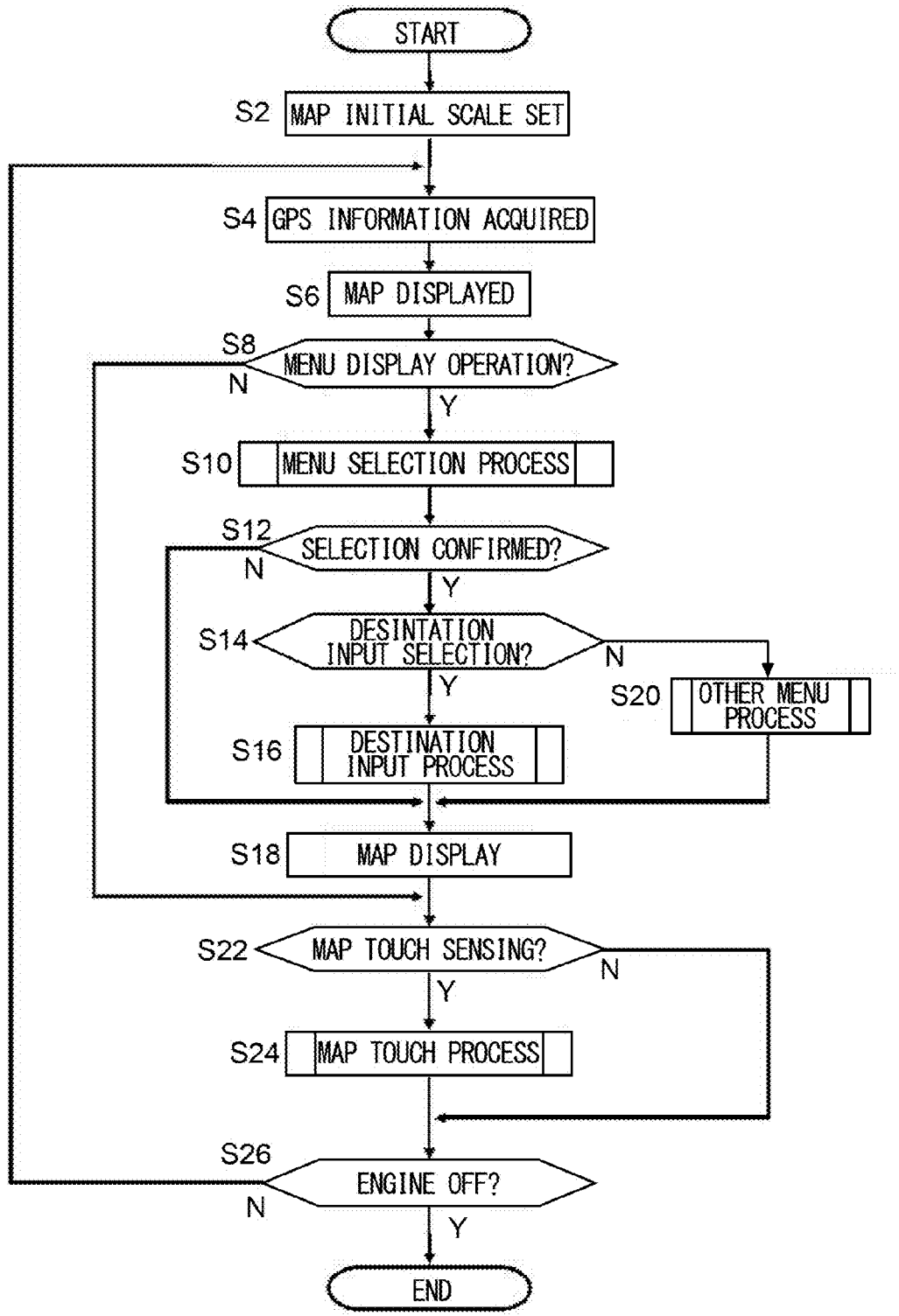
FIG. 10 A flowchart of the action of the controller in Example 1 of FIG. 1.

FIG. 10 is a flowchart of the action of the controller 4 in Example 1 of FIG. 1. The flow starts when the I/O part 20 has notified that the engine of the vehicle (or a "motor" in the case of an electric automobile, but hereinbelow represented as "engine") is on, and the initial scale of the map to be displayed is set in step S2. This initial scale employed here may be a scale that was stored in advance from the last time the engine was turned off, or a predetermined scale may be employed every time the engine is turned on. Next, GPS information showing the automobile's position from the GPS part 14 is acquired in step S4, and in step S6, a map centered on the automobile's position is displayed on the display part 12 with the magnification that was set in step S2.

Next, in step S8, a check is made of whether or not the operation part 6 has performed an operation of finding the menu display. When it is sensed in step S8 that the menu display operation has been performed, a menu selection process of step S10 proceeds. This is a process of executing the operation described in FIGS. 2 and 3; the details are described hereinafter. When the menu selection process is complete, a check is made in step S12 of whether or not the menu selection has been confirmed, and when it has, step S14 proceeds and a check is made of whether or not the destination input menu has been selected. In the case that a destination input menu selection has been ascertained, the destination input process of step S16 is executed, and based on the result, the sequence transitions to the map display of step S18. The details of the destination input process are described hereinafter.

When it is assessed in step S14 that the destination input menu has not been selected, step S20 proceeds, a process of another menu is performed, such as the audio process or the air conditioning process, and the sequence transitions to the map display of step S18. In the case that a menu selection confirmation is not ascertained in step S12, the sequence transitions immediately to the map display of step S18.

When the map is displayed in step S18, a check is made in step S22 as to whether or not a touch on the map has been sensed. When a menu display operation is not sensed in step S8, the map display of step S6 is continued, and the sequence transitions to the map touch sensing of step S22. When a map touch is sensed in step S22, the map touch process of step S24 begins. The details are described hereinafter. When the map touch process is complete, the sequence transitions to step S26. When a map touch is not sensed in step S22, the sequence transitions directly to step S26. In step S26, a check is made as to whether or not the engine has turned off, and when the engine is sensed as being off, step S4 is resumed. As long as the engine is not sensed as being off in step S26, steps S2 to S26 are repeated. When the operations are not sensed, the map display is continued and navigation is performed while the GPS information acquired in step S4 is updated, and when the operations are sensed, the map display corresponds to the operations. When the engine is sensed as being off in step S26, the flow ends.

Figure 11:
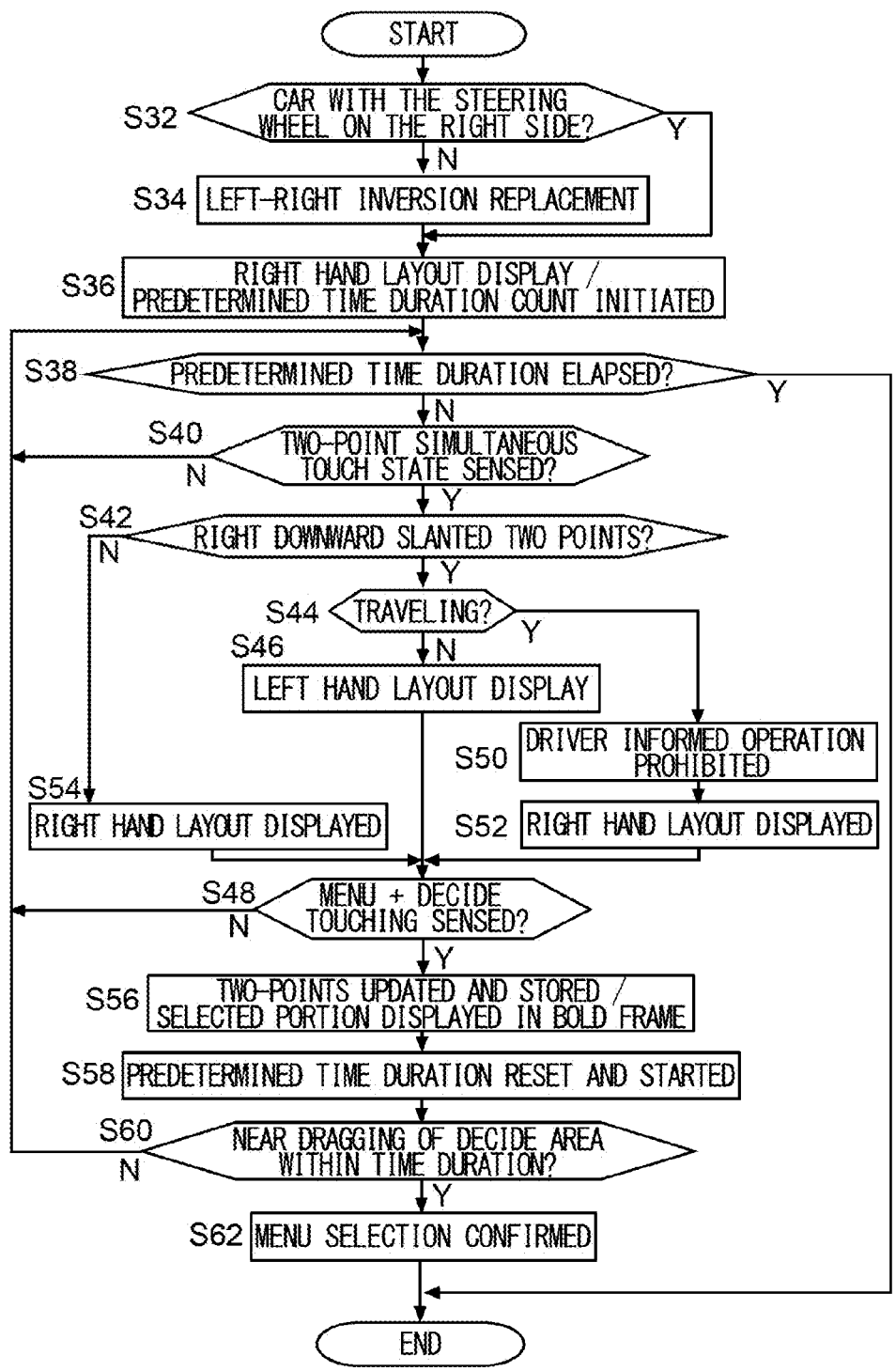
FIG. 11 A flowchart showing the details of step S10 of FIG. 10.

FIG. 11 is a flowchart showing the details of the menu selection process in step S10 of FIG. 10, and when the flow starts, first a check is made in step S32 as to whether or not the vehicle is an automobile with the steering wheel on the right side. When it is not an automobile with the steering wheel on the right side, "right" and "left" in the following process are inverted to "left" and "right" in step S34, a process equivalent to a replacement process is performed, and the sequence transitions to step S36. When the vehicle is ascertained as being an automobile with the steering wheel on the right side, the sequence transitions directly to step S36. These left-right inversion processes are necessary when the automobile navigation device 2 is set up in a vehicle, and information of whether the vehicle is an automobile with the steering wheel on the right side or an automobile with the steering wheel on the left side is acquired through information exchange with the vehicle by either the wireless communication part 18 or the I/O part 20. The assessment of whether or not a left-right inversion replacement will be performed yields the same result after the automobile navigation device 2 has once been set up in the vehicle, but in the case that the automobile navigation device 2 is a portable device that can be taken out and can then be carried in both an automobile with the steering wheel on the right side and an automobile with the steering wheel on the left side, the significance is that accidents caused by confusing the processes are automatically avoided.

Steps S36 and onward show the process for a case of an automobile with the steering wheel on the right side when the left-right inversion replacement in step S34 is not performed. First, in step S36, a right hand layout display is performed and a predetermined time duration count is initiated. A check is then performed in step S38 as to whether or not the predetermined time duration has elapsed after the right hand layout display, and when the predetermined time duration has not elapsed, a check is made in step S40 as to whether or not a two-point simultaneous touch state is sensed. When a two-point simultaneous touch state is sensed, the sequence transitions to step S42 and a check is made as to whether or not the sensed two points have a right downward slant. When the two points are sensed as having a right downward slant, it is deemed that a left hand operation has been enacted by the driver, step S44 proceeds, and a check is made as to whether or not the vehicle is traveling. When it is ascertained that the vehicle is not traveling, step S46 proceeds, a left hand layout display is performed instead of a right hand layout display, left hand operation by the driver is enabled, and the sequence transitions to step S48.

When it is sensed in step S44 that the vehicle is traveling, step S50 proceeds, the driver is informed that the menu selection operation is prohibited during travel, a right hand layout display is performed in step S52, and the sequence transitions to step S48. Step S52, used for cases in which a left hand layout display is enacted, is for performing a right hand layout display instead when step S52 is reached, and when the right hand layout has been displayed from the beginning, nothing is performed in step S52 and the right hand layout display is continued. In the case that the two points sensed in step S42 are not sensed has having a right downward slant, it is equivalent to two points having a left downward slant being sensed, which means that it is a right hand operation by the passenger seat occupant; therefore, the right hand layout display is performed in step S54 and the sequence transitions to step S48. Step S54, used for cases in which a left hand layout display is not enacted, is for performing a right hand layout display instead when step S54 is reached, and when the right hand layout has been displayed from the beginning, nothing is performed in step S54, the right hand layout display is continued, and the sequence transitions to step S48.

In step S48, as in FIG. 2(A) or 3(A), a check is made as to whether or not touches both on one of the menus and on the decide area 34 or 54 have been sensed, and when they have been sensed, the two points are updated and stored and an area corresponding to the two points is displayed in bold frame in step S56 on the basis of the sensing information. When there is no variation in the touch positions or variation in the storage of the detected two points, the same information is overwritten and updated, and the area displayed in bold frame also does not change. Step S58 then proceeds, the predetermined time duration initiated in step S36 is rest, the time duration count is started anew, and the sequence transitions to step S60.

In step S60, a check is made as to whether or not the decide area 34 or 54 has been dragged near a menu as shown by the black arrow 40 of FIG. 2(A) or the black arrow 58 of FIG. 3(A). When this near dragging is sensed, step S62 proceeds, the menu selection is confirmed, and the flow is ended. When elapse of the predetermined time duration is sensed in step S38, the flow is ended immediately. When a near dragging is not sensed in step S60, step S38 is resumed, steps S38 through S60 are repeated until the near dragging is sensed in step S60 or elapse of the predetermined time duration is sensed in step S38, and the device is adapted to conditions changes between traveling and stopping and to variations in touching of the menu. When a two-point simultaneous touch state is not sensed in step S40 and when two-point touching of one of the menus and the decide area 34 or 54 is not sensed in step S54, step S38 is resumed.

A confirmation of the menu selection with a sensing of near dragging in step S60 in the flow of FIG. 11 means a safety measure of not immediately confirming a menu selection when a two-point touch is mistakenly made and implementing one more step of an ascertaining operation. However, in cases in which keeping the operation simple is prioritized over such a safety measure, steps S58 and S60 may be omitted, and the configuration may be designed so that after a two-point touch of one of the menus and the decide area 34 or 54 is sensed in step S48 and the sequence has moved from step S54 to step S56, step S62 proceeds immediately and the menu selection is confirmed. In the case of such a configuration, in FIG. 2(A) or 3(A), touching of both one of the menus and the decide area 34 or 54 is sensed, and the menu selection is confirmed at the time point when the touched region changes to a bold frame.

Figure 12:
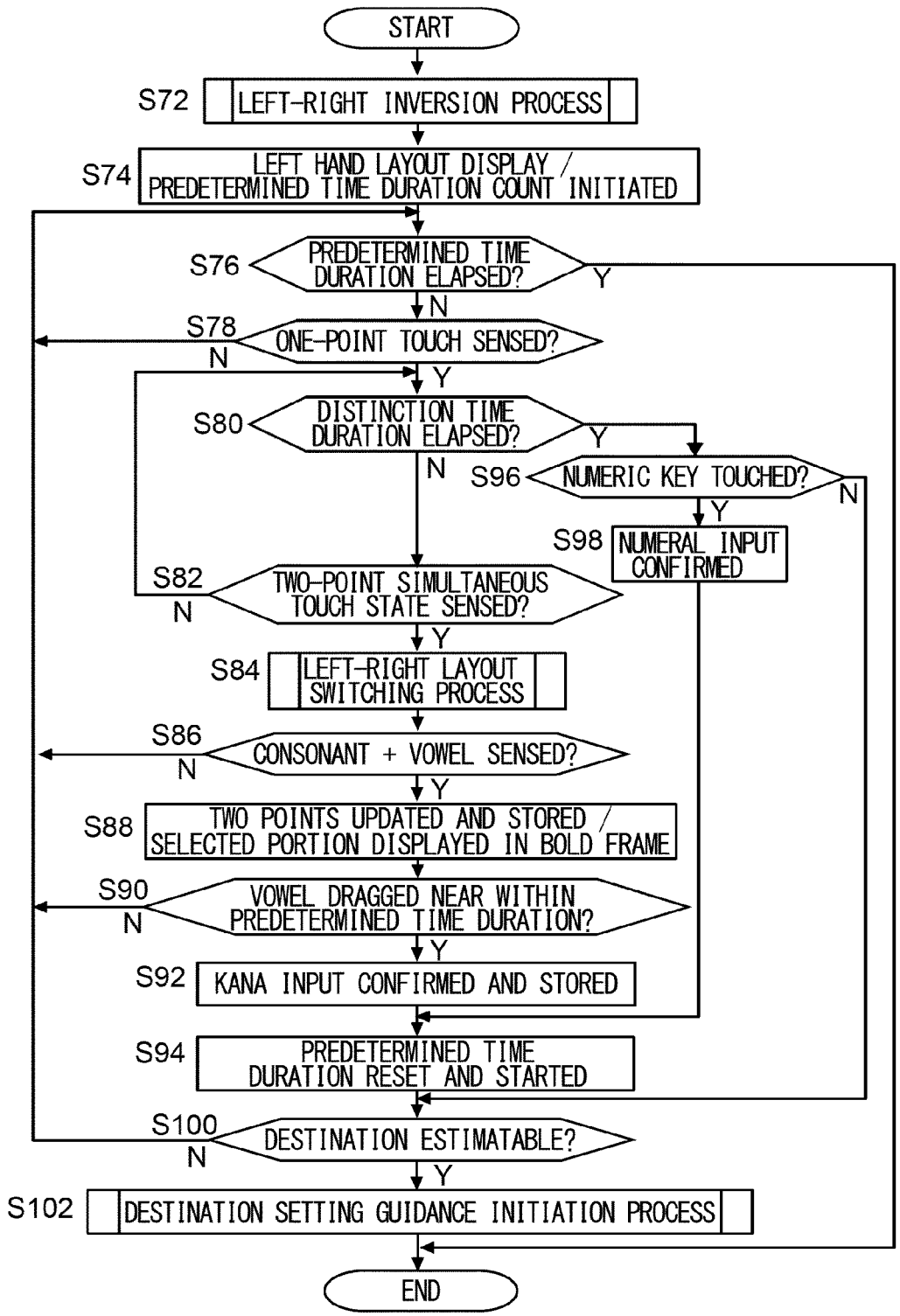
FIG. 12 A flowchart showing the details of step S16 of FIG. 10.

FIG. 12 is a flowchart showing the details of the destination input process in step S16 of FIG. 10, and when the flow starts, the left-right inversion process is first performed in step S72. This is the same as steps S32 and S34 of FIG. 11. When the left-right inversion process of step S72 ends, the flow proceeds to steps S74 and onward. Similar to FIG. 11, in steps S74 onward, the process shown is for a case of an automobile with the steering wheel on the right side when the left-right inversion replacement is not performed in the left-right inversion process.

First, in step S74, a right hand layout display is performed and a count of the predetermined time duration is initiated. In step S76, after the right hand layout display, a check is performed as to whether or not the predetermined time duration has elapsed, and when the predetermined time duration has not elapsed, a check is made in step S78 as to whether or not a one-point touch is sensed. When a one-point touch is sensed, the sequence transitions to step S80, and a check is made as to whether or not a predetermined distinction time duration has elapsed. This distinction time duration, which is premised on the two-point touch not being performed exactly simultaneously, is for distinguishing whether the one-point touch sensed in step S78 is the first point touch of an intended two-point touch or is intended as a one-point touch. In the case that the distinction time duration is not sensed to have elapsed in step S80, step S82 proceeds, and a check is made as to whether or not a two-point simultaneous touch state has been sensed. When this sensing is not possible, step S80 resumed, and steps S80 and S82 are repeated hereinbelow as long as the distinction time duration does not elapse and a two-point simultaneous touch state is not sensed.

When a two-point simultaneous touch state is sensed in step S82, the left-right layout switching process of step S84 is begun. This process is the same as the processes of step S42 to S46 and steps S50 to S54 of FIG. 11, and is for switching between a right hand layout and a left hand layout and prohibiting the left hand layout during travel. When the left-right layout switching process of step S84 ends, the sequence transitions to step S86.

In step S86, as in FIG. 4, a check is made as to whether or not touches are sensed on either the consonant button group 64 or the blank button 68 and either the vowel button group 66 (or 78) or the "n" button 70 (or 80), and when they are sensed, the two points are updated and stored and the area corresponding to the two points is displayed in bold frame in step S88 on the basis of the sensing information, and the sequence transitions to step S90. Similar to the flow of FIG. 11, when there is no variation in the touch positions or variation in the storage of the detected two points, the same information is overwritten and updated, and the area displayed in bold frame also does not change.

In step S90, a check is made as to whether or not a vowel button (or the "N" button) has been dragged near a consonant button (or the blank button) as shown by the black arrow 72 of FIG. 4(A) or the black arrow of FIG. 4(B). When this near dragging is sensed, step S92 proceeds, a kana character input of a single character is confirmed and stored, and the sequence transitions to step S94. When elapse of the distinction time duration is sensed in step S80, the touch is deemed to be a one-point touch, the sequence transitions to step S96, and a check is made as to whether or the touch is on one of the numeric keypad buttons 76 of FIG. 4. When it is on a numeric keypad button, step S98 proceeds, a numeric input is confirmed, and the sequence transitions to step S94. Thus, for numeric input, a numeric input of a single character is confirmed by only a one-point touch and the elapse of the distinction time duration.

The predetermined time duration count is reset in step S94, the count is started anew, and the sequence transitions to step S100. The significance of the predetermined time duration reset start here is that it is pending the next character input operation; therefore, it is also possible to set a suitable time duration pending character input which is different from the predetermined time duration started in step S74. In the case that the touch cannot be sensed in step S96 as being on one of the numeric keypad buttons 76, it is deemed to be a meaningless one-point touch, no input is confirmed, and the sequence transitions immediately to step S100.

In step S100, a check is made as to whether or not the destination can be estimated from the stored kana character string, including the character newly confirmed and stored in step S92. When there are few characters and the destination cannot be estimated, step S76 is resumed in order to enable more characters to be inputted. Step S76 is resumed either when a one-point touch is not sensed in step S78, when touches on both one button of the consonant button group or the like and one button of the vowel button group or the like are not sensed in step 86, or when a vowel button drag could not be sensed within the predetermined time duration in step S90. Hereinbelow, as long as it is not assessed in step S100 that the destination cannot be estimated or elapse of the predetermined time duration is not sensed in step S76, steps S76 to S100 are repeated, new character input is enabled, and the device is adapted to changes in conditions between traveling and stopping and to variations between a right hand/left hand layout.

When it is assessed in step S100 that the destination can be estimated, S102 proceeds, the destination is estimated based on the inputted character string, and the flow is ended. The flow is ended immediately when elapse of the predetermined time duration is sensed in step S76. A confirmation of the kana input with a sensing of near dragging in step S90 in the flow of FIG. 12 means a safety measure of not immediately confirming a kana input when a two-point touch is mistakenly made and implementing one more step of an ascertaining operation, similar to the case of FIG. 11. However, in cases in which keeping the operation simple is prioritized over such a safety measure, step S90 may be omitted, as in FIG. 11, and the configuration may be designed so that when a two-point touch of one button of the consonant button group or the like and one button of the vowel button group or the like is sensed in step S86, step S92 proceeds immediately and the kana input is confirmed. In the case of such a configuration, in FIG. 4, a two-point touch of both one button of the consonant button group or the like and one button of the vowel button group or the like is sensed, and the menu selection is confirmed at the time point when the touched regions change to a bold frame.

Figure 13:
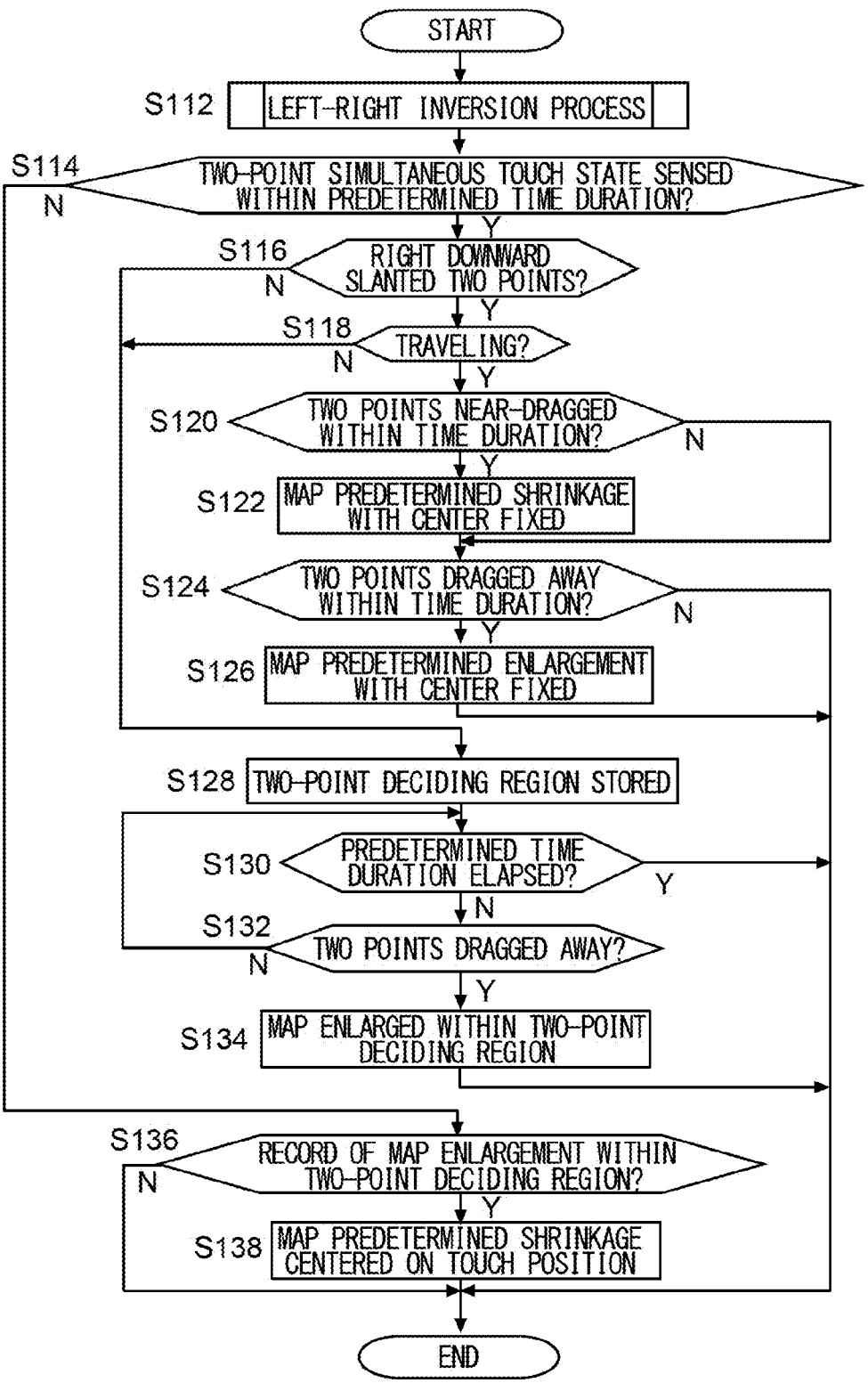
FIG. 13 A flowchart showing the details of step S24 of FIG. 10.

FIG. 13 is a flowchart showing the details of the map touch process in step S24 of FIG. 10, and when the flow starts, the left-right inversion process is first performed in step S112. This is similar to step S72 of FIG. 12, and is the same as steps S32 and S34 of FIG. 11. When the left-right inversion process of step S112 ends, the flow proceeds to steps S114 onward. Similar to FIGS. 11 and 12, in steps S114 onward, the process shown is for a case of an automobile with the steering wheel on the right side when the left-right inversion replacement is not performed in the left-right inversion process.

First, in step S114, a check is made as to whether or not a two-point simultaneous touch state is sensed within a predetermined time duration following the sensing of a map touch in step S22 of FIG. 10. When a two-point simultaneous touch state is sensed, the sequence transitions to step S116, and a check is made as to whether or not the sensed two points have a right downward slant. When the two points are sensed as having a right downward slant, it is deemed that a left hand operation has been enacted by the driver, step S118 proceeds, and a check is made as to whether or not the vehicle is traveling. When it is sensed that the vehicle is traveling, the sequence transitions to step S120.

Steps S120 to S126 are equivalent to the operations of FIGS. 8 and 9. First, in step S120, and a check is made as to whether or not the two points are dragged relatively near to each other within a predetermined time duration following the sensing of the two-point simultaneous touch state in step S114. When this near dragging is detected, step S122 proceeds, the map is shrunk at a predetermined ratio with the center of the displayed map kept in place, and the sequence transitions to step S124. This corresponds to the operation of FIG. 9(A) and FIG. 9(B). When a near dragging cannot be detected within the predetermined time duration in step S120, the sequence transitions directly to step S124.

In step S124, a check is made as to whether the two points have been dragged away from each other within a predetermined time duration following the sensing of the two-point simultaneous touch state in step S114. When this separating dragging is sensed, step S126 proceeds, the map is enlarged at a predetermined ratio with the center of the displayed map kept in place, and the flow is ended. This corresponds to the operation of FIG. 8(A) and FIG. 8(B). When separating dragging within the predetermined time duration cannot be sensed in step S124, the flow is ended immediately. In this case, there is no change in the shrinking of the map. In FIG. 13, the positions of steps S120 and S122 may be alternated with the positions of steps S124 and S126.

When two points having a right downward slant are not sensed in step S116, it means that the detected two points have a left downward slant; therefore, the sequence transitions to step S128, and the region where the absolute positions of the sensed two points are decided is stored. This corresponds to the state of the operation in FIG. 5(B). Next, a check is made in step S130 as to whether or not a predetermined time duration has elapsed, and in the case that elapse is not sensed, step S132 proceeds and a check is made as to whether or not the two sensed points have been dragged away from each other. When this separating dragging is not sensed, step S130 is resumed, and steps S130 and S132 are repeated, pending a two-point separating dragging within the predetermined time duration. When two-point separating dragging is sensed in step S132, step S134 proceeds, the map in the region decided and stored in step S128 is enlarged to fill most of the display part 12, and the flow is ended. This corresponds to the state of the operation of FIG. 6(A) and FIG. 6(B). When a predetermined time duration elapse is sensed in step S130, the flow is ended immediately. In this case, the map is not enlarged.

In step S114, when a two-point simultaneous touch state is not sensed within a predetermined time duration following the sensing of a map touch in step S22 of FIG. 10, it means that a one-point touch has been sensed in step S22 of FIG. 10, and the sequence therefore moves to step S136. In step S136, a check is made as to whether or not there is a record of the map being enlarged within the region decided by the two-point touch positions immediately before the map touch is sensed in step S22 of FIG. 10. When there is such a record, step S138 proceeds, the map is shrunk at a predetermined ratio centered on the touch position sensed in step S22 of FIG. 10, and the flow is ended. This corresponds to the operation of FIG. 7(A) and FIG. 7(B). In the case that an enlargement record is not sensed in step S136, the flow is ended immediately. In this case, the map is not enlarged.

The various features shown in Example 1 above are not limited to these specific implementations, and can be put into practical application in various implementations as long as the disclosed advantages can be achieved. In Example 1 above, for example, switching of the right hand layout and the left hand layout is associated with sensing whether or not the vehicle is traveling. This allows the driver to perform certain operations of comparatively low danger even while the vehicle is traveling and enables the passenger seat occupant to perform complicated operations and operations that must be accurate even while the vehicle is traveling, which is more useful than cases of limiting operations altogether during travel, in that simple operations are enabled. In Example 1, whether the operation is by the driver or by the occupant is assessed by sensing whether the two points have a right downward slant or a left downward slant, and this configuration is useful in that it does not require other means for distinguishing between the driver and the occupant. However, in the case that it is considered important to absolutely prevent accidents caused by the driver operating the right hand layout with an unnatural orientation, infrared sensing or other means for distinguishing between the driver and the occupant may be separately provided, whereby the right hand layout and left hand layout may be switched. In the case that the priority is to simplify the configuration and prevent accidents caused by the car navigation operation, the configuration may be designed so that complicated operations during travel are prohibited regardless of whether the layout is for the right hand or the left hand. In any of the above cases, switching between the right hand layout and the left hand layout to match the structure of the hand is useful in terms of making two-point operations with the hand easier.

Example 1 above shows implementation in car navigation, but a number of the various disclosed features are not limited to implementation in car navigation and can be implemented in various instruments as long as the disclosed advantages can be achieved. For example, the features can be put into a wide range of practical application in touch-panel display parts of digital still cameras and digital movie cameras, and touch-panel display parts of portable phones and other mobile instruments. Furthermore, a number of various features disclosed above, such as switching between a two-point touch operation with the right hand and a two-point touch operation with the left hand, can be put into practical application even in touch panels that do not have a display function.

EXAMPLE 2

Figure 14:
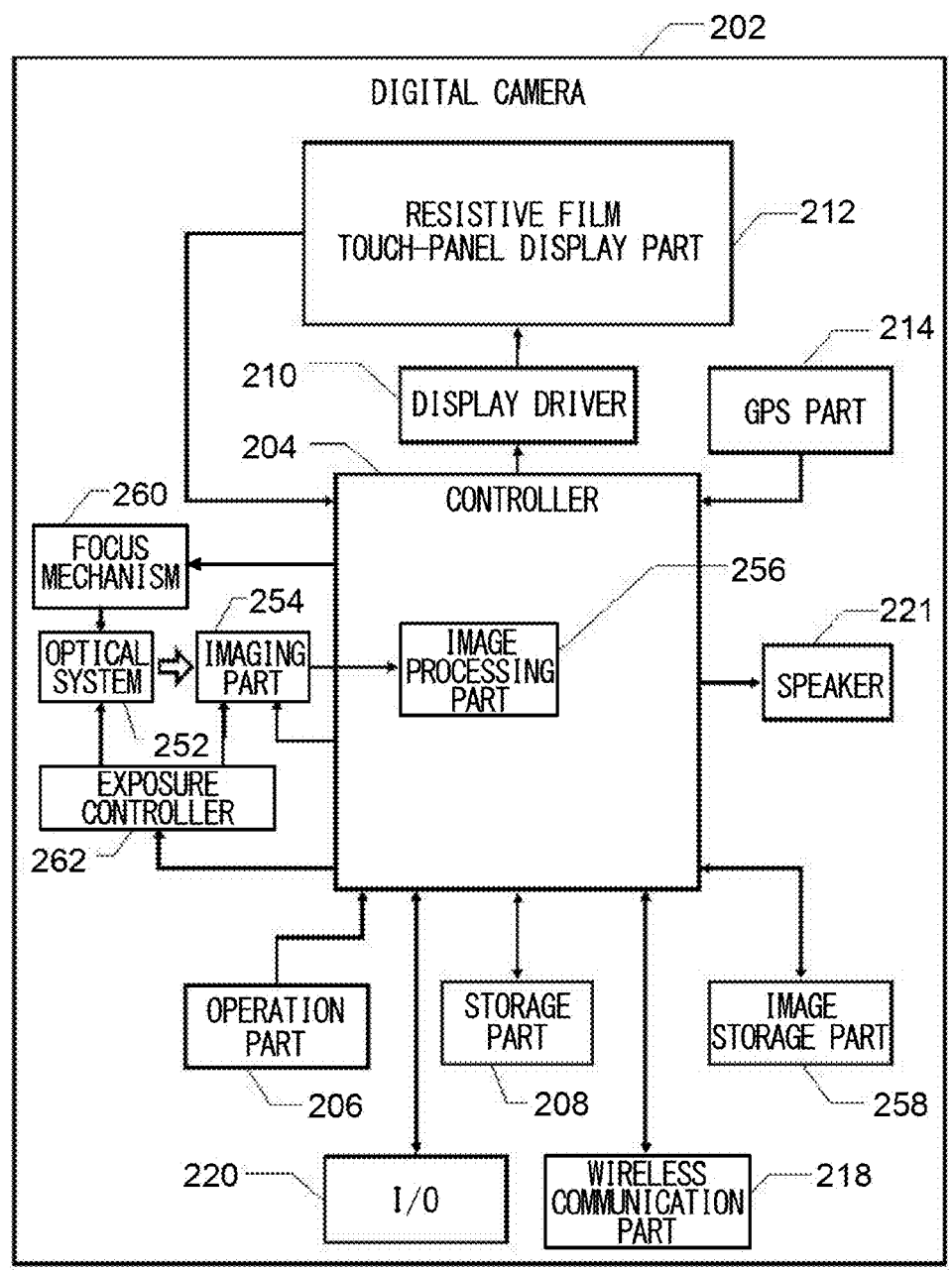
FIG. 14 A block diagram showing Example 2 of the touch-panel input device according to an embodiment of the present invention (Example 2).

FIG. 14 is a block diagram showing Example 2 of the touch-panel input device according to an embodiment of the present invention. Example 2 constitutes a digital camera 202, having a controller 204 composed of a computer for controlling the entire device, the digital camera 202 being controlled according to the operation of an operation part 206 by a digital camera operator. The function of the controller 204 is executed by software stored in a storage part 208. The storage part 208 temporarily stores various data needed in the control of the digital camera 202. The controller 204 controls the display of a resistive film touch-panel display part 212 via a display driver 210, and performs both a GUI display needed in the operation of the operation part 206 and a display of the control results.

A resistive film touch-panel display part 212 is both a display part and a touch-panel input device, as well as being a GUI operation part for performing input operations by direct touching of the display. The configuration of the resistive film touch-panel display part 212 is similar to that of Example 1 of FIG. 1, and the controller 204 can sense two-point touch positions and their movements by analyzing the output of four lines of the resistive film touch-panel display part 212.

In Example 2, portions that can be comprehended by correspondingly applying the descriptions of Example 1 are given reference numbers of 200 added to the common numbers in the tens and ones columns and are not described as a general rule, and configurations unique to the digital camera are described hereinbelow. First, in a shooting mode, the digital camera 202 converts an optical image captured by an optical system 252 capable of focal point adjustment into an electronic image by an imaging part 254, performs an image process including compression by an image processing part 256 of the controller 204, and stores the result in an image storage part 258. The image storage part 258 is configured as an image memory built into the digital camera 202 or a memory card that can be detached from the digital camera 202.

In the above-mentioned shooting mode, the image taken by the imaging part 254 is displayed on the resistive film touch-panel display part 212 by the display driver 210. In other words, in such a shooting mode, the resistive film touch-panel display part 212 serves the function of a finder screen for displaying a subject image in order to establish the composition of the imaging. At this time, by using the thumb, for example, to touch a desired portion of the subject image displayed on the resistive film touch-panel display part 212, a touch position is stored, and autofocus is performed by a focus mechanism 260 on the subject portion corresponding to the stored position. Focal point adjustment assessment of the autofocus is performed by the controller 204 on the basis of information of the image processing part 256. Exposure control is performed by an exposure controller 262 controlling the aperture of the optical system 252 and the exposure time and gain of the imaging part 254, using the subject portion corresponding to the stored touch position as a standard. Assessment of exposure control is also performed by the controller 204 on the basis of information of the image processing part 256.

Once the thumb is removed from the resistive film touch-panel display part 212, storage of the touch position is canceled and the position touched next is newly stored. By storing the initially touched position as long as touching is continued in this manner, it is possible to prevent instances of the touch position being unintentionally changed from the desired position due to the finger being misaligned on the resistive film touch-panel display part 212 when the touch is continued. The shutter is released when any desired position of the resistive film touch-panel display part 212 is touched with the index finger, for example, while the first touch is continued, and shooting is complete.

The image stored in the image storage part 258 by the shooting mode can be played back and displayed on the resistive film touch-panel display part 212 by setting a playback mode. Enlarging and shrinking are possible in such a playback mode, and the operations thereof can have the operations described in Example 1 applied correspondingly.

Making a slight supplement to the configuration of FIG. 14 from which descriptions are omitted above, the information of a GPS part 214 is stored as shooting location information together with the image in the image storage part 258. A speaker 221 is utilized in operation guidance of the digital camera 202. Furthermore, an I/O part 220 and a wireless communication part 218 can be utilized when the image stored in the image storage part 258 is transmitted outside of the digital camera 202.

Figure 15A:
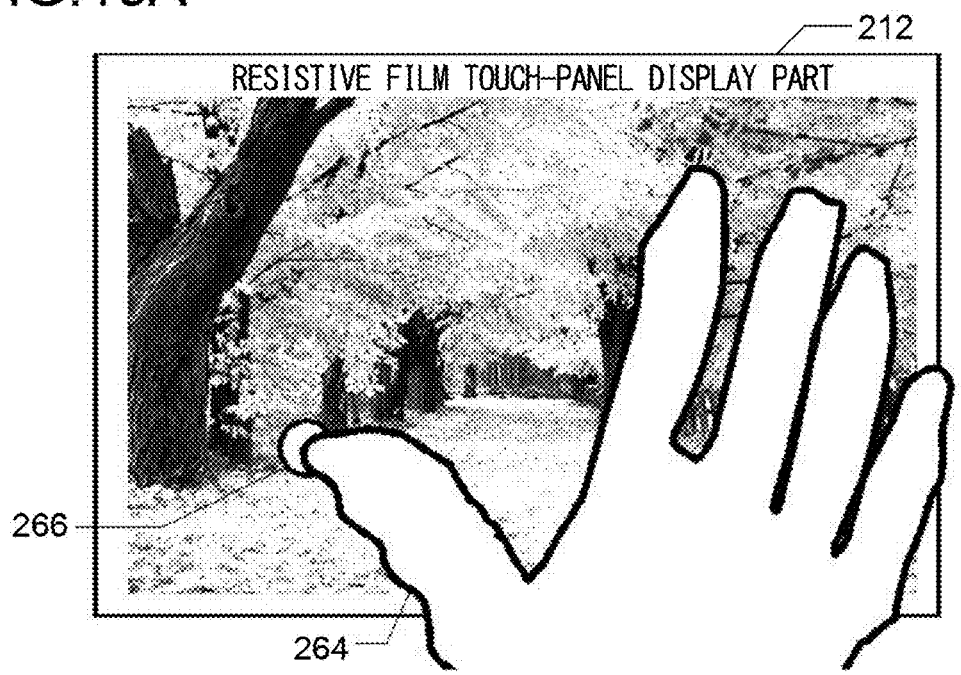
FIG. 15(A) and FIG. 15(B) A screen view showing a subject image displayed on the resistive film touch-panel display part of Example 2.
Figure 15B:
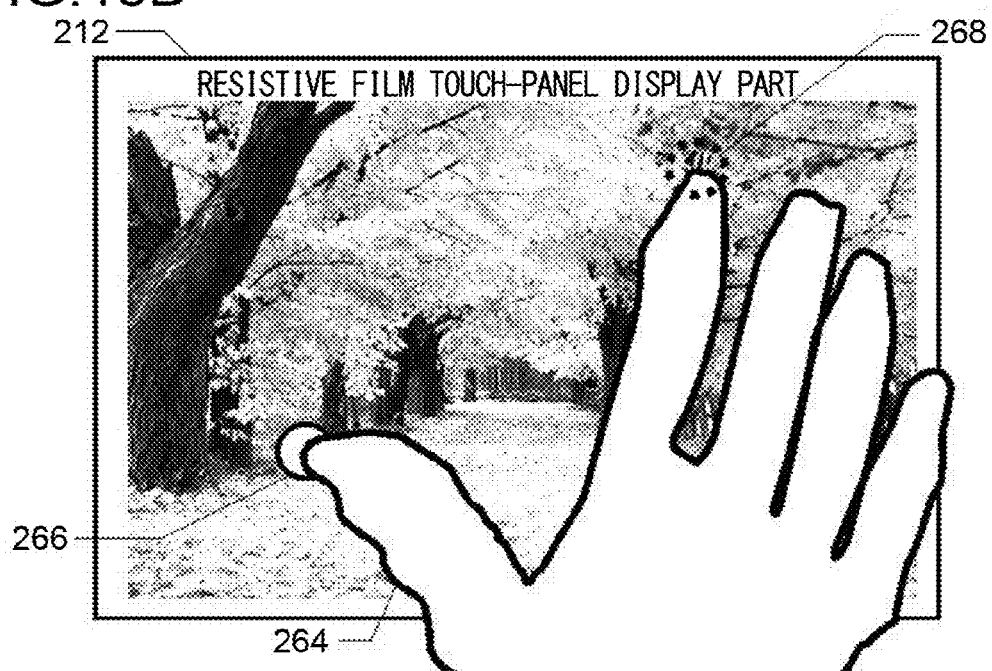

FIG. 15(A and FIG. 15(B) is a screen view showing a subject image displayed on the resistive film touch-panel display part 212 in shooting mode of the digital camera 202 shown in Example 2. FIG. 15(A) shows a state in which a desired position of the resistive film touch-panel display part 212 is touched with the thumb of the right hand 264, and a touch position display 266 is performed in response to this touch. This touch position display 266 shows the touched position and also shows that the touch position has been stored. The touch position display 266 does not move even when the position of the thumb is misaligned in this one-point touch state by the thumb. When the thumb is removed from the resistive film touch-panel display part 212, touch position storage is canceled and the touch position display 266 disappears, and the storage position can therefore be set with a new touch.

In establishing the composition before shooting, the subject image displayed on the resistive film touch-panel display part 212 moves when the digital camera 202 shakes. At this time, when the image and the stored touch position both move, the standard is lost and it becomes difficult to indicate the desired position of the image, but due to the initial touch position being stored and kept in place as described above, even when the image moves thereafter, the touch position and the initial desired position of the image can be easily restored by moving the digital camera 202.

FIG. 15(B) shows a state in which any desired position 268 of the resistive film touch-panel display part 212 is touched while the touch of the thumb of the right hand 264 is continued. The controller 204 assesses that a shutter release operation has been performed by the realization of such a two-point touch state, processes the image information of the imaging part 254 in this state with the image processing part 256, and stores the result in the image storage part 258.

In Example 2, since the shutter release button position is any desired position of the resistive film touch-panel display part 212, more can be devoted to establishing the composition and the operation is simplified. However, the configuration for releasing the shutter by the second touch is not limited to such, and the configuration may be designed so that the shutter button is displayed at an easily operated position as is the position 268 of FIG. 15(B), for example. Such a shutter button position display is performed simultaneous with the storing of the initial touch position display 266. According to such a configuration, the shutter cannot be released by a second touch at any desired position, but on the other hand, it is possible to prevent the shutter from being released mistakenly by a position other than that of the displayed shutter button being touched unintentionally. Example 2 may be configured so that such a shutter release button display mode can be selected by custom settings of the user of the digital camera 202.

Figure 16:
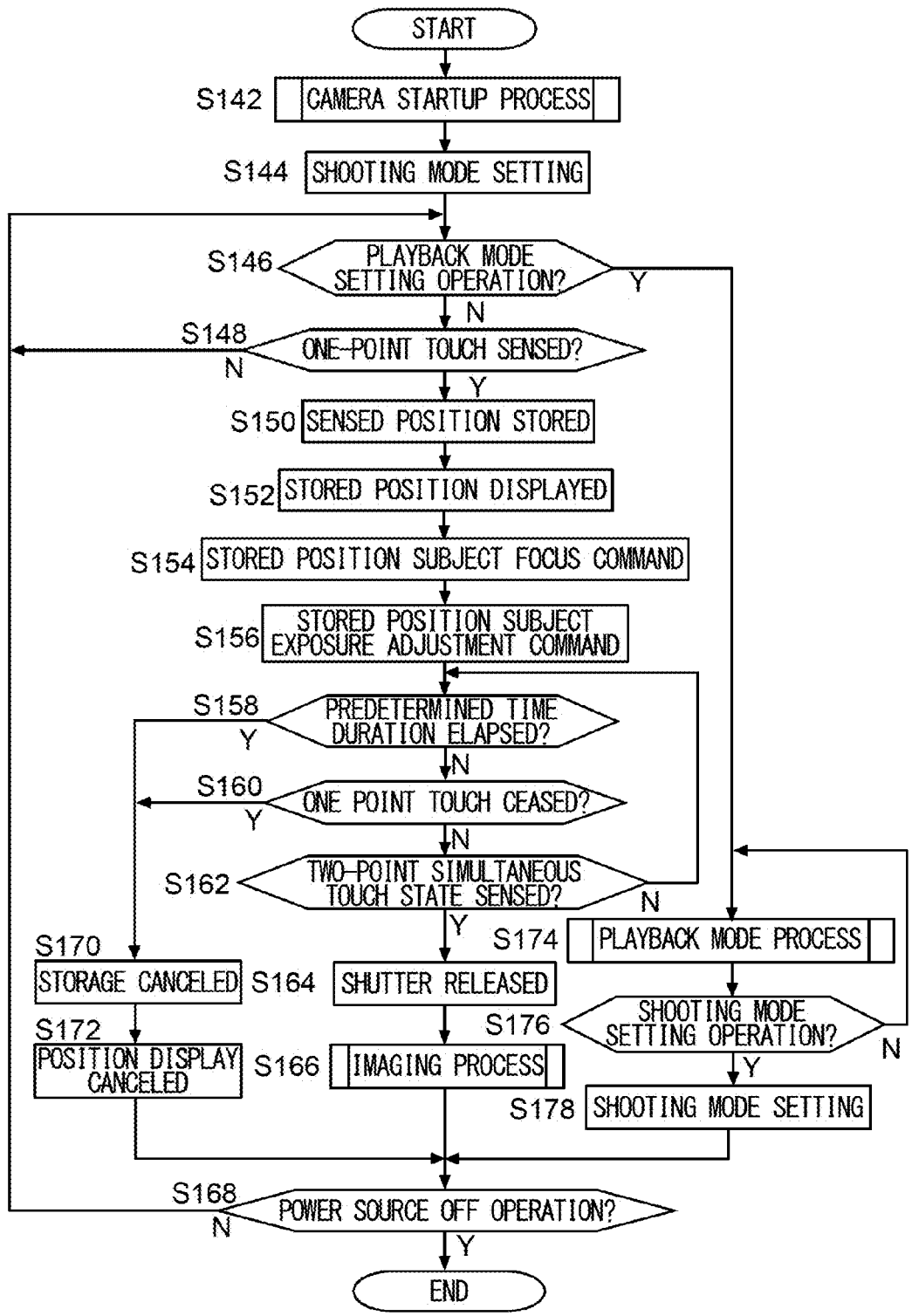
FIG. 16 A flowchart of the action of the controller in Example 2.

FIG. 16 is a flowchart of the action of the controller 204 in Example 2 of FIG. 14. The flow starts when a power source on operation of the digital camera 202 is performed, a startup process of the digital camera is performed in step S142, shooting mode is set as the default state in step S144, and the sequence transitions to step S146. A check is made in step S146 as to whether or not a manual operation of the playback mode setting has been performed, and when it has not, step S148 proceeds.

In step S148, a check is made as to whether or not a one-point touch is sensed. When a one-point touch state is sensed, the sequence transitions to step S150, and the position where the touch is sensed is stored. When a one-point touch is not sensed in step S148, step S146 proceeds, and steps S146 and S148 are repeated hereinbelow pending the sensing of a one-point touch as long as the playback mode setting operation is not performed. When the sensed position is stored in step S150, step S152 proceeds and the stored position is displayed. This display corresponds to the touch position display 266 of FIG. 15(A).

Furthermore, in step S154, the controller 204 issues a command to the focus mechanism 260 to drive the optical system 252 on the basis of information of the image processing part 256 pertaining to the subject portion imaged at the stored position, and focus is adjusted so as to maximize the contrast of this portion. As a result, the image focuses on the subject of the portion of the touch position display 266 of FIG. 15(A). After the focus command, in step S156, the controller 204 issues a command to the exposure controller 262 to control the aperture of the optical system 252 and the exposure time duration of the imaging part 254 on the basis of information of the image processing part 256 pertaining to the subject portion imaged at the stored position. As a result, exposure control is performed to a state in which the subject of the portion of the touch position display 266 of FIG. 15(A) has the proper exposure.

Next, in step S158, a check is made as to whether or not a predetermined time duration has elapsed following the sensing of the one-point touch in step S148. This predetermined time duration is about two seconds, for example, and this time duration is set as a time duration for pending a shutter release by the sensing of a second point touch after the subject portion of interest is decided by the first point touch. As is explained hereinafter, storing of the first point touch is canceled in the case that a second point touch is not sensed within this predetermined time duration.

When a predetermined time duration elapse is not sensed in step S158, step S160 proceeds and a check is made as to whether or not the one-point touch has ceased. In the case that a one-point touch cease is not sensed, step S162 proceeds, and a check is made as to whether or not a two-point simultaneous touch state has arisen as a result of a second point being touched while the first point touch is continued. When a two-point simultaneous touch state is sensed, step S164 proceeds, the shutter is released, and the sequence transitions to the shooting process of step S166. In the case that a two-point simultaneous touch state is not sensed in step S162, step S158 is resumed, and steps S158 and S162 are repeated hereinbelow pending a second point touch as long as the predetermined time duration does not elapse and the first point touch does not cease.

The imaging process of step S166 is a process for performing image compression by the image processing part 256 and storing the compressed image in the image storage part 258. In the imaging process, the image being stored in tandem is displayed as a still image on the resistive film touch-panel display part 212 for a predetermined time duration. When the imaging process of step S166 ends, step S168 proceeds, and a check is made as to whether or not a power source off operation of the digital camera 202 has been performed. When the power source off operation has been sensed, the flow is ended.

When a predetermined time duration elapse has been sensed in step S158, or when a one-point touch cease has been sensed in step S160, the sequence transitions to step S170, storing of the one-point touch is canceled, the touch position display 266 such as the one shown in FIG. 15(A) is canceled in step S172, and the sequence transitions to step S168. The decision of a new first point touch position can be begun by the functions of these steps S170 and S172.

When the playback mode setting operation is sensed in step S146, the sequence transitions to step S174 and a playback mode process is performed. The playback mode process enables full-screen playback by image feeding in a predetermined order beginning from the most recent image or the like, image selection by thumbnail images, slideshow display, and other actions. In the playback mode process, the sequence periodically moves to step S176 to check if there has been a shooting mode setting operation, and when there has not been an operation, step S174 is resumed and playback mode is continued. When the shooting mode setting operation is detected in step S176, the shooting mode is set in step S178 and step S168 proceeds.

As previously explained, the flow ends when the power source off operation is sensed in step S168, but in the case that there is no sensing of the power source off operation, step S146 is resumed. Steps S146 to S168 are repeated hereinbelow as long as the power source off operation is not sensed in step S168, and essentially, the device is adapted to the various operations of the shooting mode, as well as to the operation of transitioning to a suitable playback mode and the operation of returning to the shooting mode.

As is clear from the flow of FIG. 16 described above, in Example 2, the sensed touch is distinguished as being either the first point or second point touch, and the responding function changes between the respective touches. As a specific example, a case is shown in which a function indicating the image position responds due to the first point touch, and a shutter release function responds due to the second point touch. However, this feature of the present invention is not limited to differentiating the uses of the image position indication function and the shutter release function, and sensing of first point touches and second point touches can be allocated among various different functions.

In the flow of FIG. 16, when the digital camera 202 is shook after the first point touch position has been stored, the image displayed on the portion of the stored touch position on the screen moves as well. Consequently, the subject portion whose focus is to be adjusted and whose exposure is to be adjusted also changes. Consequently, focus adjustment and exposure adjustment can be performed on the subject portion by shaking the digital camera 202 to match the desired subject up with the touch position display 266 of FIG. 15(A). In Example 2, a focus lock and an exposure adjustment lock mode are also possible, and when such lock modes are selected, image data of the corresponding subject of the imaging part 254 at the time point of touch position storage is also stored along with the storage of the touch position and the display of the touch position display 266, and focus adjustment and exposure adjustment are performed based on the stored image data. Consequently, in such lock modes, the state of the focus adjustment and exposure adjustment can be maintained on the subject portion in the touch position at the time of the first point touch even when the digital camera 202 is shook after the first point touch.

Using FIG. 16 to describe a case of implementing the above-mentioned lock modes, a step of checking for a lock mode setting is inserted between steps S152 and S154, and when a lock mode setting is sensed, the sequence transitions to step S154 through a step of storing image data of the corresponding portion at the time point of the touch position sensing. Consequently, in this case, steps S154 and S156 are performed not based on the subject portion data corresponding to the stored touch position acquired from the imaging part 254 in real time, but based on the subject portion data stored in the above-described manner. When step S170 proceeds in a lock mode, the storing of the subject image data is also canceled after step S172 and the sequence transitions to step S168.

EXAMPLE 3

Next, Example 3 of the touch-panel input device according to an embodiment of the present invention will be described. Example 3 relates to an automobile navigation device of a vehicle, and most of the configuration thereof is common with Example 1. Consequently, essentially FIGS. 1 through 13 also apply, the same numerals also apply to the same portions, and only different aspects are described. Example 3, similar to Example 1, is configured so that when a driver operates while driving, the only thing sensed is a relative right downward slant in the line joining the two touched points regardless of where the absolute positions of the two points are, and a map enlargement operation can be performed by a simple undangerous touch position movement. However, in Example 1, enlarging or shrinking was decided by whether the point-to-point distance widened or narrowed as in FIGS. 8 and 9, whereas Example 3 is configured so that enlarging and shrinking are performed by another operation method. Other points of Example 3 are common with Example 1 and are therefore not described.

Figure 17A:
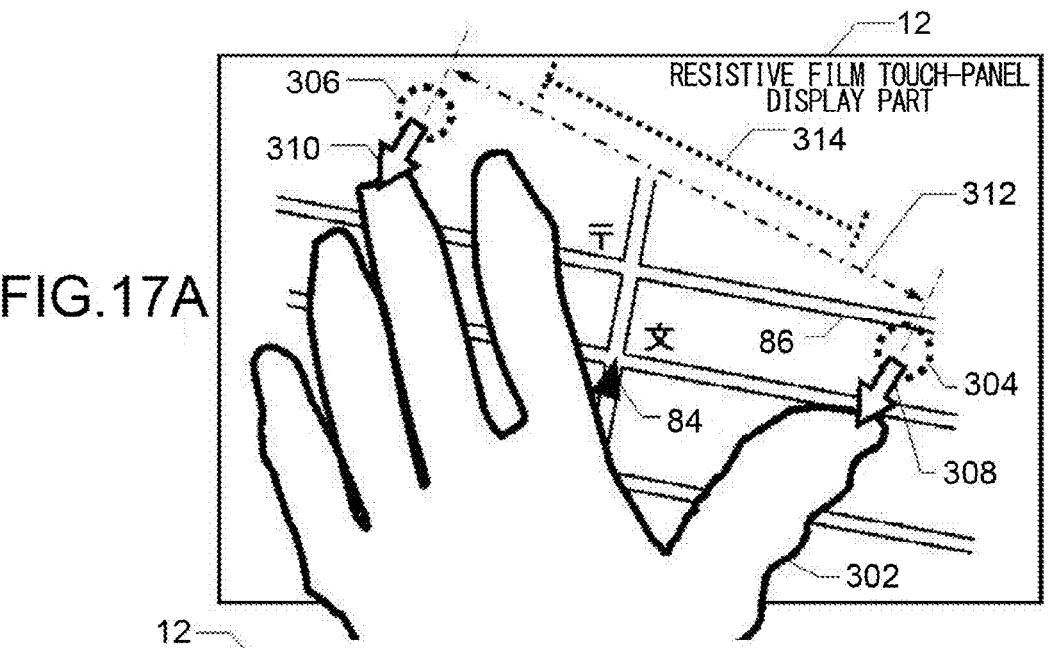
FIG. 17(A) and FIG. 17(B) A screen view of when a map enlargement is performed regardless of where the absolute positions of the two points are, from the cited state of FIG. 5(A), in Example 3 of a touch-panel input device according to an embodiment of the present invention (Example 3).
Figure 17B:
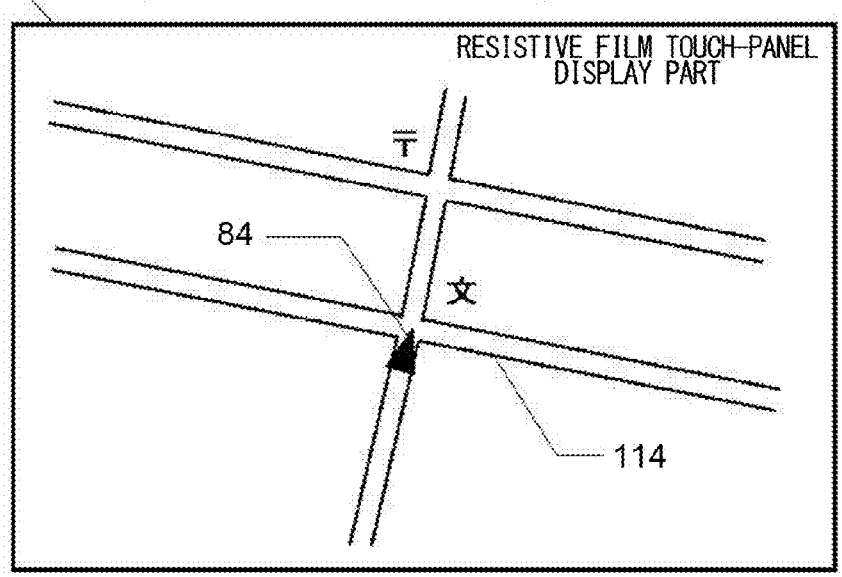

FIG. 17(A) and FIG. 17(B) is a screen view of when a map enlargement is performed by a undangerous operation by the driver while driving regardless of where the absolute positions of the two points are, from a left-hand operation sensed state such as that of FIG. 5(A), in Example 3 described above. The description in FIG. 17(A) and FIG. 17(B) assumes that a two-point touch is performed with the thumb and middle finger in order to widen the gap between the touch positions. Needless to say, the problem of sensing is the touch positions, and when natural touches are possible, any fingers may be used for the operation. FIG. 17(A) shows a state in which the touch positions 304 and 306 are touched respectively by the thumb and middle finger of the left hand 302, from which the positions are slid in a parallel movement while the gap between the fingers is essentially unchanged as shown by the white arrows 308 and 310, and the left hand 302 is then removed from the display part 12. At this time, the controller 4 assesses whether or not the gap 312 between the two touched points is larger than a standard gap 314.

In the case of FIG. 17(A), since the gap 312 between the two touched points is larger than the standard gap 314, an enlargement operation is discerned given this assessment and the parallel movement sliding of the white arrows 308 and 310, and a map 114 enlarged from FIG. 17(A) is displayed on the display part 12 with the center of the map kept in place as shown in FIG. 17(B). Thus, in the case that a left-hand operation is performed during travel in Example 3 as well, the only thing sensed is that an enlargement operation has been performed without any indication of the map position, and enlargement is performed with the center of the map kept in place. The controller 4 determines the sliding amount and sliding speed for the operation of moving further in parallel after touching, and removing the left hand 302 from the display part 12, i.e., for the sliding trajectory shown by the white arrows 308 and 310, and decides the enlargement ratio on the basis of the product of these two parameters. Thus, the operator can adjust the enlargement ratio by greatly changing the sliding amount and speed. FIG. 17(B) displays an enlarged map 114 that has been enlarged according to an enlargement ratio decided in this manner. When the enlargement ratio is smaller than desired, a wide two-point touch and parallel sliding such as are shown in FIG. 17(A) and FIG. 17(B) are repeated. In cases in which the map has been enlarged by too much, the map can be shrunk by the operation described hereinbelow.

FIG. 18(A) and FIG. 18(B) a screen view of when a map shrinking is performed by a undangerous operation by the driver while driving regardless of where the absolute positions of the two points are, from a left-hand operation sensed state such as that of FIG. 5(A), in Example 3. The description in FIG. 18(A) and FIG. 18(B) assumes that a two-point touch is performed with the thumb and index finger with a narrowed gap. FIG. 18(A) shows a state in which the touch positions 316 and 318 are touched respectively by the thumb and index finger of the left hand 302, from which the positions are slid in a parallel movement while the gap between the fingers is essentially unchanged as shown by the white arrows 320 and 322, and the left hand 302 is then removed from the display part 12. At this time, similar to FIG. 17(A) and FIG. (B), the controller 4 assesses whether or not the gap 324 between the two touched points is larger than a standard gap 314 similar to the one in FIG. 17(A) and FIG. 17(B).

In the case of FIG. 18(A), since the gap 324 between the two touched points is smaller than the standard gap 314, a shrinking operation is discerned given this assessment and the parallel movement sliding of the white arrows 320 and 322, and a map 124 shrunk from FIG. 18(A) is displayed on the display part 12 with the center of the map kept in place as shown in FIG. 18(B). Thus, in the case that a left-hand operation is performed during travel in Example 3, the only thing sensed is that a shrinking operation has been performed without any indication of the map position, and shrinking is performed with the center of the map kept in place. The controller 4 determines the sliding amount and sliding speed for the sliding trajectory shown by the white arrows 320 and 322, and decides the shrinkage ratio on the basis of the product of these two parameters, similar to the case in FIG. 17(A) and FIG. 17(B). Thus, the operator can adjust the shrinkage ratio by greatly changing the sliding amount and speed in the case of shrinking as well. FIG. 18(B) displays a shrunk map 124 that has been shrunk according to a shrinkage ratio decided in this manner. Similar to the case of enlargement, when the shrinkage ratio is smaller than desired, a wide two-point touch and parallel sliding such as are shown in FIG. 18(A) and FIG. (B) are repeated. In cases in which the map has been shrunk by too much, the map can be enlarged by the wide two-point touch and parallel sliding of FIG. 17(A) and FIG. 17(B).

The standard gap 314 of FIGS. 17(A) and 18(A) in Example 3 can be set in advance by trial and error to a width at which wide and narrow can be appropriately distinguished, using as a basis the gap between fingers easily operated by the operator when wide and narrow two-point touches are performed. According to the present invention, the width between the touch position in a two-point touch can be utilized as input information, as shown in Example 3. A touch position change while a two-point touch state is continued can also be utilized as input information.

Figure 19:
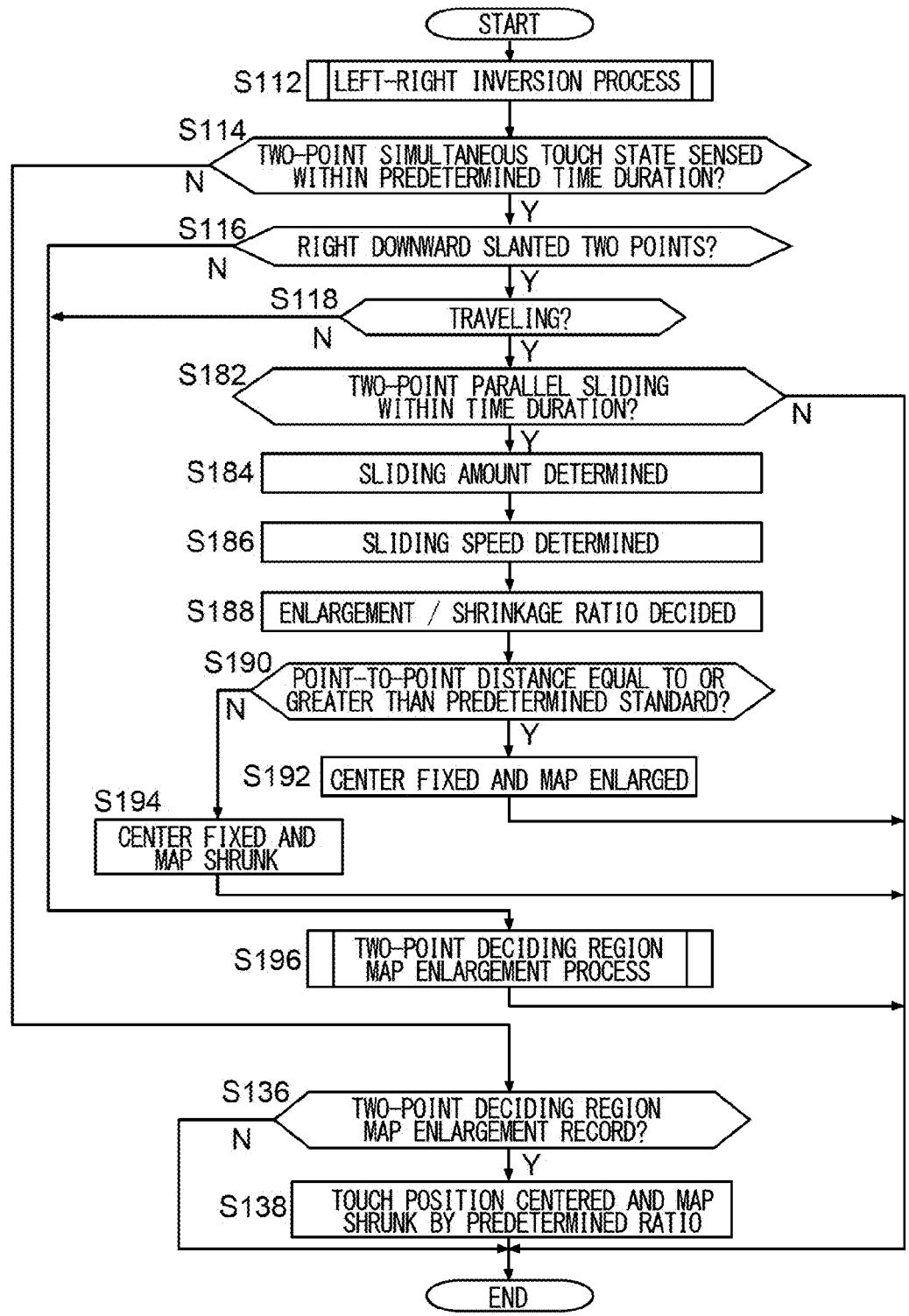
FIG. 19 A flowchart showing the details of the map touch process of step S24 of FIG. 10 cited in Example 3.

FIG. 19 is a flowchart showing the details of the map touch process of step S24 of FIG. 10 in the case of Example 3. Since a large portion is common with FIG. 13 relating to Example 1, common steps are denoted by common step numbers, and descriptions are omitted as long as they are not necessary. To be more specific, steps S112 through S118, step S136, and step S138 in FIG. 19 are common with FIG. 13. As described above, Example 3 relates to a left-hand operation by the driver while driving, and the process after traveling is detected in step S118 in FIG. 19 is therefore different from FIG. 13. The process of this portion is associated with the operation shown in FIGS. 17 and 18.

In FIG. 19, when it is sensed in step S118 that the vehicle is traveling, step S182 proceeds and a check is made as to whether or not there has been a parallel slide while the two-point touch is continued within a predetermined time duration following the sensing of a two-point simultaneous touch state in step S114. When a parallel slide is sensed, step S184 proceeds, and a sliding amount is determined which is equivalent to the white arrows 308, 310 of FIG. 17(A) or the white arrows 320, 322 of FIG. 18(A). Also determined in step S186 is the sliding speed in the white arrows 308, 310 or the white arrows 320, 322.

Next, in step S188, the sliding amount determined in step S184 and the sliding speed determined in step S186 are multiplied, and the enlargement ratio or shrinkage ratio of the map is decided based on the product thereof. In other words, when the sliding amount is the same and the sliding speed is doubled, or when the sliding amount is doubled and the sliding speed is the same, for example, the enlargement ratio or the shrinkage ratio decided in step S188 is doubled. When the sliding amount and sliding speed are both doubled, for example, the enlargement ratio or shrinkage ratio determined in step S188 is quadrupled. As described above, the sliding amount and sliding speed are both information of the sliding state, and in step S188, the gentler the sliding in terms of sensation, the lesser the extent of the determined enlargement or shrinkage and the more delicate the adjustment, and the more forceful the sliding in terms of sensation, the greater the enlargement or shrinkage.

When the enlargement ratio or shrinkage ratio is decided in step S188, step S190 proceeds, and a check is made as to whether or not the distance between the two touched points is equal to or greater than a predetermined standard. This predetermined standard is equivalent to the standard gap 214 of FIG. 17(A) or 18(A). When it is ascertained in step S190 that the point-to-point distance is equal to or greater than the predetermined standard, step S192 proceeds, the center is kept in place, the map is enlarged based on the enlargement ratio decided in step S188, and the flow is ended. When it is ascertained in step S190 that the point-to-point distance is less than the predetermined standard, step S194 proceeds, the center is kept in place, the map is shrunk based on the shrinkage ratio decided in step S188, and the flow is ended.

Step S196 of FIG. 19 is shown as a two-point deciding region map enlargement process summarizing steps S128 through S134 of FIG. 13, the contents of which are the same as FIG. 13. In other words, step S196 of FIG. 19, similar to FIG. 13, is executed by a left downward slanted two-point touch being sensed in step S116 (in other words, a right downward slanted two-point touch not being detected). Based on the absolute positions of the two touched points, the map within the region decided by the two points is enlarged to fill most of the display part 12, and the flow is ended.

The various features of the present invention are not limited to the examples above and can be widely utilized. For example, Example 3 is configured so that information is inputted by determining the width of the two touched points and by sliding the two points in a parallel movement, as in FIGS. 17 and 18. This is to prevent mistaken input when two points are touched unintentionally and to execute input pending sliding after a two-point touch, but in cases in which quick input is prioritized, the configuration may be designed so that input is executed immediately at the time point when the two-point touch is sensed. In this case, steps S182 to S188 are omitted from the flow of FIG. 19, and determination of the point-to-point distance in step S190 begins immediately after the vehicle is sensed to be traveling in step S118.

EXAMPLE 4

Figure 20:
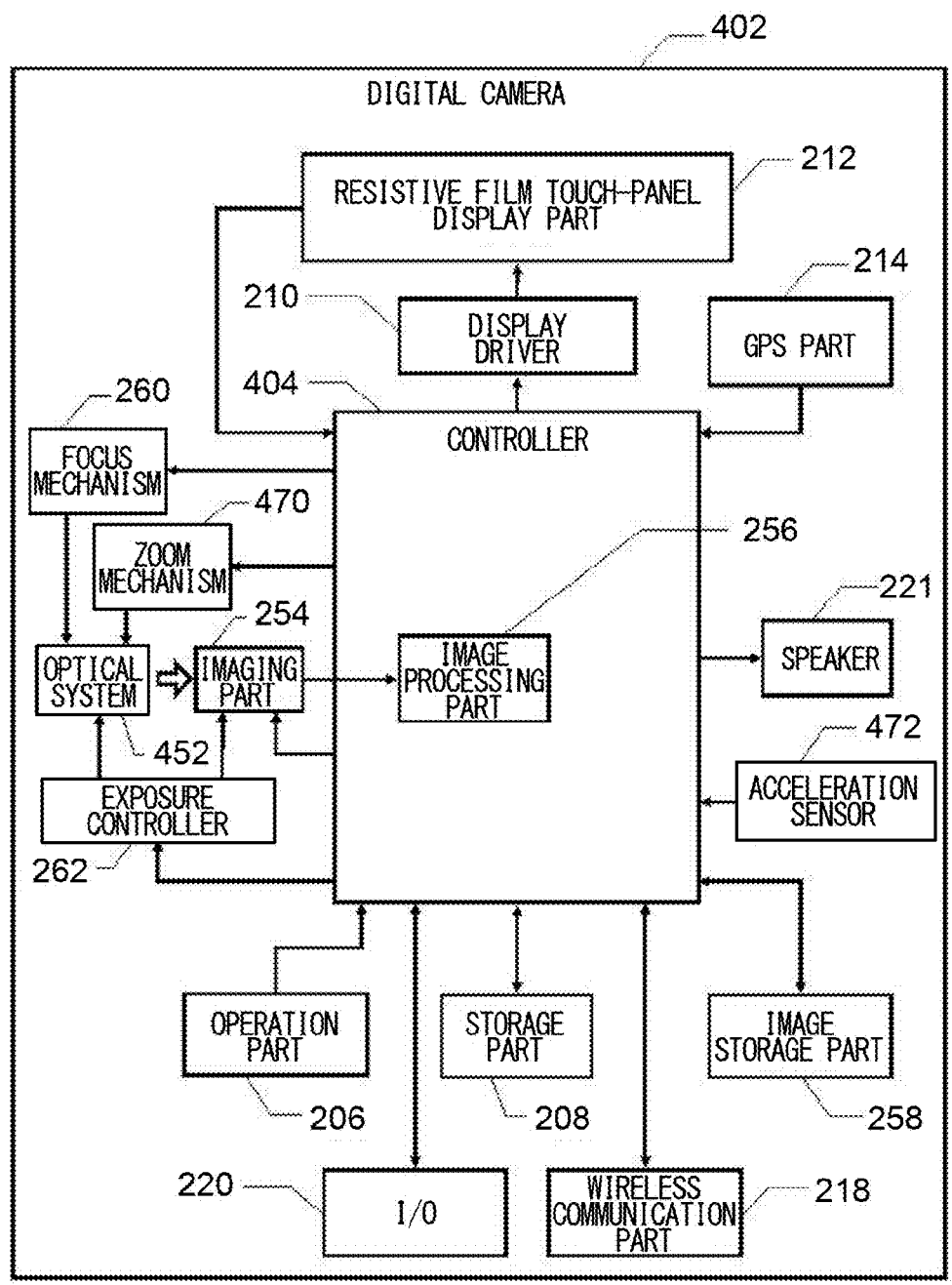
FIG. 20 A block diagram showing Example 4 of the touch-panel input device according to an embodiment of the present invention (Example 4).

FIG. 20 is a block diagram showing Example 4 of the touch-panel input device according to an embodiment of the present invention. Example 4 constitutes a digital camera 402, but most of the contents are the same as the digital camera 202 in Example 2 of FIG. 14. Consequently, common portions are denoted by common numbers and are not described. Although the configuration is slightly different, portions that can be comprehended corresponding to Example 2 are given reference numbers of 400 added to the common numbers in the tens and ones columns, and descriptions are added hereinbelow as necessary. These additionally described portions are not unique to Example 4 alone, and it is optional to also configure Example 2 having such configurations.

While also the case in Example 2 of FIG. 14, the resistive film touch-panel display part 212 of Example 4 of FIG. 20 is a large part provided over nearly the entire back surface of the digital camera 402, and when an optical system 452 is taken in both hands and pointed toward a subject, the subject image can be observed from the back surface of the digital camera 402, and the resistive film touch-panel display part 212 can be naturally touched with the thumbs of both hands holding the digital camera 402.

In Example 4 of FIG. 20, the optical system 452 is a zoom lens system, and optical zooming is performed by a zoom mechanism 470 driving the lens configuration of the optical system 452 to change the focal point distance thereof by the control of a controller 404. Zooming is operated by touching the resistive film touch-panel display part 212, and in accordance with this operation, zooming is executed not only by an optical zoom by the optical system 452 such as that described above, but also by an electronic zoom by the image processing part 256. As described above, the zoom operation can be performed naturally by the thumbs of both hands on the resistive film touch-panel display part 212 while the digital camera 402 is held in both hands and pointed towards a subject to observe the subject.

Furthermore, an acceleration sensor 472 is capable of detecting orientation changes in the digital camera 402 as well as sensing gravitational acceleration in a standstill state, and the acceleration sensor 472 detects whether the zooming operation in the resistive film touch-panel display part 212 is performed with the digital camera 402 taken vertically or taken horizontally. The zoom operation by the resistive film touch-panel display part 212 is explained in detail hereinbelow.

FIG. 21(A) and FIG. 21(B) is a screen view showing a subject image displayed on the resistive film touch-panel display part 212 in a state in which the digital camera 402 of Example 4 is taken horizontally in both hands, and shown herein is the manner in which the subject image is enlarged by zooming in. To be more specific, FIG. 21(A) shows a state in which the left and right edges of a range 478 to be enlarged are indicated by touching the resistive film touch-panel display part 212 with the thumb 474 of the right hand and the thumb 476 of the left hand when the digital camera 402 is held in both hands, and the thumbs 474 and 476 are then slid outward as shown by the arrows 480 and 482 while the touch is continued to increase the horizontal distance between the two touched points.

When the thumbs 474 and 476 of both hands are then removed from the resistive film touch-panel display part 212 at any desired point in time during the sliding, in response, the enlarging range 478 indicated in the state of FIG. 21(A) is enlarged and displayed as an enlarged image 484 to fill most of the screen of the resistive film touch-panel display part 212 as in FIG. 21(B). When the thumbs 474 and 476 are slid apart beyond the limits of the resistive film touch-panel display part 212 while remaining touched to the rear surface of the digital camera 402, this is also discerned as the thumbs 474 and 476 of both hands being removed from the resistive film touch-panel display part 212.

The sliding operation of FIG. 21(A), in which the point-to-point horizontal distance is increased after the two-point simultaneous touch by the thumbs 474 and 476 of both hands, may be performed at any desired speed. Specifically, the enlargement ratio from FIG. 21(A) to FIG. 21(B)

depends solely on the size of the enlarging range 478 in FIG. 21(A), and a zoom in is performed at the maximum processable speed until the enlarging range 478 is enlarged to fill most of the screen of the resistive film touch-panel display part 212, regardless of the sliding speed of the thumbs 474 and 476 of both hands. When this zoom in cannot be handled by an optical zoom at this time, an electronic zoom is also recruited. When the enlarging range 478 is too small and the zoom capacity range to which it is enlarged to fill most of the screen is exceeded, the zoom in is stopped at the time point when the maximum enlargement possible is performed.

The indication of the enlarging range 478 in FIG. 21(A) in the above description is ultimately a criterion of the enlargement ratio, and it is not that there is an enlargement as in FIG. 21(B) of the enlarging range 478 itself (hereinbelow referred to suitably as the section 478), which is the absolute positions indicated by the right hand thumb 474 and the left hand thumb 476. In other words, the enlargement is performed concentrically based on the horizontal distance between the left and right edges regardless of the absolute positions of the section 478. This is because the optical zoom by nature is performed concentrically around the center of the image. Originally, it is difficult to accurately indicate the screen center portion by the right hand thumb 474 and the left hand thumb 476, but the enlargement ratio can thereby be indicated in terms of sensation without regard to the absolute positions of the section 478. Consequently, in extreme cases, even when the section 478 is far displaced to the left or right, the information of the section 478 is employed using the horizontal distances between its left and right edges as information for calculating the enlargement ratio, and is not employed as absolute position information for cutting out and enlarging the section 478 as in FIG. 21(B). Thus, section-indicating information in the zoom operation of the present invention has a different meaning than cutting-away information for part of the image. In an electronic zoom, the portion of the indicated section 478 can be cut out and enlarged based on the absolute positions of the section, but for the sake of consistency with the optical zoom such as is described above, the electronic zoom in Example 4 is also configured so that indicating information of the section 478 is treated as relative information for calculating the enlargement ratio rather than as absolute information for cutting away the image. Consequently, enlargement with an electronic zoom is performed concentrically according to the calculated enlargement ratio regardless of the absolute positions of the section 478.

Figure 21:
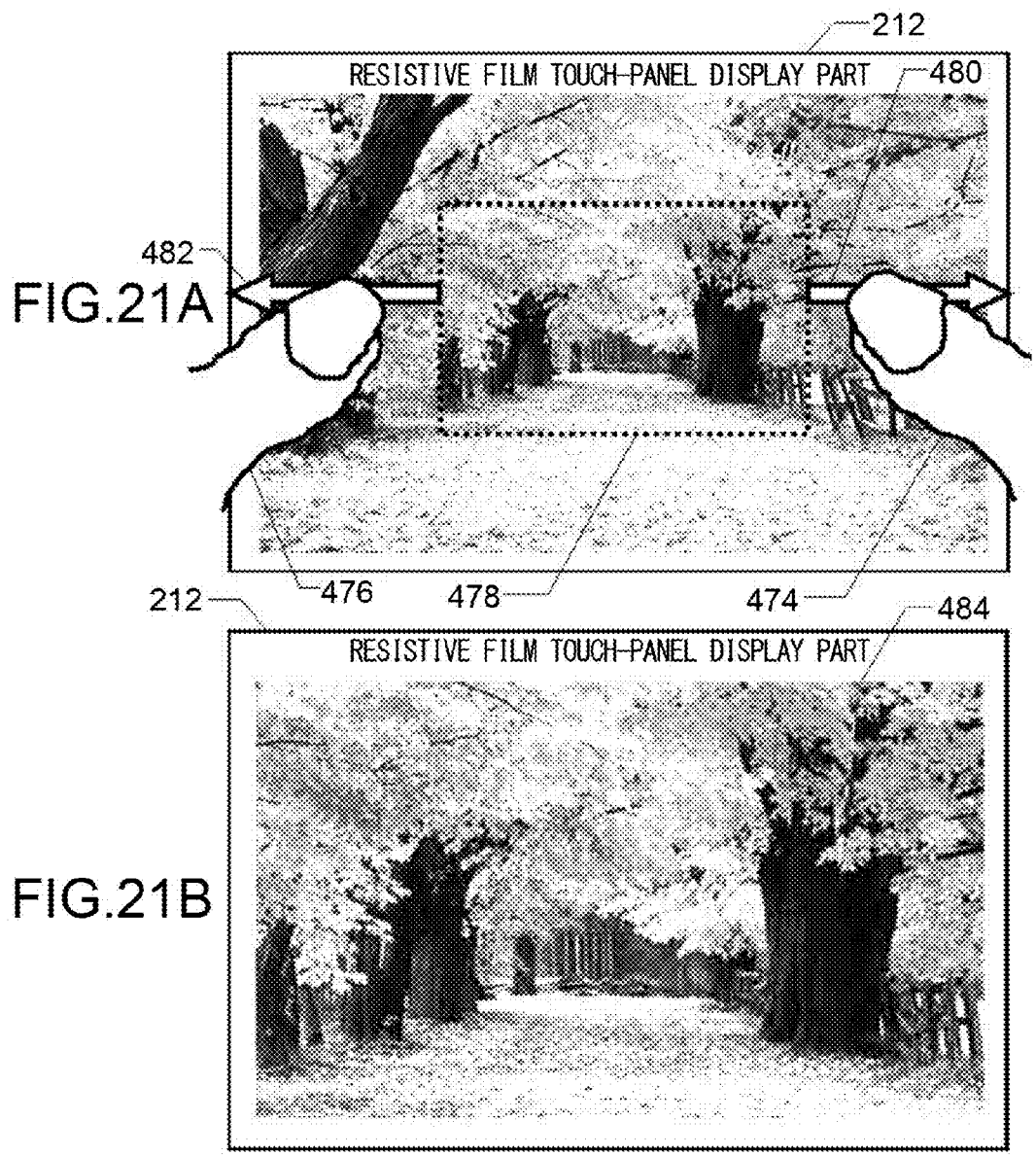
FIG. 21(A) and FIG. 21(B) A screen view showing a subject image during enlargement zooming displayed in a horizontal state on the resistive film touch-panel display part of Example 4.
Figure 22:
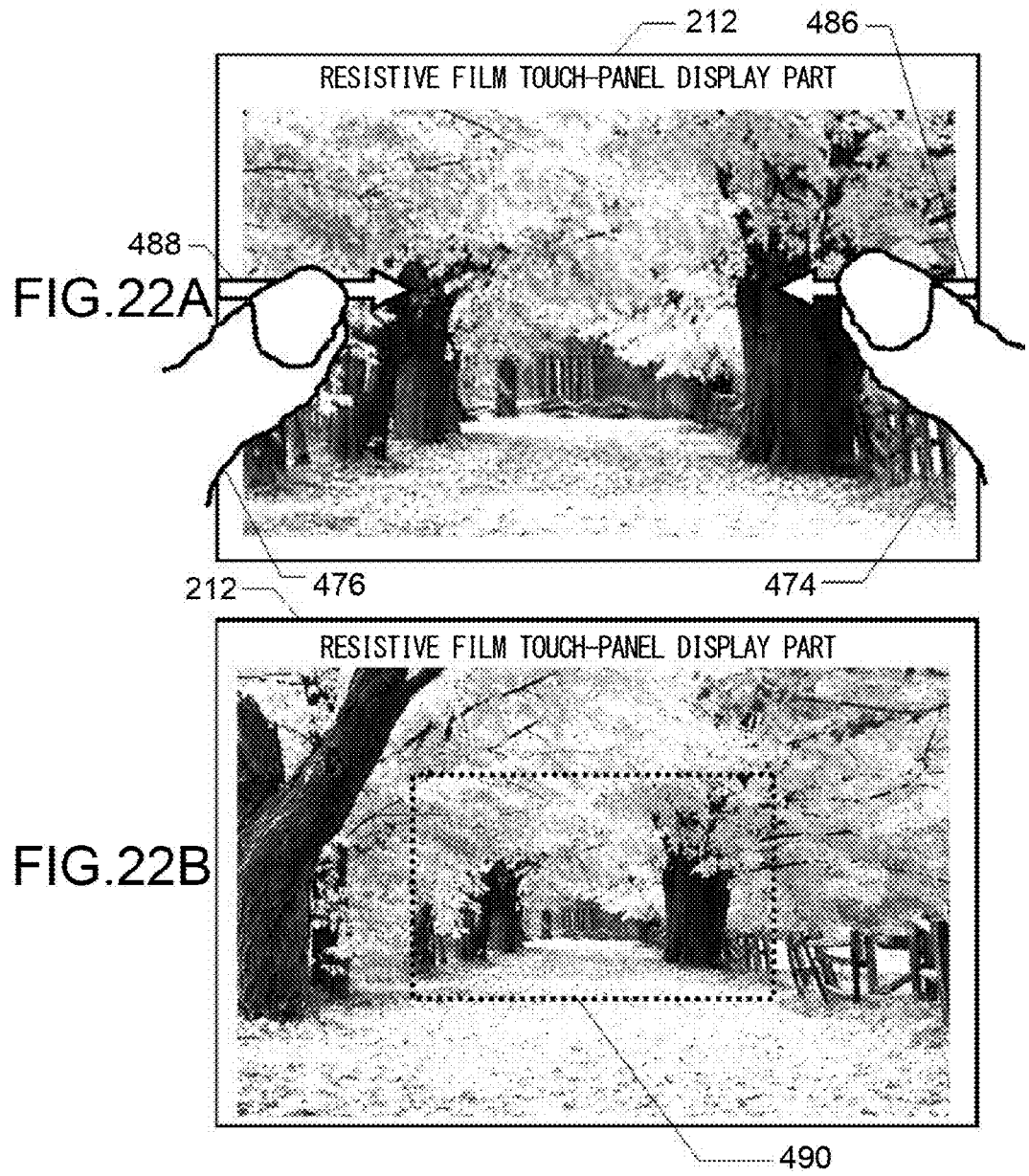
FIG. 22(A) and FIG. 22(B) A screen view showing a subject image during shrinking zooming displayed in a horizontal state on the resistive film touch-panel display part of Example 4.

FIG. 22 is a screen view showing a subject image displayed on the resistive film touch-panel display part 212 in a state in which the digital camera 402 of Example 4 is taken horizontally in both hands, similar to FIG. 21(A) and FIG. 21(B), wherein the manner in which the subject image is shrunk by zooming out is shown. To be more specific, FIG. 22(A) shows a state in which the resistive film touch-panel display part 212 is touched with the thumb 474 of the right hand and the thumb 476 of the left hand when the digital camera is held in both hands, and the thumbs 474 and 476 of both hands are then slid inward as shown by the arrows 486 and 488 while the touch is continued to reduce the horizontal distance between the two touched points.

When the thumbs 474 and 476 of both hands are then removed from the resistive film touch-panel display part 212 at any desired point in time during the sliding, in response, the portion displayed in most of the screen in FIG. 22(A) is shrunk to the corresponding portion 490 of FIG. 22(B), and an image of a wider shooting range is displayed on the resistive film touch-panel display part 212. When such shrinking takes place, the image outside of the corresponding portion 490 in FIG. 22(B) is not visible in the state of FIG. 22(A) before shrinking, and indicating a shrinkage indication as a section on the screen would have little intuitive significance. The shrinkage ratio in this case of shrinkage is then decided by the product of the movement amount and movement speed of the arrows 486 and 488 of FIG. 22(A). For example, when the movement amount is the same and the movement speed is doubled, or when the movement amount is doubled and the movement speed is the same, the shrinkage ratio is doubled; and when both are doubled, the shrinkage ratio is quadrupled. The shrinkage ratio can thereby be indicated intuitively in conjunction with the movement of the thumbs 474 and 476 of both hands.

As described above, Example 4 is configured so that indication is performed by the enlarged range being indicated within the screen by the initial finger touch positions as in FIG. 21(A) when the enlargement ratio is indicated, or by the extent of the force of the movement of the fingers as in FIG. 22(A) when the shrinkage ratio is indicated, so as to be in accordance with the intuition of the operator. However, the configuration may be designed so that either the ratios of both enlargement and shrinkage are indicated by the initial finger touch positions, or enlargement and shrinkage are both performed according to the extent of the force of the finger movements. In either case, the user can intuitively perform the desired zoom by drawing the thumbs of both hands apart or together after touching the screen, even without knowing the general rules whereby the enlargement ratio and shrinkage ratio are indicated. When the zoom is insufficient or excessive, the inverse operation can be performed to correct this, and the appropriate finger movements can be perceived by thus becoming familiar with the operations.

Figure 23:
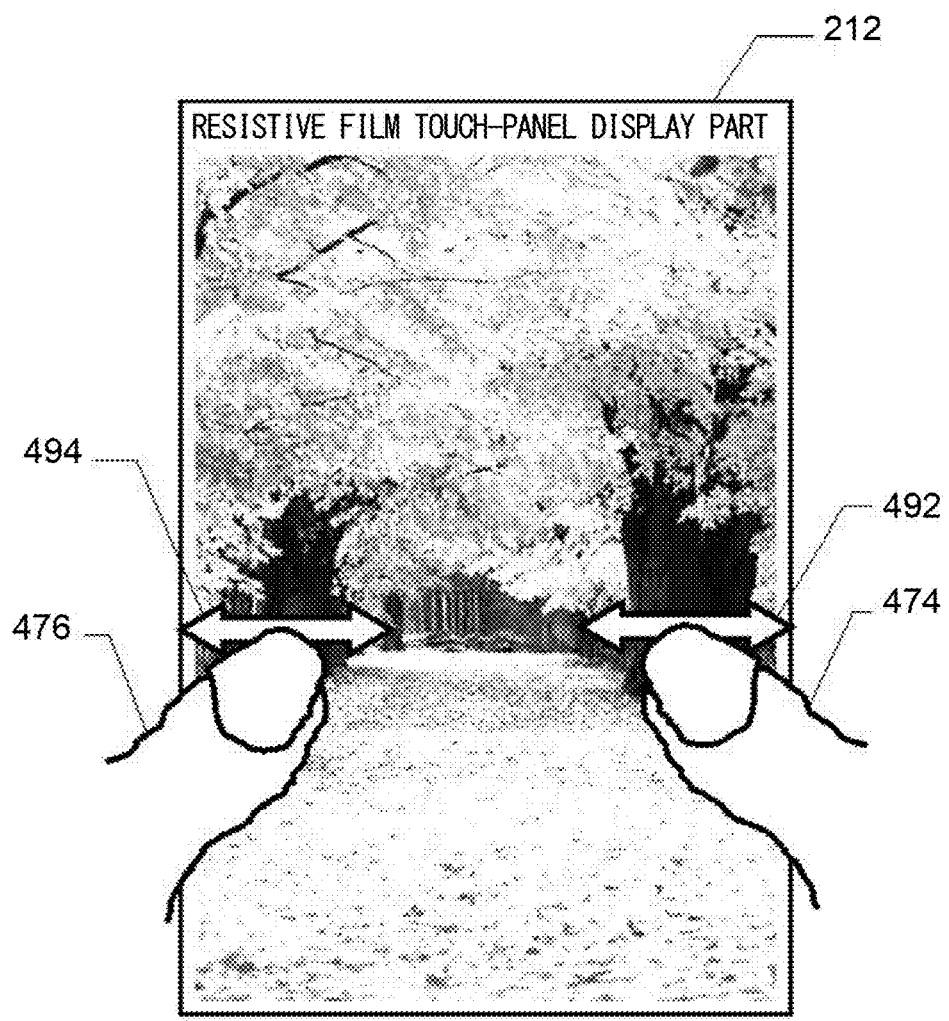
FIG. 23 A screen view showing a subject image during zooming displayed in a vertical state on the resistive film touch-panel display part of Example 4.

FIG. 23 is a screen view showing a subject image displayed on the resistive film touch-panel display part 212 in a state in which the digital camera 402 of the controller 4 is taken vertically in both hands. In this case as well, zooming in and zooming out can be performed according to the increase or decrease in the horizontal distance between the two touched points on the resistive film touch-panel display part 212 by the horizontal movement of the right hand thumb 474 and the left hand thumb 476 shown respectively by the arrow 492 and the arrow 494. At this time, a direction parallel to the short edges of the resistive film touch-panel display part 212 is assessed to be the horizontal direction by the gravitational acceleration sensing by the acceleration sensor 472 of FIG. 20. Thus, a change in the point-to-point distance parallel to the long edges of the resistive film touch-panel display part 212 in FIGS. 21 and 22, and a change in the point-to-point distance parallel to the short edges of the resistive film touch-panel display part 212 in FIG. 23, are both detected as zoom operations by vertical and horizontal direction sensing by the acceleration sensor 472. The details of zooming in and zooming out in the vertical position holding state in FIG. 23 are the same as those of the operation in the horizontal position holding state in FIGS. 21 and 22 and are therefore not described.

Figure 24:
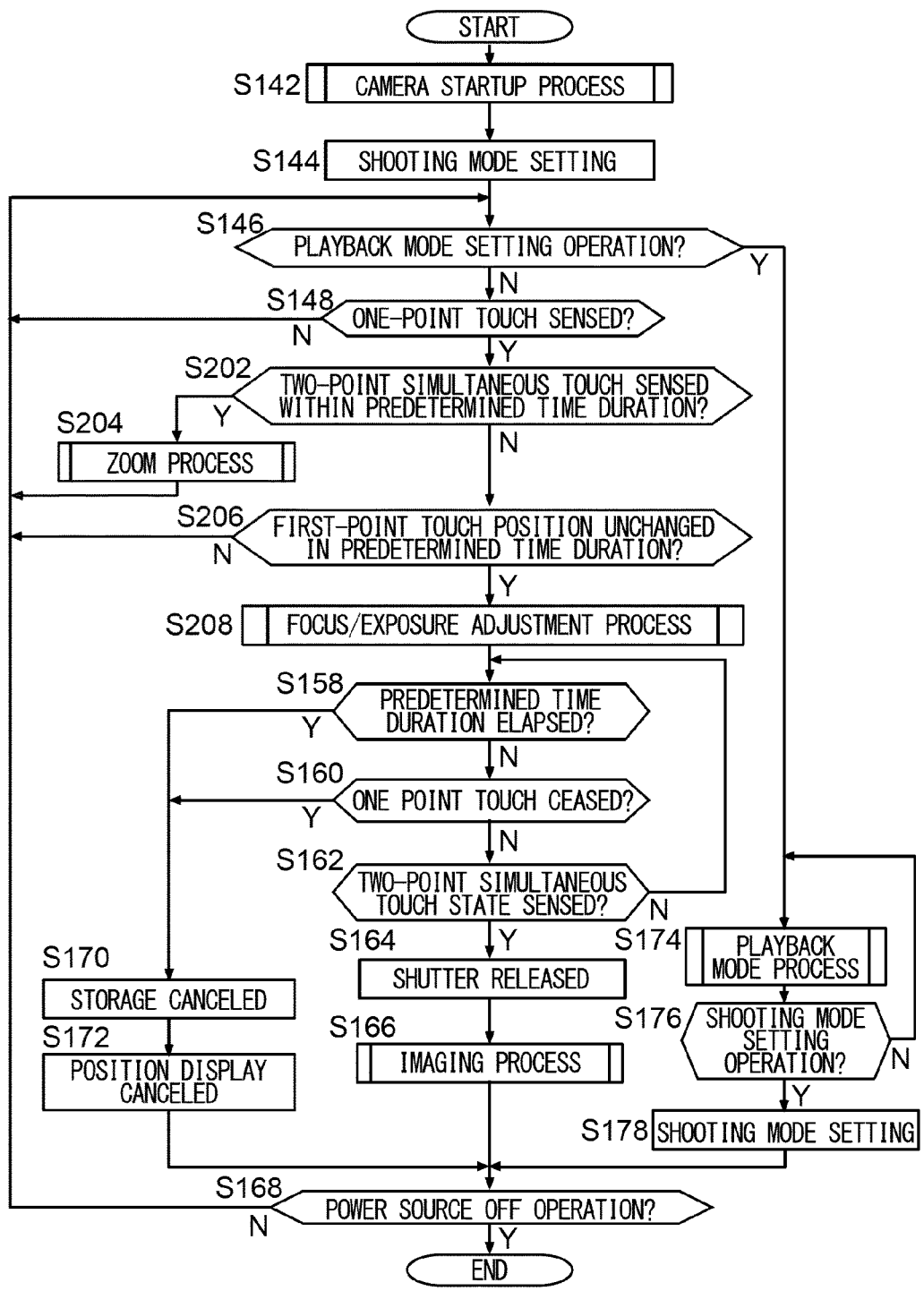
FIG. 24 A flowchart of the action of the controller in Example 4.

FIG. 24 is a flowchart of the action of the controller 404 in Example 4 of FIG. 20. The flowchart of FIG. 24 has many portions similar to the action of the controller 204 of the digital camera 202 of Example 2 in FIG. 16; therefore, common steps are denoted by the same step numbers and are not described, and the different steps are emphasized in bold print.

In Example 4, the sequence transitions to step S202 when a one-point touch is sensed in step S148, and a check is made as to whether or not a second point is touched and a two-point simultaneous touch state is sensed within a predetermined time duration after sensing of the one-point touch as shown in FIG. 24. This predetermined time duration is set to an extremely short time duration (e.g., 0.5 seconds), the design is such that some amount of deviation is allowed within this predetermined time duration assuming the operator's intention is a two-point simultaneous touch, and this deviation is discerned as a two-point simultaneous touch. In other words, the objective of the setup of step S202 is to distinguish between the operator intentionally touching a second point after the first point touch, and the operator intending a two-point simultaneous touch. When a substantial two-point simultaneous touch is sensed in step S202, the zoom process of step S204 proceeds, and when this is complete, step S146 is resumed. The above-mentioned steps S202 and S204 are equivalent to the zoom functions by simultaneous touching of the thumbs 474 and 476 of both hands described in FIGS. 21 to 23, and the details of step S204 are explained hereinafter.

In the case that a two-point simultaneous touch is not sensed within the predetermined time duration in step S202, step S206 proceeds and a check is made as to whether or not the first point touch position sensed in step S148 has remained unchanged for a predetermined time duration. This means that when step S206 is reached from step S148 via step S202, it is assumed that the operation is to indicate the focus and exposure adjustment position in the subject, and a check is made as to whether or not this position has been maintained without deviation from the predetermined time duration. The predetermined time duration in step S206 is one second, for example, and this is set as a natural time duration width in which the operator stops their finger on the touch position with the intention of indicating the focus and the exposure adjustment position. When the first-point touch position is ascertained in step S206 to have remained unchanged for a predetermined time duration, the sequence transitions to the focus and exposure adjustment process of step S208. The content of step S208 is the same as steps S150 to S156 of FIG. 16. When a deviation in the first-point touch position has occurred within the predetermined time duration in step S206, it is assessed to be a mistaken operation of position indication, step S146 is resumed, and the sequence waits for another first-point touch in step S148. In other words, in Example 2 of FIG. 16, focus and exposure adjustment of the touched position are immediately begun after the one-point touch is sensed in step S148, whereas in Example 4 of FIG. 24, focus and exposure adjustment of the one-point touch sensed position are begun upon distinguishing the zoom operation and ascertaining that there has been no mistaken operation.

Figure 25:
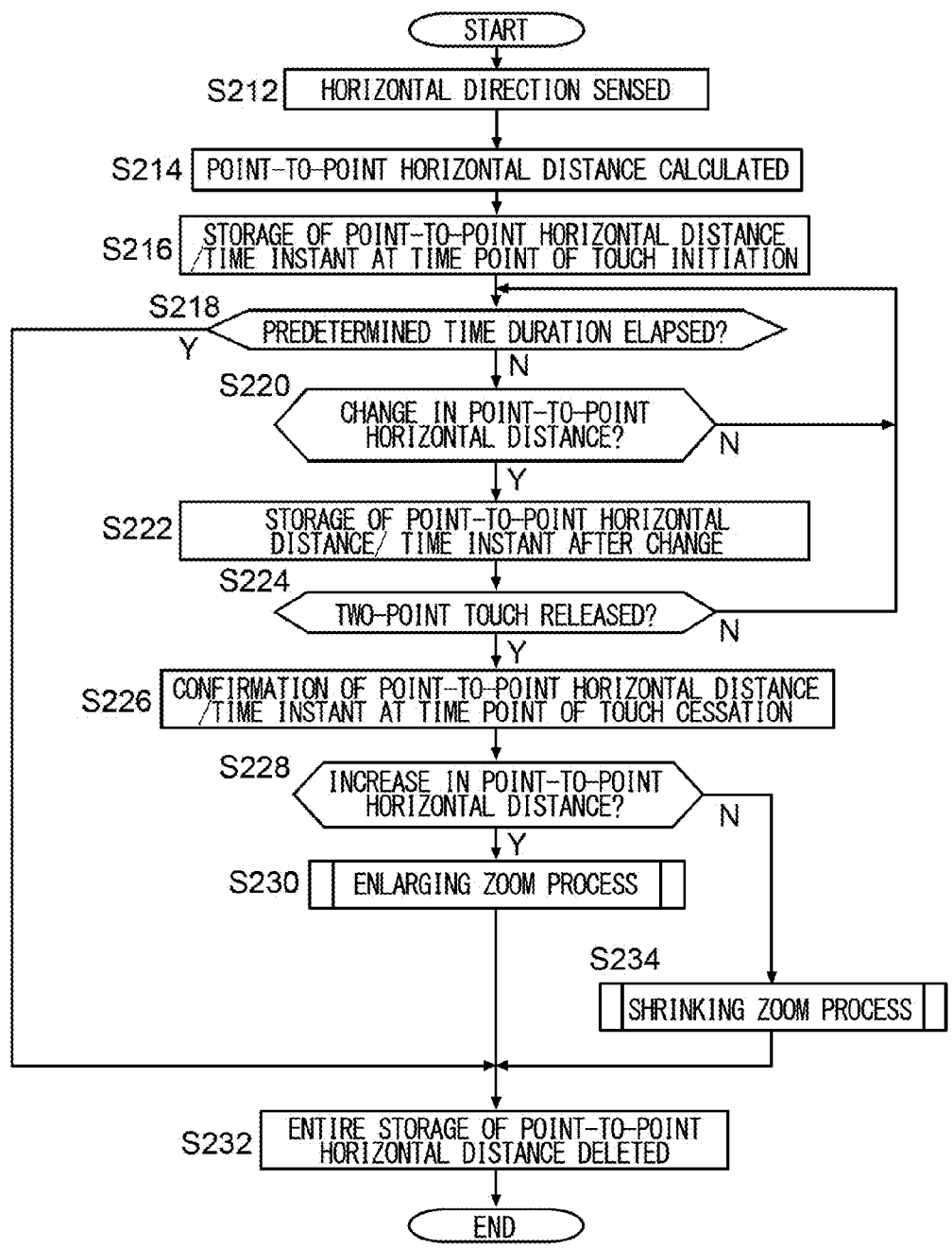
FIG. 25 A flowchart showing the details of step S204 of FIG. 24.

FIG. 25 is a flowchart showing the details of the zoom process in step S204 of FIG. 24. When the flow starts, horizontal direction sensing is first performed by the acceleration sensor 472 in step S121, and the horizontal distance between the two touched points, i.e., the point-to-point distance in a directional component parallel to either the short-edge direction or the long-edge direction of the resistive film touch-panel display part 212, is calculated based on the sensing result. The horizontal directional component alone is thereby calculated as the point-to-point horizontal distance even when the two touched points are misaligned in a perpendicular direction. Step S216 then proceeds, the value calculated in step S214 is stored as the point-to-point horizontal distance at the time point when touch is initiated, and the time instant thereof is stored.

Next, the elapse of a predetermined time duration (e.g., one second) is checked in step S218, step S220 proceeds when it has not elapsed, and a check is made as to whether or not there has been a change in the point-to-point distance as a result of the finger sliding. When a change is sensed, the sequence transitions to step S222, the point-to-point horizontal distance after the change and the time instant thereof are stored, and the sequence transitions to step S224. A check is made in step S224 as to whether or not the two-point touch has ceased, and when it has not ceased, step S218 is resumed. Step S218 is also resumed in the case that there has been no change in the point-to-point horizontal distance in step S220. Steps S218 through S224 are repeated hereinbelow as long as the two-point touch has not ceased until the predetermined time duration elapses, and every time there is a change in the point-to-point horizontal distance, the distance and time instant are updated and stored in step S222.

When a cessation of the two-point touch is sensed in step S224, step S226 proceeds, and the point-to-point horizontal distance at the time instant at the time point of touch cessation are confirmed based on the most recent information of the stored updated result of step S222. A check is then made in step S228 as to whether or not the point-to-point horizontal distance has increased, from a comparison of the horizontal distances between the two points at the time point of touch initiation and the time point of touch ending. When an increase is ascertained, an enlarging zoom process of step S230 is performed, the sequence transitions to step S232, the entire storage associated with the point-to-point horizontal distance is deleted, and the flow is ended. The details of the enlarging zoom process are explained hereinafter. In the case that an increase in the point-to-point horizontal distance is not ascertained in step S228, it means that the point-to-point horizontal distance has decreased, step S234 therefore proceeds, a shrinking zoom process is performed, and the sequence transitions to step S232. The details of the shrinking zoom process are also explained hereinafter. In the case that an elapse of the predetermined time duration is ascertained either while there is no change in the point-to-point horizontal distance in step S218 or while there is a change but the two-point touch does not cease, the sequence transitions directly to step S232, the storage is deleted without performing the zoom operation, and the flow is ended.

Figure 26:
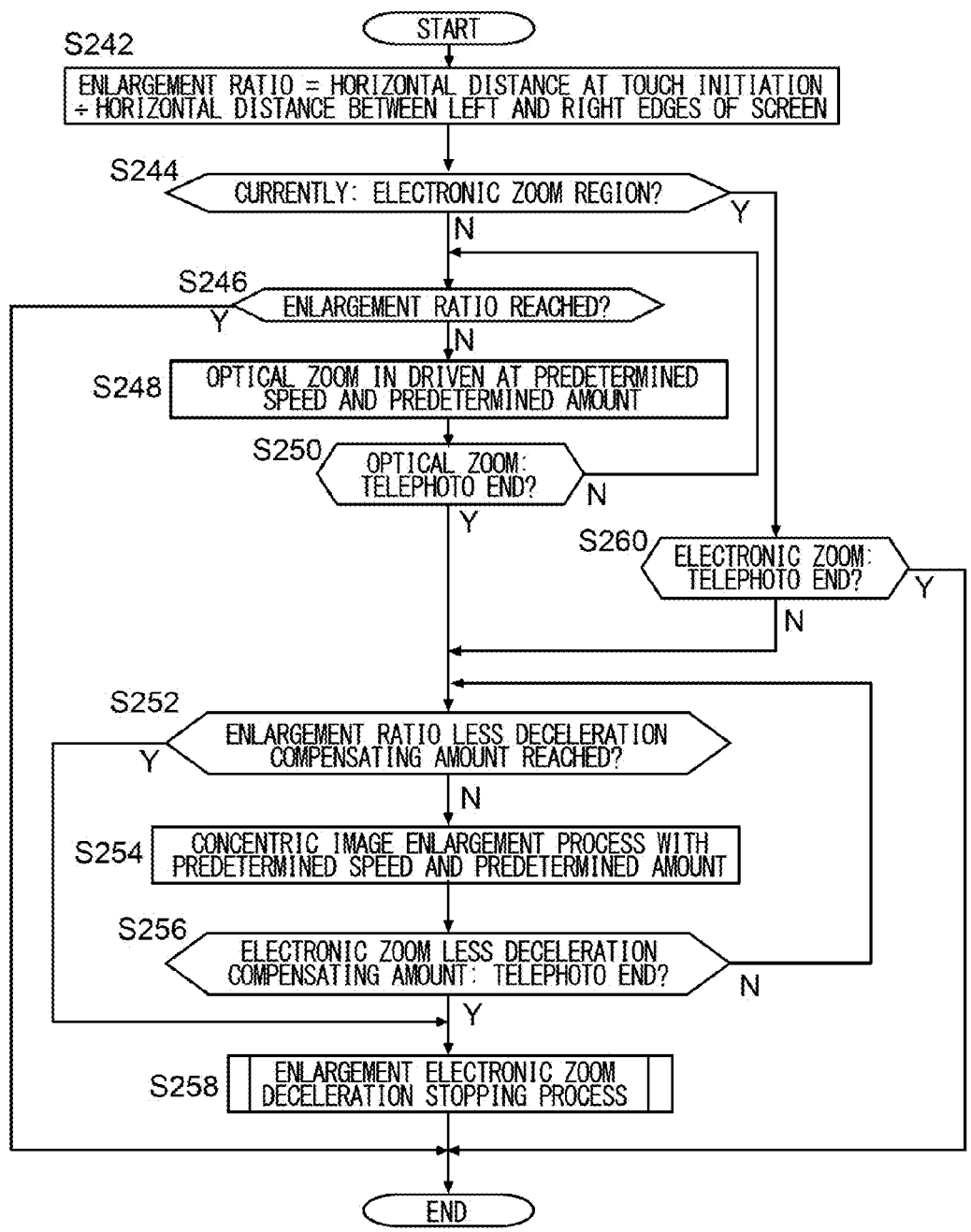
FIG. 26 A flowchart showing the details of step S230 of FIG. 25.

FIG. 26 is a flowchart showing the details of the enlarging zoom process in step S230 of FIG. 25. When the flow starts, the point-to-point horizontal distance at the touch initiation time point is first divided by the horizontal distance between the left and right edges of the resistive film touch-panel display part 212 in step S242, and the enlargement ratio is found. The point-to-point horizontal distance at the touch initiation time point is stored in step S216 of FIG. 25, and is equivalent to the horizontal distance between the left and right edges of the enlargement target range 478 in FIG. 21(A).

Next, in step S244, a check is made as to whether or not the digital camera 402 is currently in an electronic zoom region. Being in an electronic zoom region means a state in which an optical image is zoomed in to a telephoto end (the farthest telescoped zoom end) by optical zooming and the image is then further enlarged by image processing. When the camera is not in an electronic zoom region, step S246 proceeds because it is possible to zoom in to the telephoto side by optical zooming, and a check is made as to whether or not the enlargement ratio calculated in step S242 has been reached. At the initiation of zooming in, the enlargement ratio has of course initially not yet been reached, step S248 therefore proceeds, and the zoom mechanism 470 is driven at a predetermined speed (the maximum speed of which the mechanical structure is capable) to perform a predetermined amount (the smallest unit possible) of zooming in. Next, in step S250, a check is made as to whether or not the optical zooming has reached the telephoto end, and when the telephoto end has not been reached, step S246 is resumed and steps S246 through S250 are repeated until either the enlargement ratio is reached or the optical zooming reaches the telephoto end.

When the enlargement ratio is ascertained to have been reached in step S246, the desired zoom in will have been successfully achieved, and the flow therefore ends immediately. When it is ascertained in step S250 that the optical zooming has not reached the telephoto end, the enlargement ratio cannot be achieved with optical zooming alone, and the sequence therefore transitions to step S252. In step S252, a check is made as to whether or not an enlargement ratio less an amount compensating for zoom-in deceleration has been achieved. This deceleration compensating amount, which is for eliminating any sense of disorder between optical zooming and electronic zooming, reduces the zoom speed near the end of electronic zooming and imitates the mechanical drive stopping of optical zooming. The term "deceleration compensating amount" means a ratio change amount for compensating for this deceleration in electronic zooming.

In the case that it is not ascertained in step S252 that an enlargement ratio less the deceleration compensating amount of zooming was achieved, step S254 proceeds, and zooming in is performed with a predetermined enlargement amount and enlargement speed that resemble the maximum speed of optical zooming. Enlargement in this case is performed concentrically with the image center as a standard. Next, in step S256, a check is made as to whether or not electronic zooming has reached an enlargement limit (a telephoto end) less the deceleration compensating amount of zooming in, and when the telephoto end has not been reached, step S252 is resumed and steps S252 through S256 are repeated until electronic zooming reaches either the enlargement ratio less the deceleration compensating amount or the telephoto end. When it is ascertained in step S252 that the enlargement ratio less the deceleration compensating amount has been reached, step S258 proceeds, the rest of the enlargement process is performed to achieve the enlargement ratio by an enlargement electronic zoom deceleration stopping process, and the flow is ended. In step S256, also in the case that the electronic zooming is ascertained to have reached the telephoto end with the deceleration compensating amount having been subtracted, step S258 proceeds, the rest of the enlargement process is performed to achieve the enlargement ratio by an enlargement electronic zoom deceleration stopping process, and the flow is ended.

When an electronic zoom region is currently sensed in step S244, step S260 proceeds and a check is performed as to whether or not the electronic zoom is already in the telephoto end. When it is not in the telephoto end, step S252 proceeds, and hereinbelow the same process is executed as that leading to step S252 via optical zooming in the above description. In the case that it is ascertained in step S260 that the electronic zoom has reached the telephoto end, the flow is ended immediately.

Figure 27:
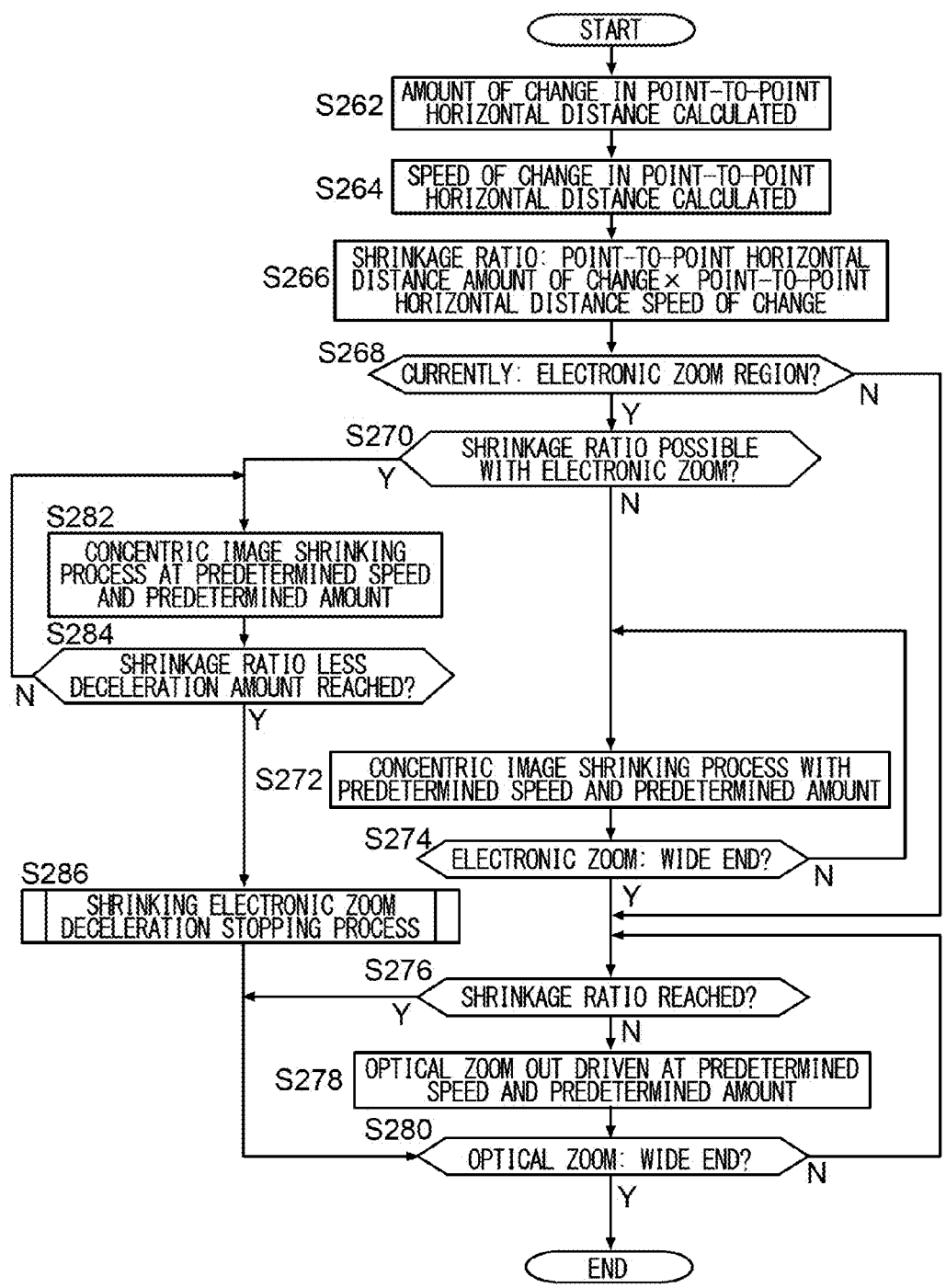
FIG. 27 A flowchart showing the details of step S234 of FIG. 25.

FIG. 27 is a flowchart showing the details of the shrinking zoom process in step S234 of FIG. 25. When the flow starts, first, the amount of change in the point-to-point horizontal distance is calculated in step S262, and the speed of change in the point-to-point horizontal distance is calculated in step S264. These calculations are based on the stored values in steps S216 and S222 of FIG. 25. In step S266, the shrinkage ratio is found based on the product of the amount of change and the speed of change in the point-to-point horizontal distance.

Next, in step S268, a check is made as to whether or not the digital camera 402 is currently in the electronic zoom region. When the camera is sensed as currently being in the electronic zoom region, step S270 proceeds, and a check is made as to whether or not the shrinkage ratio calculated in step S266 is achievable with electronic zooming. This means that the shrinkage ratio is too great and will not suffice with the image information that has been imaged, and the check is of whether or not the state is such that the shrinkage ratio cannot be achieved without obtaining wider-angle image information even with optical zooming.

When it is ascertained in step S270 that the shrinkage ratio is not achievable by electronic zooming alone, step S272 proceeds, and a zoom out image process is performed with a predetermined shrinkage speed and shrinkage amount that resemble the maximum speed of optical zooming. A concentric shrinking process with the image center as a standard is performed for the shrinking process of this case as well. Step S274 then proceeds, and a check is performed as to whether or not the electronic zoom is in a wide end which is the limit of the imaging information. When the zoom is not in the wide end, step S272 is resumed, steps S272 and S274 are repeated until the electronic zoom reaches the wide end, and electronic zooming is executed. When the electronic zoom reaches the wide end, the sequence transitions immediately to step S276. Thus, in the case that it is ascertained in advance in step S270 that the shrinkage ratio is not achievable by electronic zooming alone, the sequence immediately transitions to zooming out by optical zooming of step S276 onward without performing the electronic zoom deceleration process.

In step S276, a check is made as to whether or not the shrinkage ratio calculated in step S266 has been reached. Since, as shall be apparent, the shrinkage ratio has not yet been reached at the start of the transition from step S274, step S278 proceeds, and the zoom mechanism 470 is driven to perform a predetermined amount (the smallest possible unit) of zooming out at a predetermined speed (the maximum speed of which the mechanical structure is capable), similar to the case of zooming in. Next, in step S280, a check is made as to whether or not the optical zoom has reached the wide end, and when it has not reached the wide end, step S276 is resumed, and steps S276 through S280 are repeated until wither the shrinkage ratio is reached or the optical zoom reaches the wide end.

When it is ascertained in step S276 that the enlargement ratio is reached, the desired zoom out will have been successfully achieved, and the flow is therefore ended immediately. The flow is ended because any further zooming out is not possible also in the case that it is ascertained in step S280 that the optical zoom has reached the wide end. In the case that it is ascertained in step S268 that the camera is currently not in the electronic zoom region, the sequence transitions immediately to step S276, and zooming out is hereinbelow executed by optical zooming similar to that described in the case of employing electronic zooming of step S274.

When it is ascertained in step S270 the shrinkage ratio calculated in step S266 can be achieved by an electronic zoom, the sequence transitions to step S282, and a zoom out is performed with a predetermined shrinkage speed and shrinkage amount resembling the maximum speed of optical zoom, similar to step S272. The shrinking process of this case is also a concentric shrinking process using the image center as a standard. In step S284, a check is made as to whether or not the shrinkage ratio less a deceleration compensating amount of zooming out has been reached. This zoom out deceleration compensating amount, which is for eliminating any sense of disorder between optical zooming and electronic zooming similar to the case of zooming in, reduces the zoom speed near the end of electronic zooming and imitates the mechanical drive stopping of optical zooming in cases in which the flow from steps S276 and S280 is ended.

In the case that it is not ascertained in step S284 that a shrinkage ratio less the deceleration compensating amount of zooming out was achieved, step S282 is resumed, and steps S282 and S284 are hereinbelow repeated until the electronic zoom reaches the shrinkage ratio less the deceleration compensating amount. When it is ascertained in step S284 that the shrinkage ratio less the deceleration compensating amount has been reached, step S286 proceeds, the rest of the shrinking process is performed by a shrinkage electronic zoom deceleration stopping process to achieve the shrinkage/enlargement ratio, and the flow is ended. Thus, in cases of shrinkage in which the shrinkage ratio can be achieved by an electronic zoom alone, a deceleration stopping process resembling an optical zoom is performed, and in cases of the shrinking process being taken over by optical zooming, the sequence transitions to an optical zoom without performing the deceleration stopping process as described above.

EXAMPLE 5

Figure 28:
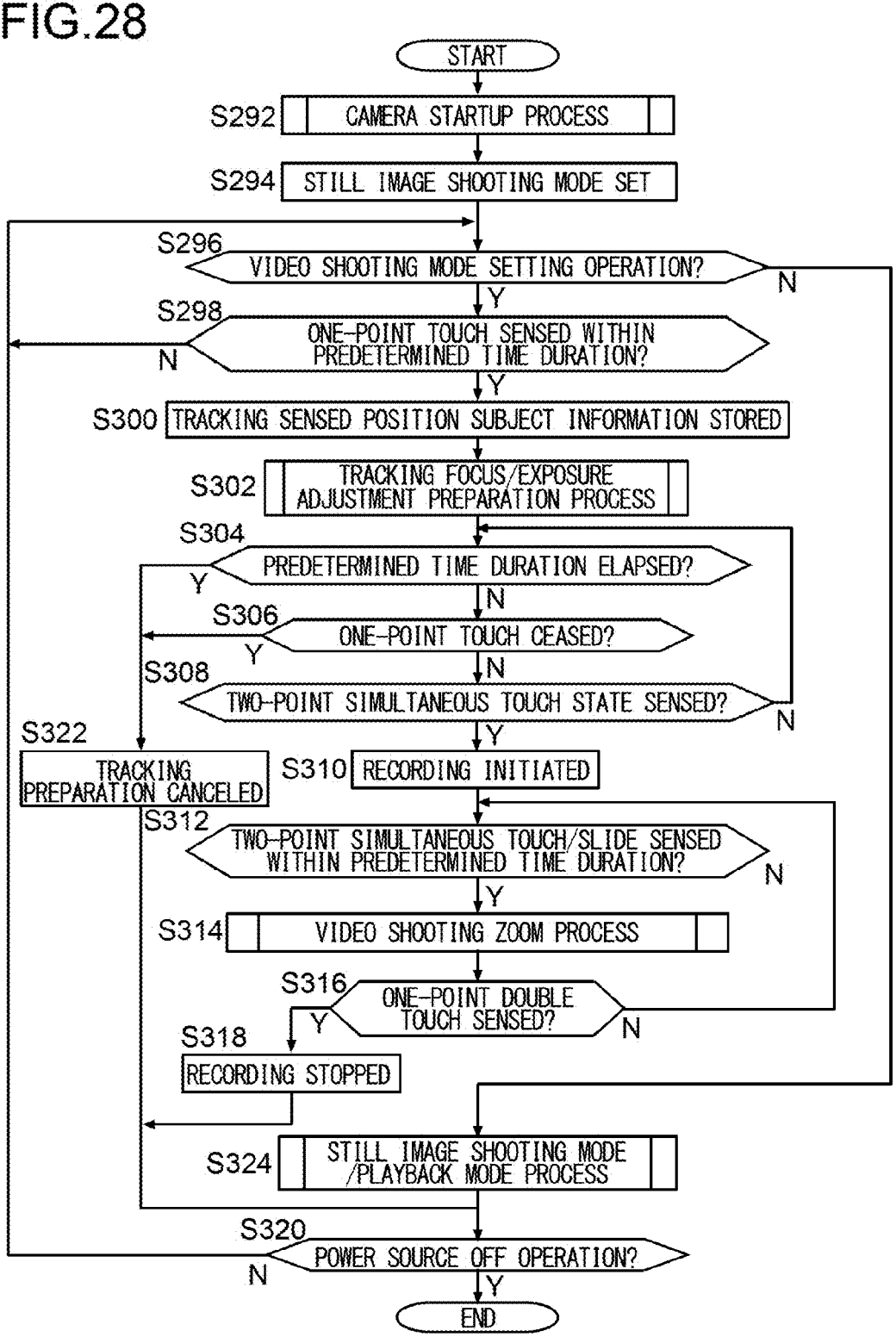
FIG. 28 A flowchart of the action of the controller in Example 5 of the touch-panel input device according to an embodiment of the present invention (Example 5).

Next, Example 5 of the touch-panel input device according to an embodiment of the present invention will be described. Example 5 relates to a digital camera and is configured as an example in which video shooting is also possible in addition to still image shooting. Since the essential configuration is similar to Example 4, FIG. 20 is cited. For zooming operations, zooming in and out are performed by drawing apart or together the thumbs of both hands that have taken the digital camera 402 as in FIGS. 21 and 22. In the case of video shooting, the zooming operation is during shooting instead of before shooting, and operations not only of the zooming destination point, but of mid-zoom progress including the zoom speed as well, are also vital. FIG. 28 is a flowchart describing the function of the controller 404 in a case of citing the configuration of FIG. 20, centering on such a video shooting mode.

In the digital camera 402 of Example 5 as well, the flow of FIG. 28 starts when a power source on operation is performed, a startup process of the digital camera 402 is performed in step S292, a still image shooting mode is set as the initial state in step S294, and the sequence transitions to step S296. A check is made in step S296 as to whether or not a manual operation of the video shooting mode has been performed, and when the operation is sensed, the sequence transitions to step S298.

In step S298, a check is made as to whether or not a one-point touch is sensed within a predetermined time duration following the setting of the video shooting mode. This predetermined time duration is set to a comparatively long time duration of about ten seconds, for example, but when the elapse of this time duration is sensed in step S298 (in other words, a one-point touch within the predetermined time duration is not sensed), the video shooting mode is temporarily ended and step S296 is resumed. When setting of another video shooting mode is ascertained in step S296, the sequence transitions to step S298, and the sequence waits for a one-point touch to be sensed. When a one-point touch state within the predetermined time duration is sensed in step S298, the sequence transitions to step S300, and subject information in the position where the touch is sensed is stored. In other words, the significance of the one-point touch in the video shooting mode is for storing tracking information of the main subject, and the color, pattern, placement of feature points, and other attributes of the one-point touched portion in the subject displayed on the resistive film touch-panel display part 212 are stored as main subject specific information in step S300.

Next, in step S302, a process is performed for preparing tracking focus and tracking exposure adjustment pertaining to the main subject in the video shooting on the basis of the information stored in step S300, and step S304 proceeds. The execution of tracking focus and tracking exposure adjustment prepared in step S302 is hereinafter continued from initiation of recording until it is stopped. In step S304, a check is made as to whether or not a predetermined time duration has elapsed following the sensing of a one-point touch in step S298. This predetermined time duration is about two seconds, for example, and is set as a time duration for waiting for video shooting to be initiated by a sensing of a second point touch after the main subject to be tracked has been decided by the first point touch. As is explained hereinafter, in the case that a second point touch is not sensed within this predetermined time duration, the storing of tracking information based on the first point touch is canceled.

When a predetermined time duration elapse is not sensed in step S304, step S306 proceeds and whether or not the one-point touch has ceased is checked. In the case that a one-point touch cessation is not sensed, step S308 proceeds, and a check is made as to whether or not a two-point simultaneous touch state has occurred as a result of a second point being touched while the first point touch is continued. When a two-point simultaneous touch state is sensed, step S310 proceeds and recording is initiated. Thereby, a process is initiated in which video image compression is performed by the image processing part 256 and a compressed image is stored in the image storage part 258, and this is continued until a record stop command. In the case that a two-point simultaneous touch state is not sensed in step S308, step S304 is resumed, and steps S304 through S308 are hereinbelow repeated pending a second point touch as long as the predetermined time duration does not elapse and the one-point touch is not ceased.

When recording is initiated in step S310, a check is made in tandem in step S312 as to whether or not there have been a two-point simultaneous touch and a slide within a predetermined time duration. The predetermined time duration herein is similar to that in step S202 of FIG. 24, and is for sensing an intentional two-point touch operation for zooming by the thumbs of both hands. When this is sensed, a video shooting zoom process of step S314 is performed. The details thereof are explained hereinafter. When the video shooting zoom process of step S314 is complete, whether or not a one-point double touch has been performed is sensed in step S316. This is to prevent a two-point simultaneous touch state from occurring and to sense whether or not the touch has been performed for a predetermined interval, and the double touch position may be anywhere and need not be a touch in the same location. When a double touch is sensed, step S318 proceeds, recording is stopped, and the sequence transitions to step S320. When a one-point double touch is not sensed in step S316, step S312 is resumed and video shooting is continued while a zooming operation is enabled.

When an elapse of the predetermined time duration is sensed in step S304 or when a one-point touch cessation is sensed in step S306, step S322 proceeds, the tracking preparation process in step S302 is canceled, and the sequence transitions to step S320. When a setting of the video shooting mode is not sensed in step S296, the sequence immediately transitions to the still image shooting mode and the playback mode process of step S324. This step S324 is the same process as steps S146 to S148, steps S202 to S208, steps S158 to S166, and steps S170 to S178 of Example 4 in FIG. 24.

Step S320 of FIG. 28 is the same as step S168 of FIG. 24, and a check is made as to whether or not the power source off operation of the digital camera 402 has been performed. When the power source off operation has been sensed, the flow is ended. In the case that there is no sensing of the power source off operation in step S320, the sequence returns to the still image shooting mode and step S296 is resumed. Steps S296 to S320 are repeated hereinbelow as long as the power source off operation is not detected in step S320. Based on the action of the still image shooting mode, the digital camera is adapted to shooting initiation and stopping and the zooming operations in the case that the video shooting mode is set, and to the operation of transitioning to the playback mode and the operation of returning to the still image shooting mode.

Figure 29:
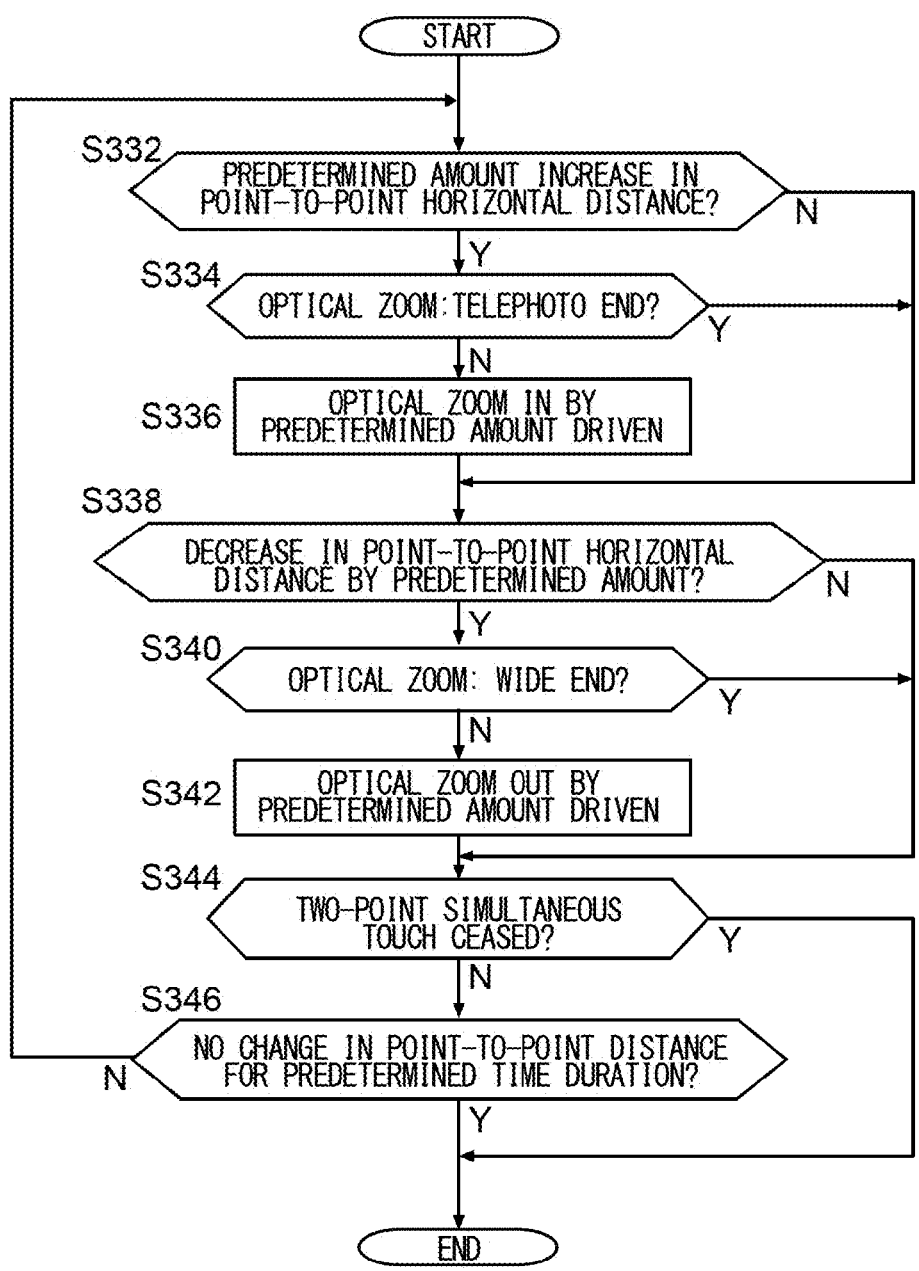
FIG. 29 A flowchart showing the details of step S314 of FIG. 28.

FIG. 29 is a flowchart showing the details of the video shooting zoom process in step S314 of FIG. 28. When the flow starts, first, a check is performed in step S332 as to whether or not the point-to-point horizontal distance has increased by a predetermined amount. The predetermined amount is the smallest unit that can be sensed and controlled. When a predetermined amount increase is sensed in the point-to-point horizontal distance, the sequence transitions to step S334, and whether or not the optical zoom is in the telephoto end is checked. When the zoom is not in the telephoto end, the sequence transitions to step S336, a zoom in is performed by optical zooming by a predetermined amount corresponding to the sensing of step S332, and the sequence transitions to step S338. In the case that a predetermined amount increase of the point-to-point horizontal distance is not sensed in step S332, or in the case that the optical zoom is not sensed as being in the telephoto end in step S334, the sequence transitions directly to step S338.

In step S338, a check is made as to whether or not the point-to-point horizontal distance has decreased by a predetermined amount. This predetermined amount is the smallest unit that can be sensed and controlled. When a decrease of a predetermined amount in the point-to-point horizontal distance is sensed, the sequence transitions to step S340, and whether or not the optical zoom is in the wide end is checked. When the zoom is not in the wide end, the sequence transitions to step S342, a zoom out is performed by optical zooming by a predetermined amount corresponding to the sensing of step S338, and the sequence transitions to step S344. In the case that a predetermined amount decrease of the point-to-point horizontal distance is not sensed in step S338, or in the case that the optical zoom is not sensed as being in the wide end in step S340, the sequence transitions directly to step S344.

In step S344, whether or not the two-point simultaneous touch state has ceased is checked. When a two-point simultaneous touch cessation is sensed, the flow is ended. When a two-point simultaneous touch cessation is not sensed in step S344, step S346 proceeds, and a check is made as to whether or not a state of no change in the point-to-point distance has continued for a predetermined time duration. When this state of no change is sensed, the flow is ended. In the case that a lack of change is not sensed in step S346, the zoom operation is continued, step S332 is therefore resumed, steps S332 through S346 are hereinbelow repeated as long there is no sensing of either a two-point simultaneous touch cessation or a lack of change in the point-to-point distance for a predetermined time duration or longer, and the device is adapted to the zoom operation during video shooting. As is comprehended from the flow, the zoom operation can be zooming in or zooming out as desired. The zoom speed can also be changed as desired by moving the thumbs of both hands which establish the point-to-point horizontal distance.

Figure 30A:
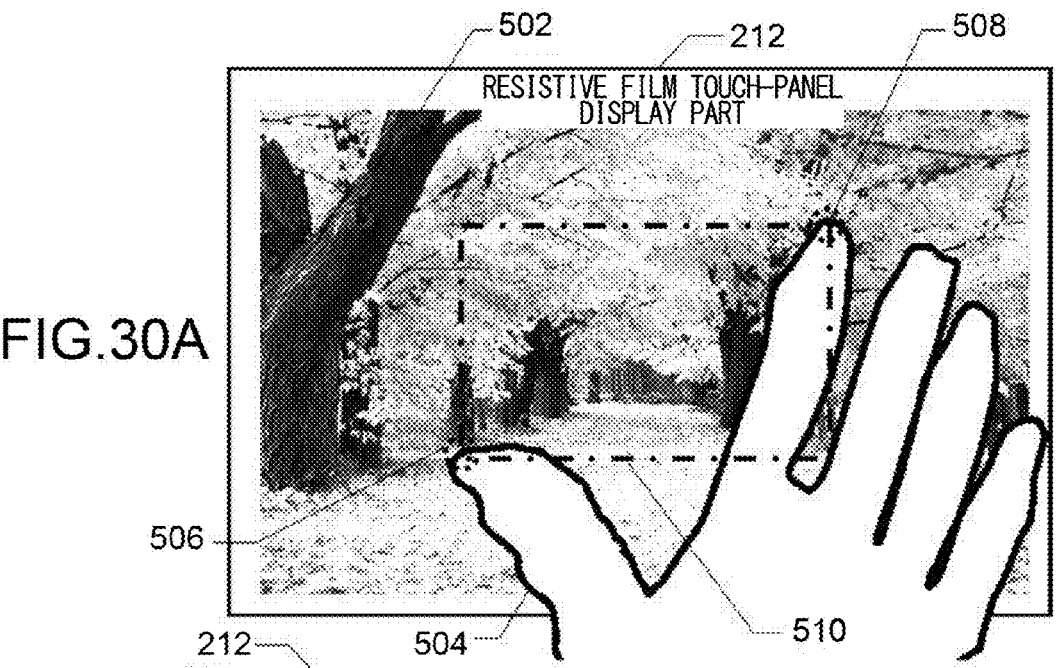
FIG. 30(A) and FIG. 30(B) A screen view showing a playback image displayed on the resistive film touch-panel display part of either Example 2 of FIG. 14 or Example 4 of FIG. 20.
Figure 30B:
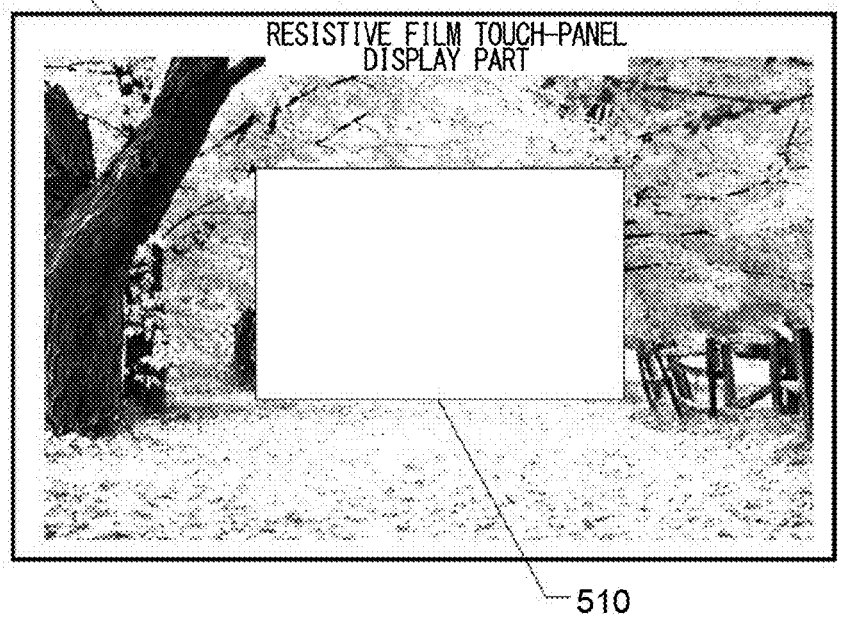

FIG. 30(A) and FIG. 30(B) is a screen view showing a playback screen displayed on the resistive film touch-panel display part 212 in a playback mode of either the digital camera 202 of Example 2 shown in FIG. 14 or the digital camera 402 of Example 4 shown in FIG. 20. FIG. 30(A) shows a case in which a playback image 502 is displayed in the entire screen, wherein the image is cut out and stored in a rectangle shape in order to edit the image. A rectangular region 510 is discerned, whose diagonal is a line joining the touch position 506 of the thumb of the right hand 504 and the touch position 508 of the index finger. This discernment, which is for avoiding mistaken operations, is made by ascertaining that the two-point touch positions do not change over a predetermined time duration (e.g., two seconds). In other words, in terms of an operation, the cut out portion can be indicated and stored by deliberately continuing to touch the two points at opposite corners of the rectangular region 510 with two fingers for a predetermined time duration. When the two points are discerned, the rectangular region 510 is cut out as in FIG. 30(B), and image data thereof is stored separately.

FIG. 31(A) and FIG. 31(B), similar to FIG. 30(A) and FIG. 30(B), is a screen view showing a playback image displayed on the resistive film touch-panel display part 212 in the playback mode of either the digital camera 202 of Example 2 shown in FIG. 14 or the digital camera 402 of Example 4 shown FIG. 20. The case of FIG. 31(A) shows an operation of cutting out part of a playback image 502 displayed on the entire screen into a circular shape for editing and storing this part, and first stored are the initial touch positions 512 and 514 of the thumb and index finger of the right hand 504. The result of sliding and rotating the right hand 512 within a predetermined time duration (e.g., two seconds) following the initial touch is that the movement situation of the thumb and index finger shown by the arrows 516 and 518 is sensed. In the example of FIG. 31(A), the right hand 504 is rotated clockwise, and as a result, the vertical gap between the two points decreases as shown by the arrows 520 and 522, and the horizontal distance between the two points enlarges as shown by the arrows 524 and 526. Thus, when the directions of change in the horizontal gap (the X-axis directional component) and the vertical gap (the Y-axis directional component) of the two points are sensed to be reversed, it is determined that the touching thumb and index finger are both drawing an arc and being rotated, and a circular region 528 whose diameter is formed by the initially stored touch position 512 of the thumb and touch position 514 of the index finger is discerned. The discerned circular region 528 is then cut out as in FIG. 31(B), and image data thereof is stored separately.

FIG. 32 is a flowchart showing step S176 along with the details of the playback mode of step S174 in either the flowchart of FIG. 16 relating to the action of the digital camera 202 of Example 2 or the flowchart of FIG. 24 relating to the action of the digital camera 402 of Example 4. When the flow starts, the most recently shot image is first displayed on the entire screen on the resistive film touch-panel display part 212 in step S352. Whether or not a slideshow operation has been performed is then checked in step S354. When this operation has not been performed, whether or not there is an image feeding operation is checked in step S356. When there is, step S358 proceeds, the image displayed on the entire screen is varied to the previous or following image according to the operation, and the sequence transitions to step S360. When there is no image feeding operation, the sequence transitions from step S356 directly to step S360.

In step S360, a check is made as to whether or not there has been an operation for performing a thumbnail display. When there has, the sequence transitions to the thumbnail display and selection process of step S362. This process first displays a tabulation of a plurality of image thumbnails, and selects one of these thumbnails in response to a feeding operation as necessary. When a thumbnail selection is performed, the sequence transitions to step S364, the selected image is displayed on the entire screen, and the sequence transitions to step S366. In the case that a thumbnail operation is not sensed in step S360, the sequence transitions directly to step S366. As described above, when the sequence arrives at step S366, a state will have been in effect in which one of the following is being performed: a full screen display of the most recently shot image by step S352, a full screen display of the image varied by image feeding in step S358, or a full screen display of the image displayed as a result of the thumbnail selection in step S364.

Step S366 checks whether or not a one-point touch is sensed in such a full screen display state of the image. When a one-point touch state is sensed, the sequence transitions to step S368, and a check is made as to whether or not a second point is touched and a two-point simultaneous touch state is sensed within a predetermined time duration after the sensing of the one-point touch. This predetermined time duration is set to an extremely short time duration (e.g., 0.5 seconds), the design is such that some amount of deviation is allowed within this predetermined time duration assuming the operator's intention is a two-point simultaneous touch, and this deviation is discerned as a two-point simultaneous touch. In other words, the objective of the setup of step S368 is to distinguish between the operator intentionally touching a second point after the first point touch, and the operator intending a two-point simultaneous touch. When a substantial two-point simultaneous touch is sensed in step S368, step S370 proceeds and the touch positions of the two points are stored.

Next, using the stored two point positions as a standard, a check is made in step S372 as to whether or not the positions of the two touched points have been preserved unchangingly for a subsequent predetermined time duration (e.g., two seconds) or longer. When there has been a change in the two point positions, step S374 proceeds, and a check is made as to whether or not the directions of change in the horizontal gap (the X-axis directional component) and the vertical gap (the Y-axis directional component) of the two points are reversed as a result of the change in the two-point touch positions. When the point-to-point gap X- and Y-axis component change directions are sensed to have reversed as a result of this check, step S376 proceeds, a rotation operation is assessed to have been enacted, and the sequence transitions to step S378. In step S378, a circular region is discerned whose diameter is formed by the two-point touch positions stored in step S370, an image of the discerned circular region is cut out and stored, and the sequence transitions to step S176. This is equivalent to the function shown in FIG. 31(A) and FIG. (B).

When it is ascertained in step S372 that with the stored two point positions as a standard, the positions of the two touched points have been preserved unchangingly for a subsequent predetermined time duration or longer, the sequence transitions to step S380, and a rectangular region is discerned whose diagonal is a line joining the two points stored in step S370. An image of the discerned rectangular region is cut out and stored, and the sequence transitions to step S176. This is equivalent to the function shown in FIG. 30(A) and FIG. (B).

Step S176 is a recitation of the a step of the flowchart of FIG. 16 or the flowchart of FIG. 24 in order to make the function of FIG. 32 easier to understand, wherein a check is made as to whether or not the shooting mode setting operation has been performed. In the case that this setting is not sensed, the flow returns to step S352 at the head of FIG. 32. When it is sensed in step S354 that the slideshow operation has been performed, the sequence transitions to the slideshow process of step S382, and a slideshow is executed. When the slideshow during the slideshow process is completed, step S352 is resumed. Steps S352 through S382 and step S176 are hereinbelow repeated as long as the playback mode ending operation (in other words, the shooting mode setting operation) is not sensed in step S176, and the device is adapted to various operations in the playback mode. When the shooting mode setting operation is sensed in step S176, the sequence transitions to step S168 in FIG. 16 or FIG. 24.

Figure 33:
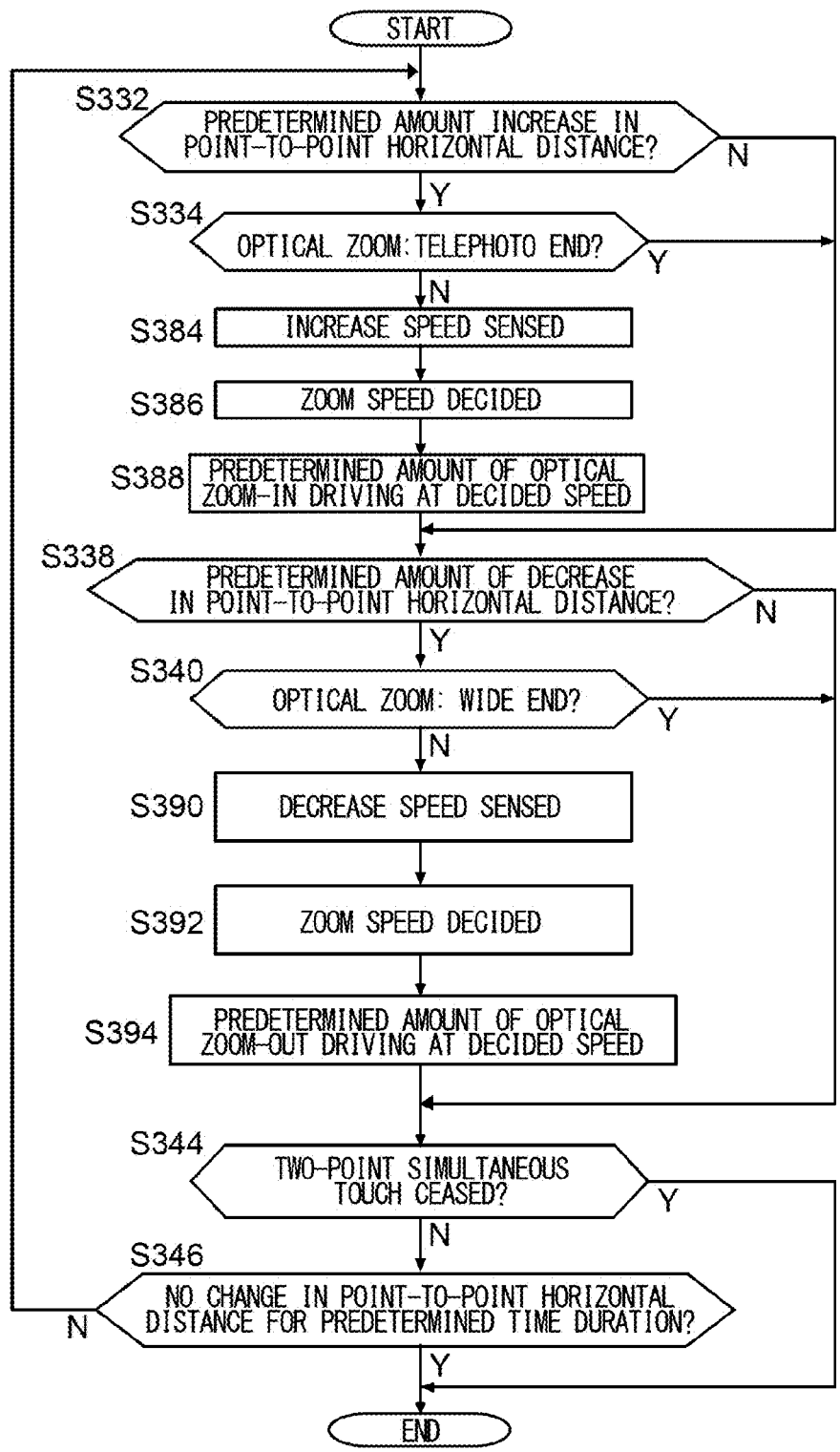
FIG. 33 A flowchart showing another example of the details of step S314 of the flowchart of FIG. 28 relating to Example 5.

FIG. 33 is a flowchart showing another example of the details of the video shooting zoom process in step S314 of the flowchart of FIG. 28 relating to Example 5. Since a large portion is common with the example shown in the flowchart of FIG. 29, common steps are denoted by common step numbers and are not described as long as it is not necessary. To explain the differences between FIGS. 29 and 33, in FIG. 29, a predetermined amount of driving of optical zooming in or out is performed in step S336 or step S342 respectively, but the speed is a predetermined speed. In the configuration of FIG. 33, on the other hand, when driving of optical zooming in and out is performed, the zoom speed is changed according to the rate of increase or the rate of decrease in the horizontal distance between the touch positions of the thumbs of both hands.

To be specific, in FIG. 33, in the case that the optical zoom is not sensed as being in the telephoto end in step S334, step S384 proceeds and the speed of the predetermined amount of increase in the point-to-point horizontal distance assessed in step S332. The zoom speed is then decided in step S386 based on the sensed increase speed. Next, in step S388, a predetermined amount of optical zoom-in driving is performed at the decided zoom speed. Similarly, in the case that the optical zoom is not sensed as being in the wide end in step S340, step S390 proceeds, and the speed is sensed of the predetermined amount of decrease in the point-to-point horizontal distance assessed in step S338. The zoom speed is then decided in step S392 based on the sensed decrease speed. Next, in step S394, a predetermined amount of optical zoom-out driving is performed at the decided zoom speed. Thus, zooming responsive to the movement speed of the fingers is performed in the example shown in the flowchart of FIG. 33

EXAMPLE 6

Figure 34:
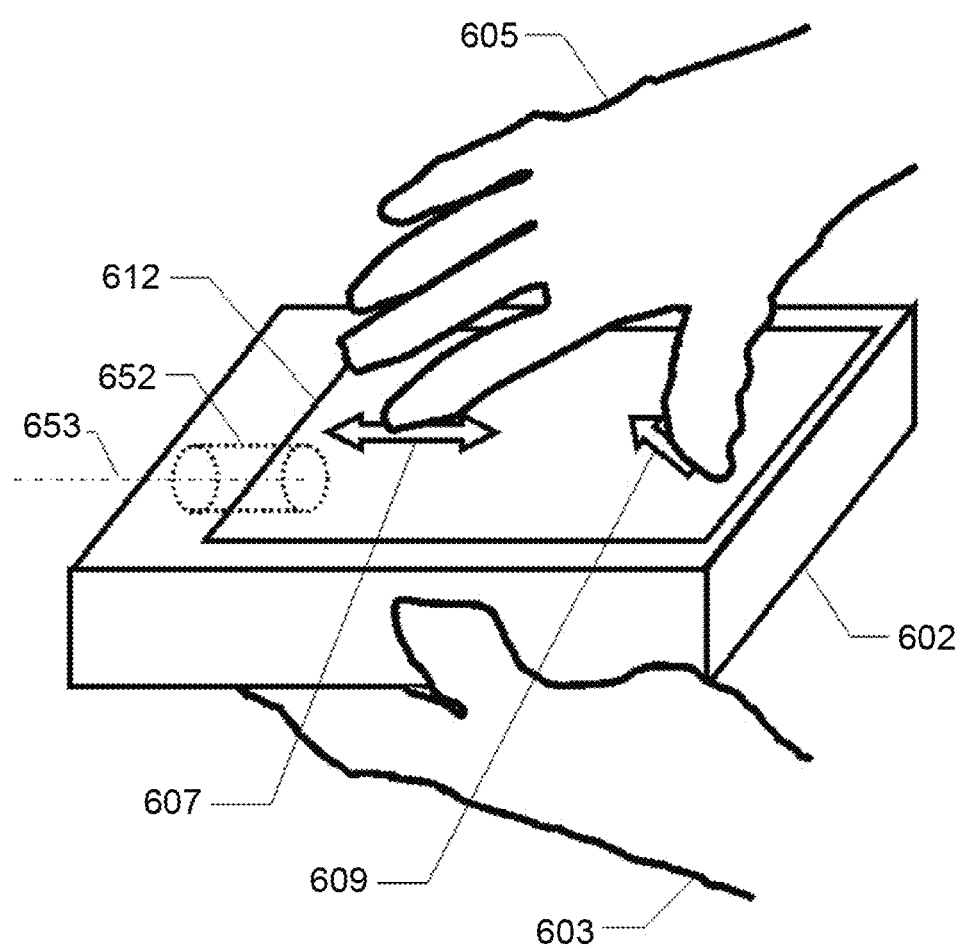
FIG. 34 An external perspective view showing Example 6 of the touch-panel input device according to an embodiment of the present invention (Example 6).

FIG. 34 is an external perspective view showing Example 6 of the touch-panel input device according to an embodiment of the present invention. Example 6 constitutes a digital camera 602, and the internal configuration thereof is common with Example 4 of FIG. 20. However, in the configuration of Example 4, the resistive film touch-panel display part 212 displays a subject image in a forward direction when the digital camera 402 is taken in front of the eyes with both hands, for example, as shown in FIGS. 21 and 22; while in the configuration of Example 6 of FIG. 34, when the digital camera 602 is taken in the left hand 603 at the position of the waist and looked down upon, for example, an optical axis 653 of a zoom lens optical system 652 faces toward the subject, and a subject image is displayed facing upward on a resistive film touch-panel display part 612 provided in parallel with the optical axis 653. In other words, Example 4 is configured as a camera having a so-called eye-level finder, whereas Example 6 is configured as a camera having a waist-level finder.

Operation of the digital camera 602 is performed by movement of a finger in a direction parallel with the optical axis 653 in order to prevent camera shake, i.e., by movement of a finger sliding over the resistive film touch-panel display part 612. As an example, the zoom operation is performed by sliding by a one-point touch of the index finger, for example, as shown by the arrow 607. Such a zoom operation is intuitively understood easily in terms of sliding in a direction parallel with the optical axis 653, such that zooming in is performed by pushing the index finger of the right hand 605 out forward along the arrow 607 (in a direction approaching the subject), and zooming out is performed by pulling the index finger backward along the arrow 607 (in a direction away from the subject), for example. A shutter release is performed by maintaining a still touch of the index finger and sliding the thumb in any desired direction such as in the arrow 609, for example. Such a shutter release by sliding the finger on a plane parallel with the optical axis 653 in particular has a great effect of preventing camera shake. Placing the optical axis 653 of the zoom lens optical system 652 to be parallel with the resistive film touch-panel display part 612 is also advantageous in terms of placing a comparatively long zoom lens optical system 652 in a thin digital camera 602.

In the digital camera 602, since the direction of gravitational acceleration is sensed by an acceleration sensor 472 such as the one shown in FIG. 20, portrait screen shooting and landscape screen shooting are sensed, which are unique to the waist-level finder. First, when the optical axis 653 is directed at an angle of 45 degrees or more above the horizon or 45 degrees or more below the horizon, this is assessed to be landscape screen shooting in which both the up-down direction of the resistive film touch-panel display part 612 and the optical axis direction 653 are considered to be the same. Upward-downward information is inverted whether the shooting is upward or downward. Cases when the optical axis 653 is within 45 degrees above or below the horizon are assessed in two different ways. Specifically, cases in which the optical axis 653 is within 45 degrees above or below the horizon and the resistive film touch-panel display part 612 is also within 45 degrees above or below the horizon (in other words, a normal waist-level shooting state such as is shown in FIG. 34) are assessed to be landscape screen shooting. In cases in which the optical axis 653 is within 45 degrees above or below the horizon and the resistive film touch-panel display part 612 is tilted 45 degrees or more relative to the horizon, it is assessed to be portrait screen shooting aiming at a subject to the left or right of the resistive film touch-panel display part 612. Upward-downward information is accordingly inverted by whether the shooting is leftward or rightward. These sensing results are recorded together with the image information.

Figure 35:
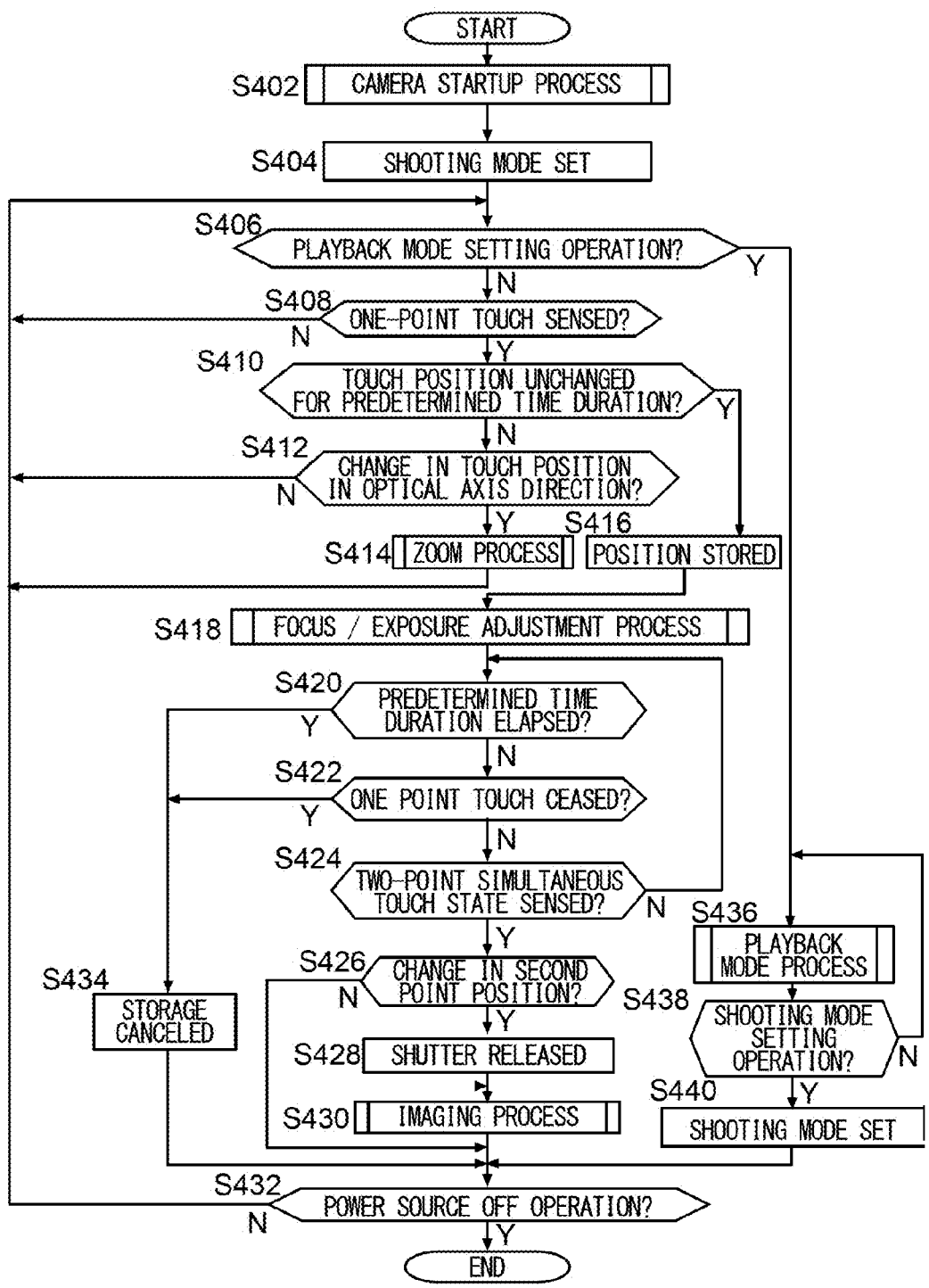
FIG. 35 A flowchart for describing the function of the controller in a case citing the configuration of FIG. 20 in Example 6.

FIG. 35 is a flowchart for describing the function of the controller 404 in a case citing the configuration of FIG. 20 in Example 6 described above. In a digital camera 604 of Example 6 as well, the flow of FIG. 35 starts when a power source on operation is performed, a startup process of the digital camera 602 is performed in step S402, a still image shooting mode is set as the initial state in step S404, and the sequence transitions to step S406. A check is made in step S406 as to whether or not a manual operation of a playback mode setting has been performed, and when there has been no operation, step S408 proceeds.

In step S408, whether or not a one-point touch is sensed is checked. When a one-point touch state is sensed, the sequence transitions to step S410, and whether or not the touch position has gone unchanged for a predetermined time duration is checked. When the touch position has changed within the predetermined time duration, step S412 proceeds, and a check is made as to whether or not the change in the touch position is in the optical axis direction of the zoom lens. When a change in the touch position in the optical axis direction is sensed, the sequence transitions to the zoom process of step S414. In this zoom process, when the change in the one-point touch position in the optical axis direction is in a direction approaching the subject, a zoom in is performed in response to the change speed and change amount, and conversely, when the change in the one-point touch position in a direction moving away from the subject, a zoom out is performed in response to the change speed and change amount. When either the touch has ceased or there is no change in the touch position for the predetermined time duration, the zoom process is ended and step S406 is resumed.

When a one-point touch is not sensed in step S408, step S406 is resumed. Furthermore, when the change in the touch position is not in the optical axis direction in step S412, it is deemed to be a mistaken operation in which the touch was unintended and step S406 is resumed. Steps S406 through S414 are hereinbelow repeated as long as the playback mode setting operation is not sensed, the one-point touch is sensed but its position is not sensed as unchanging for the predetermined time duration, and there is no change in the optical axis direction in the one-point touch position.

When the one-point touch position is sensed in step S410 as unchanging for the predetermined time duration, the sequence transitions to step S416, the position where the touch was sensed is stored, and the focus/exposure adjustment process of step S418 proceeds. The contents of this process are essentially the same as steps S154 and S156 of FIG. 16. When the focus/exposure adjustment process of step S418 ends, step S420 proceeds, and a check is made as to whether or not a predetermined time duration (e.g., two seconds) has elapsed following the sensing of the one-point touch in step S408.

When the predetermined time duration elapse is not sensed in step S420, step S422 proceeds and whether or not the one-point touch has ceased is checked. In the case that a one-point touch cessation is not sensed, step S424 proceeds and a check is made as to whether or not a two-point simultaneous touch state has occurred as a result of a second point being touched while the first point touch is continued. When a two-point simultaneous touch state is sensed in step S424, step S426 proceeds and a check is made as to whether or not the second point touch position has changed within a predetermined time duration (e.g., three seconds for waiting for an opportunity to take a picture). When a change in the second point touch position is sensed, step S428 proceeds, a shutter release is performed, and the sequence transitions to step S432 via the imaging process of step S430. The details of the imaging process of step S430 are explained hereinafter.

In the case that a two-point simultaneous touch state is not sensed in step S424, step S420 is resumed, and steps S420 through S424 are hereinbelow repeated pending a second point touch as long as the predetermined time duration does not elapse and the one-point touch is not ceased. When there is no change in the second point touch position within the predetermined time duration in step S426, execution of the shutter release is considered to be postponed and the sequence transitions to step S432. Thus, camera shake is prevented by executing a shutter release by the movement of the finger sliding of the resistive film touch-panel display part 612 parallel to the optical axis 653 according to step S426, and instances are prevented in which a shutter release is mistakenly executed in the instant when a second point touch is performed without the intention of a shutter release. In step S432, a check is made as to whether or not the power source off operation of the digital camera 602 has been performed. When the power source off operation is sensed, the flow is ended.

When a predetermined time duration elapse is sensed in step S420 or when a one-point touch cessation is sensed in step S422, the sequence transitions to step S434, storage of the one-point touch is canceled, and the sequence transitions to step S432. It is thereby possible to begin deciding a new first point touch position as is explained hereinafter.

When a playback mode setting operation is sensed in step S406, the sequence transitions to step S436 and a playback mode process is performed. The contents thereof are the same as in Example 2 or Example 4 in FIG. 32. In the playback mode process, similar to Example 2 or Example 4, the sequence periodically transitions to step S438 to check whether or not there has been a shooting mode setting operation, and when there has not, step S436 is resumed and the playback mode is continued. When the shooting mode setting operation is sensed in step S438, the shooting mode is set in step S440 and step S432 proceeds. As previously explained, the flow ends when the power source off operation is sensed in step S432, but in the case that the power source off operation is not sensed, step S406 is resumed. Steps S406 through S432 are hereinbelow repeated as long as the power source off operation is not sensed in step S432, and essentially the device is adapted to the various operations of the shooting mode as well as being adapted to the operation of transitioning to a suitable playback mode and the operation of returning to the shooting mode. This point is similar to Example 2 or Example 4.

Figure 36:
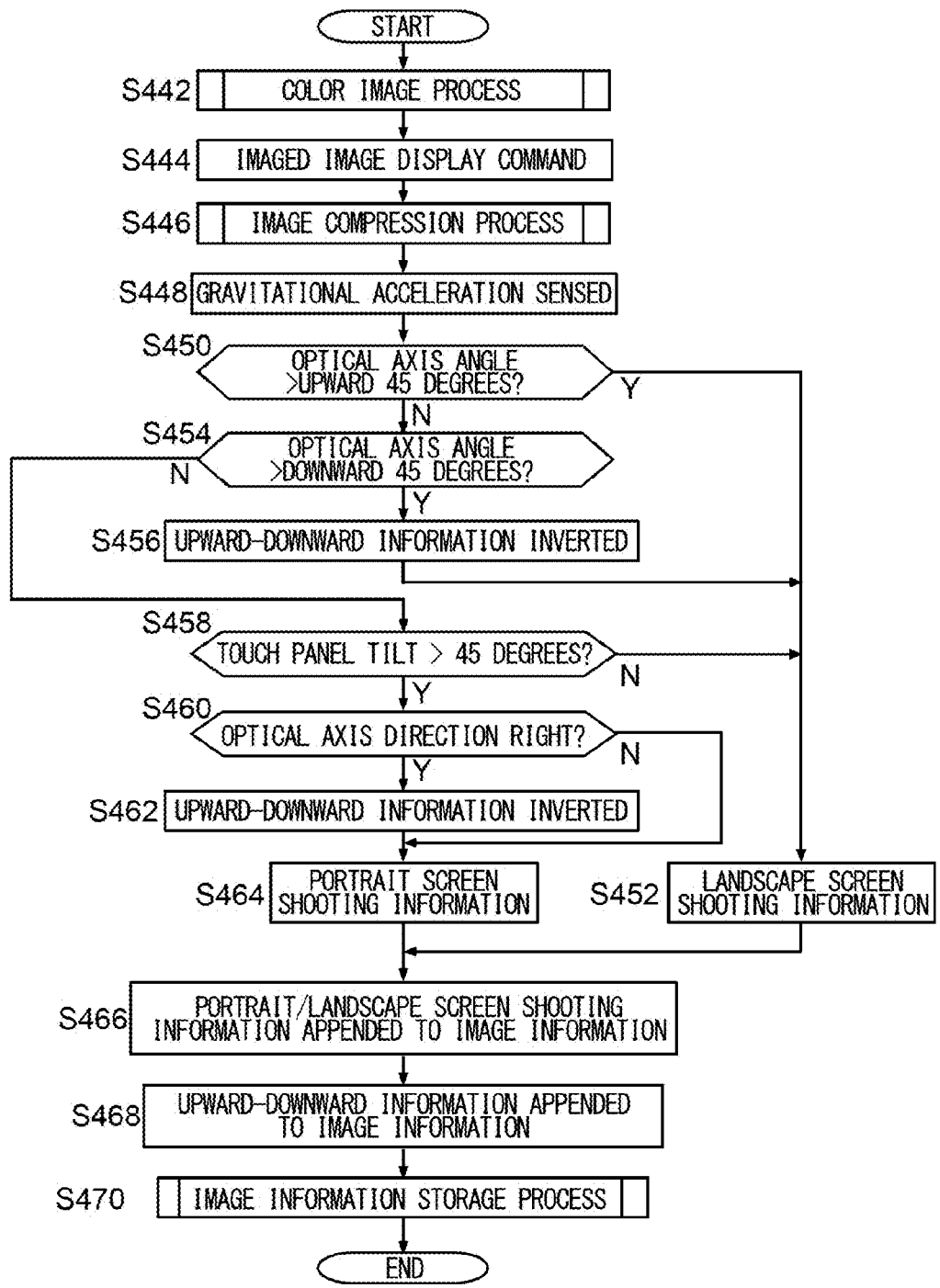
FIG. 36 A flowchart showing the details of step S340 of FIG. 35.

FIG. 36 is a flowchart showing the details of the shooting process in step S340 of FIG. 35. When the flow starts, a color image process is performed in step S442, the process including an interpolation process, a contour enhancement process, and the like. Next, in step S444, a process is performed for displaying the processed color image as a still image on the resistive film touch-panel display part 612 for a predetermined time duration, and the image compression process of step S446 proceeds. When image compression completes, step S448 proceeds ahead of the compressed image storage, and gravitational acceleration at the time of shooting is sensed by the acceleration sensor 472.

In step S450, a check is made as to whether or not the angle of the optical axis 653 at the time of shooting is tilted upward 45 degrees or more in relation to the horizon. When step S450 is affirmative, upward shooting is assessed to be in effect in which the side where the optic lens 652 is placed is the top side of the screen, and landscape screen shooting information is set in step S452. When step S450 is not affirmative, the sequence transitions to step S454, and a check is made as to whether or not the angle of the optical axis 653 at the time of shooting is tilted downward 45 degrees or more in relation to the horizon. In the case that this is affirmative, downward shooting is assessed to be in effect in which the side where the optic lens 652 is placed is the bottom side of the screen, and upward-downward information is inverted in step S456, after which the sequence transitions to step S452 and landscape screen shooting information is set.

In the case that neither of steps S450 and S454 are affirmative, shooting is thought to be normal wherein the optical axis 653 is nearly in a horizontal distance, the sequence transitions to step S458, and a current check is made as to whether or not the resistive film touch-panel display part 612 is tilted 45 degrees or more. When it is not, the resistive film touch-panel display part 612 is also nearly horizontal, the state is thought to be normal waist-level shooting in which the side where the optic lens 652 is placed is on the top side of the screen as shown in FIG. 34, the sequence therefore transitions to step S452, and landscape screen shooting information is set.

In the case that the resistive film touch-panel display part 612 is sensed in step S458 as being tilted 45 degrees or more, portrait screen shooting is assessed to be in effect in which the digital camera 602 is stood upright and aimed at a subject to the left or right of the resistive film touch-panel display part 612, and whether or not the optical axis direction is facing to the right is sensed in step S460. As is understood from FIG. 34, this is because when the digital camera 604 is stood upright with the optical axis 653 made to face to the left, portrait screen shooting goes into effect in which the right side of the optical axis 653 (the top in FIG. 34) is the top side of the screen, and when the digital camera 604 is stood upright with the optical axis 653 made to face to the right, portrait screen shooting goes into effect in which the left side of the optical axis 653 (the bottom in FIG. 34) is the top side of the screen. Based on the relationship above, when the optical axis direction is sensed as facing to the right in step S460, the upward-downward information is inverted in step S462, the sequence transitions to step S464, and portrait screen shooting information is set. When the optical axis direction is sensed as facing to the left (as not facing to the right in other words) in step S460, the sequence transitions to step S464 and portrait screen shooting information is set.

When the distinction between portrait screen shooting and landscape screen shooting and whether or not to invert the upward-downward information are decided in the above manner, step S466 proceeds, and information of the decided portrait screen shooting or landscape screen shooting is appended to the compressed image information obtained in step S446. Furthermore, in step S468, the decided upward-downward information is appended to the compressed image information in the same manner, a process is performed in step S470 for storing the compressed image with this appended information, and the flow is ended.

The above-described feature of appending information of the distinction between portrait screen shooting and landscape screen shooting and whether or not to invert the upward-downward information is not limited to application in the digital camera 602 such as that of Example 6 in which the optical axis 653 is fixed in place parallel with the resistive film touch-panel display part 612, and can also be applied to a digital camera capable of varying the relationship between the finder display screen and the optical axis as does an angle finder. In other words, portrait screen shooting and landscape screen shooting can be performed by rotating a 90-degree camera around the optical axis in the case of a camera in which the optical axis is fixed in place at a right angle to the finder display screen, but various shooting conditions arise in cases in which the optical axis is not at a right angle to the finder display screen, the feature of appending information of the distinction between portrait screen shooting and landscape screen shooting and whether or not to invert the upward-downward information is extremely beneficial. Furthermore, even in the case of a camera in which the optical axis is fixed in place at a right angle to the finder display screen, the camera is never taken any further upside-down in the case of landscape screen shooting, but since there are cases of the camera being rotated 90 degrees to the right and cases of it being rotated 90 degrees to the left when portrait screen shooting is performed, the feature of appending information of the distinction between portrait screen shooting and landscape screen shooting and whether or not to invert the upward-downward information is beneficial.

Hereinbelow is a summary of the technological features disclosed in the specification.

<First Technological Features>

The first technological features disclosed in the specification relate to the touch-panel input device. A problem the first technological features intend to solve is to provide a practical touch-panel input device in which a touch panel capable of multi-point sensing is put into practical application.

To solve this problem, the first technological features disclosed in the specification provide a touch-panel input device comprising a touch panel, and an input controller for sensing a two-point touch on the touch panel in either a two-point touch input sensing mode for a right hand suitable for the placement of right fingers or a two-point touch input sensing mode for a left hand suitable for the placement of left fingers, the input controller being capable of switching between the two input sensing modes. Reasonable two-point touch inputs are thereby possible which are suitable for both the placement of right fingers and the placement of left fingers.

According to a specific feature, the touch panel is configured as a touch-panel display screen having display and touch panel functions, and the touch panel is equipped with a display controller for providing the touch-panel display screen a left hand two-point touch input screen suitable for the placement of right fingers and a left hand two-point touch input screen suitable for the placement of left fingers, correspondingly with respect to the two-point touch input sensing mode for the right hand and the two-point touch input sensing mode for the left hand. GUI inputs by reasonable two-point touches are thereby possible which are suitable for both the placement of right fingers and the placement of left fingers.

According to another specific feature, the input controller performs input on the basis of the sensing of two points in which a line joining the two points has a left downward slant in the two-point touch input sensing mode for the right hand, and performs input on the basis of the sensing of two points in which a line joining the two points has a right-downward slant in the two-point touch input sensing mode for the left hand. This enables input by the right hand thumb and other fingers which have a high degree of freedom in movement, as well as input by the left hand thumb and other fingers.

According to another specific feature, the input controller switches between the two-point touch input sensing mode for the right hand and the two-point touch input sensing mode for the left hand on the basis of distinction information. The left and right two-point touch input sensing modes can thereby be switched automatically. According to another specific feature, the input controller designates whether the line joining the two sensed points has a left downward slant or a right downward slant as distinction information. The two-point touch information itself can thereby be distinction information, and separate distinction means need not be provided.

According to another specific feature, the input controller performs a different input on the basis of two-point sensing information in the two-point touch input sensing mode for the right hand and the two-point touch input sensing mode for the left hand. Thereby, in cases such as when the present invention is applied to a touch-panel input device installed in a vehicle navigation device, for example, a difference in input can be allowed between left-hand operations by the driver and right-hand operations by the passenger seat occupant, and dangerous operations by the driver can be prevented. According to another specific feature, the input controller inputs point-to-point relative position information on the basis of the two-point sensing information in either one of the two-point touch input sensing mode for the right hand and the two-point touch input sensing mode for the left hand, and inputs absolute position information of the two points in the other mode. It is thereby possible to appropriately differentiate the uses of relative position input which allows easier input and absolute position input which must be exact.

According to another feature, provided is a touch-panel input device comprising a touch-panel display screen having display and touch panel functions, a display controller for providing the touch-panel display screen with a right-hand two-point touch input screen suitable for the placement of right fingers and a left-hand two-point touch input screen suitable for the placement of left fingers, and a sensor for sensing two-point touches on the touch panel. GUI inputs by reasonable two-point touches are thereby possible which are suitable for both the placement of right fingers and the placement of left fingers.

According to a specific feature, the display controller provides the right-hand two-point touch input screen on the basis of the sensing of two points in which a line joining the two points sensed by the sensor has a left downward slant, and can automatically switch the input screen on the basis of the sensing of two points in which a line joining the two points sensed by the sensor has a right downward slant, wherein there is no need to provided separate distinction means or the like for switching the input screen.

According to another feature, provided is a touch-panel input device comprising a touch panel, a sensor for sensing a two-point touch on the touch panel, and a distinction part for distinguishing whether a line joining the two points sensed by the sensor has a left downward slant or a right downward slant. It is thereby possible to automatically distinguish whether the two-point touch is performed with the right hand or the left hand, for example.

According to a specific feature, the touch-panel input device is provided with an input controller for performing an input differing on the basis of the sensed two points according to whether the line joining the sensed two points has a left downward slant or a right downward slant, according to the distinction part. Different inputs can thereby be performed depending on whether it is a right-hand operation or a left-hand operation, for example. According to more specific feature, the input controller inputs point-to-point relative position information on the basis of the two-point sensing information in either one of the cases of the line joining the sensed two points having a left downward slant or a right downward slant, according to the distinction part, and the input controller inputs absolute position information of the two points in the other case. It is thereby possible to appropriately differentiate the uses of relative position input which allows easier input and absolute position input which must be exact. According to another more specific feature, the input controller prohibits a predetermined input in either one of the cases of the line joining the sensed two points having a left downward slant or a right downward slant, according to the distinction part. Inconvenient input operations can thereby be prevented according to conditions.

According to another specific feature, the touch panel is configured as a touch-panel display screen having display and touch panel functions, the touch-panel input device comprising a display controller for prohibiting a predetermined display in the touch-panel display screen in either one of the cases of the line joining the sensed two points having a left downward slant or a right downward slant, according to the distinction part. Inconvenient GUI input operations can thereby be prevented according to conditions.

As described above, according to the first technological features disclosed in the specification, it is possible to provide a practical touch-panel input device in which a touch panel capable of multi-point sensing is put into practical application.

<Second Technological Features>

The second technological features disclosed in the specification relate to a touch-panel input device. A problem the second technological features intend to solve is to provide a practical touch-panel input device in which a touch panel capable of multi-point sensing is put into practical application.

To solve this problem, the second technological features disclosed in the specification provide a touch-panel input device comprising a touch panel, a sensor for sensing a two-point simultaneous touch state on the touch panel, and an input controller for performing different inputs in accordance with the timing of the two-point touch of the sensor. It is thereby possible to prevent confusion in two-point touch operations and to enable inputs with simple operation sensations.

According to a specific feature, the input controller performs input of different functions in response to a first point touch and a second point touch in a two-point touch sensed by the sensor. It is thereby possible to continuously perform a different input by a second point touch continuing from the first point touch, and to continuously perform different inputs by continuous touches of different fingers, such as the thumb and index finger, for example.

According to another specific feature of the present invention, the input controller causes the inputs to differ in response to a time duration interval from the sensing of the first point touch until the sensing of the second point touch in a two-point touch sensed by the sensor. It is thereby possible to perform the desired input without confusion due to natural differences in the touch sensation. In cases in which the time duration interval from the sensing of the first point touch until the sensing of the second point touch is equal to or greater than a predetermined time duration, when input responding to the second point touch is prohibited, mistaken input caused by an accidental two-point touch can be prevented.

When the time duration interval from the sensing of the first point touch until the sensing of the second point touch is equal to or greater than a predetermined time duration and when the first point touch and the second point touch are inputted as associated with each other, for example, the intentionally performed two-point touch can be appropriately distinguished, and the desired input can be performed. Furthermore, when the time duration interval from the sensing of the first point touch until the sensing of the second point touch is equal to or greater than a predetermined time duration and when the configuration is designed so that inputs as one-point touch operations are executed, the uses of one-point operation inputs and two-point operation inputs can be differentiated with a natural operation sensation.

According to another feature, provided is a touch-panel input device comprising a touch panel, a sensor for sensing a two-point simultaneous touch state on the touch panel, and an input controller for performing inputs by the combination of the first point touch position and the second point touch position in a two-point touch sensed by the sensor. Input based on a combination of a plurality of elements is thereby made possible.

According to a specific feature, the touch panel is configured as a touch-panel display screen having display and touch panel functions, and a display controller is provided for displaying a touch standard position on the touch-panel display screen. Thereby, combination candidates are appropriately displayed and appropriate selections thereof are made by two-point touches.

According to another specific feature, the input controller performs a predetermined input in accordance with a change in the relative positions of the specified first point touch position and the specified second point touch position in the two-point touch sensed by the sensor. Indicating a combination by a two-point touch and executing input with the indicated combination are thereby made possible with a simple operation. According to a more specific feature, the input controller performs a predetermined input due to the specified second point touch position being dragged to the specified first point touch position in the two-point touch sensed by the sensor. Input with the combination indicated by the two-point touch is thereby performed in an easily understandable manner from a sensual aspect as well. A specific example of such an input is character input by a combination of consonant elements and vowel elements of characters.

According to another feature, provided is a touch-panel input device comprising a touch-panel display screen having display and touch panel functions, a display controller for placing touch standard positions of consonants of characters and touch standard positions of vowels of characters in the edge portions of the touch-panel display screen, a sensor for sensing the touch state on the touch-panel display screen, and an input controller for performing character inputs in accordance with the touch sensing by the sensor. It is thereby possible to input characters by a combination of fewer elements than direct indication of characters, and the center portion of the touch-panel display screen can be effectively put into practical application.

According to a specific feature, the display controller places a numeric keypad display in the center portion of the touch-panel display screen. Thus, the touch standard positions of consonants of characters and the touch standard positions of vowels of characters are placed in the edge portions of the touch-panel display screen and the numeric keypad display is placed in the center portion of the touch-panel display screen, thereby making varied and easy inputs possible utilizing the limited touch-panel display screen.

According to a more specific feature, the sensor performs numeral inputs by sensing a one-point touch state on the numeric keypad display of the touch-panel display screen. Thus, combinations of consonants and vowels of characters are indicated by two-point touches, touch standard positions are placed in the edge portions of the touch-panel display screen, and numerals are indicated by one-point touches on the numeric keypad display, whereby varied inputs can be performed easily. In relation to such differentiation of the uses of one-point touches and two-point touches, the various features described above can be used together as necessary.

As described above, according to the second technological features disclosed in the specification, it is possible to provide a practical touch-panel input device in which a touch panel capable of multi-point sensing is put into practical application.

<Third Technological Features>

The third technological features disclosed in the specification relate to a touch-panel input device. A problem the third technological features intend to solve is to provide a practical touch-panel input device in which a touch panel capable of multi-point sensing is put into practical application.

To solve this problem, the third technological features disclosed in the specification provide a touch-panel input device comprising a touch panel, a sensor for sensing a two-point simultaneous touch state on the touch panel, and an input controller which has a first input mode for inputting a relative relationship of the two points as information on the basis of the two-point touch positions sensed by the sensor, and a second input mode for inputting the absolute positions where the touches are sensed as information. Varied inputs according to input conditions are thereby made possible.

According to a specific feature, in the second input mode, the input controller inputs information on the basis of the absolute positions of the two points sensed by the sensor. It is thereby possible to differentiate the uses of the two-point touch information sensed by the sensor as relative relationship information and respective absolute position information, in accordance with the respective objectives. Since the information is the relative positions in the first input mode, for example, the same input can be performed when the relative information is the same no matter what portion of the touch panel is touched and inputs that do not need the individual touch positions to be exact can therefore be made; and in the second input mode, according to the absolute position information of the two points, it is possible to input two-dimensional absolute position information, such as that of a region on the touch panel indicated based on the absolute positions of the two points, for example.

According to another specific feature, the input controller inputs information on the basis of relative changes in the two-point touch positions sensed by the sensor in the first input mode. According to a more specific feature, in the first input mode, the input controller can input two types of information regardless of the absolute positions on the touch panel, on the basis of whether the two-point touch positions sensed by the sensor are moving apart or moving toward each other.

According to another specific feature, in the first input mode, the input controller inputs information on the basis of the relative gap between the two-point touch positions sensed by the sensor. According to a more specific feature, in the first input mode, the input controller can input two types of information regardless of the absolute positions on the touch panel, on the basis of whether the relative gap between the two-point touch positions sensed by the sensor is greater than or less than a predetermined gap.

According to another specific feature, the touch panel is configured as a touch-panel display screen having display and touch panel functions. As a preferred example of this configuration, when the touch panel is configured as display and input means of an automobile navigation device installed in a vehicle, the first input mode can be used for inputting information during travel and the second input mode can be put into practical application for inputting information when the vehicle is stopped. As another preferred example of an instance when the touch panel is configured as display and input means of an automobile navigation device installed in a vehicle, the first input mode can be used for the driver to input information and the second input mode can be put into practical application for a passenger to input information. In either case, the first input mode is preferred as input for preventing danger, and the second input mode is preferred as input for large amounts of information.

According to another feature, provided is a touch-panel input device comprising a touch panel, a sensor for sensing a two-point simultaneous touch state on the touch panel, and an input controller for inputting information on the basis of the relative gap between the two-point touch positions sensed by the sensor. Input is thereby possible even when the relative information is the same, regardless of the absolute positions of the touches on the touch panel. According to a more specific feature, the input controller can input two types of information on the basis of whether the relative gap between the two-point touch positions sensed by the sensor is greater than or less than a predetermined gap, regardless of the absolute positions on the touch panel.

According to a specific feature, the input controller inputs information on the basis of parallel movement of the two-point touch positions sensed by the sensor. It is thereby possible to reliably input two-stage information by a simple movement regardless of the absolute positions on the touch panel.

According to another feature, provided is a touch-panel input device comprising a touch panel, a sensor for sensing a two-point simultaneous touch state on the touch panel, and an input controller for inputting information on the basis of parallel movement of the two-point touch positions sensed by the sensor. Inputs that have a simple operation and that are not susceptible to mistaken operations are thereby made possible. According to a specific feature, the input controller inputs information on the basis of the movement amount of the parallel movement of the two-point touch positions sensed by the sensor. According to another specific feature, the input controller inputs information on the basis of the movement speed of the parallel movement of the two-point touch positions sensed by the sensor. These specific configurations are capable of actualizing operations that are simple and that coincide with human sensation, and are therefore preferred for performing inputs of abundant information.

According to another feature, provided is a touch-panel input device comprising a touch panel, a sensor for sensing a two-point simultaneous touch state on the touch panel, and an input controller which has a first mode for inputting information on the basis of a one-point touch position sensed by the sensor and a second mode for inputting information on the basis of two-point touch positions sensed by the sensor. It is thereby possible to perform inputs according to various conditions while taking into consideration the ease of input and the amount of input information.

According to a specific feature, the touch panel is configured as display and input means of an automobile navigation device installed in a vehicle, the first mode is put into practical application for inputting information during travel, and the second mode is put into practical application for inputting information when the vehicle has stopped. According to another specific feather of an instance when the touch panel is configured as display and input means of an automobile navigation device installed in a vehicle, the first mode is put into practical application for the driver to input information, and the second mode is put into practical application for a passenger to input information. In either case, the first mode is preferred as input for preventing danger, and the second mode is preferred as input for large amounts of information.

As described above, according to the third technological features disclosed in the specification, it is possible to provide a practical touch-panel input device in which a touch panel capable of multi-point sensing is put into practical application.

<Fourth Technological Features>

The fourth technological features disclosed in the specification relate to a digital camera. A problem the fourth technological features intend to solve is to provide a practical digital camera which is easily operated.

To solve the problem above, the fourth technological features disclosed in the specification provide a digital camera comprising a touch-panel display screen having display and touch panel functions, a zoom lens, an imaging part for imaging an optical image by the zoom lens and obtaining a digital image, a display controller for displaying the digital image obtained by the imaging part on the touch-panel display screen, a touch position sensor for sensing a two-point simultaneous touch state on the touch-panel display screen, and a zoom controller for driving the zoom lens on the basis of the two-point touch positions sensed by the touch position sensor. An easy zoom operation by a touch operation is thereby made possible.

According to a specific feature, the zoom controller drives the zoom lens on the basis of a relative gap between the two-point touch positions sensed by the touch position sensor. An easy zoom operation that does not rely on the absolute positions of the touches is thereby made possible. According to a more specific feature, the zoom controller drives the zoom lens on the basis of a relative gap in a horizontal direction between the two-point touch positions sensed by the touch position sensor. It is thereby possible to perform a zoom operation or the like with the thumbs of both hands holding the digital camera, for example.

According to another specific feature, a gravity direction sensor is included, and the zoom controller assesses the relative gap in the horizontal direction between the two-point touch positions sensed by the touch position sensor on the basis of the sensing of the gravity direction sensor. It is thereby possible to perform a zoom operation or the like by the same operation of the thumbs of both hands holding the digital camera, both when the digital camera having a rectangular screen is taken in both hands in a landscape shooting state and when it is taken in both hands in a portrait shooting state.

According to another specific feature, the zoom controller decides the zoom amount on the basis of the relative gap between the two-point touch positions sensed by the touch position sensor. A zoom objective ratio can thereby be set easily. According to another specific feature, the zoom controller sets the zoom direction on the basis of a change in the relative gap between the two-point touch positions sensed by the touch position sensor. Zooming in and zooming out can thereby be performed easily in orientations such as the digital camera being held in both hands. According to another specific feature, the zoom controller decides the zoom amount on the basis of the amount of change in the relative gap or the speed of change in the relative gap between the two-point touch positions sensed by the touch position sensor. The zoom amount can thereby be decided easily from a sensual aspect as well.

According to another specific feature, the zoom controller drives the zoom lens following a change in the relative gap between the two-point touch positions sensed by the touch position sensor. A zoom operation that follows the movement of the fingers touching the screen is thereby made possible, and zoom operation means preferred for zooming during video shooting can be provided, for example.

According to another specific feature, the zoom controller distinguishes a two-point simultaneous touch as a zoom operation on the basis of the sensing elapse until a two-point simultaneous touch state from a one-point touch sensed by the touch-panel display screen. It is thereby possible to easily perform a zoom operation with a normal interval operation based on the intention of a simultaneous touch, even when the two points cannot be touched exactly simultaneously and there is some amount of deviation.

According to another specific feature, the zoom controller distinguishes whether the realization of the two-point simultaneous touch state is a zoom operation or a shutter release operation on the basis of the sensing elapse until a two-point simultaneous touch state from a one-point touch sensed by the touch-panel display screen. An example of a difference of this sensing elapse is a difference of the time duration interval from the one-point touch until the two-point touch state, for example, and such a difference makes it possible to distinguish between a zoom operation in which a two-point simultaneous touch was intended and a shutter release operation by a second point touch intentionally performed subsequently while the first point touch is continued.

According to another feature, there is provided a digital camera comprising a touch-panel display screen having display and touch panel functions, a lens, an imaging part for imaging an optical image by the lens and obtaining a digital image, a display controller for displaying the digital image obtained by the imaging part on the touch-panel display screen, a touch position sensor for sensing a two-point simultaneous touch state on the touch-panel display screen, an image storage part, and an imaging controller for storing the image of the imaging part in the image storage part on the basis of the two-point simultaneous touch state sensed by the touch position sensor. The intended imaging can thereby be performed by a touch panel operation. For example, the imaging controller can discern that the one-point touch sensed by the touch position sensor indicates the subject portion and can store the image acquired by the imaging part by the sensing of the two-point simultaneous touch state in the image storage part.

According to another feature, there is provided a digital camera comprising a touch-panel display screen having display and touch panel functions, a zoom lens, an imaging part for imaging an optical image by the zoom lens and obtaining a digital image, an electronic zoom processor for enlarging part of the image obtained by the imaging part, a display controller for displaying the digital image obtained by the electronic zoom processor on the touch-panel display screen, a touch position sensor for sensing a touch state on the touch-panel display screen, and a zoom controller for controlling the zoom lens and the electronic zoom processor on the basis of the sensing of the touch position sensor. Zoom operations can thereby be easily performed from the touch-panel display screen in a display controller capable of both optical zooming and electronic zooming. According to a specific feature, when the zoom controller controls the electronic zoom processor on the basis of the sensing of the touch position sensor, the zoom speed at the end of zooming is reduced.

According to another feature, there is provided a digital camera comprising a display screen, a zoom lens, an imaging part for imaging an optical image by the zoom lens and obtaining a digital image, an electronic zoom processor for enlarging part of the image obtained by the imaging part, a display controller for displaying the digital image processed by the electronic zoom processor on the display screen, and a zoom controller for controlling the zoom lens and the electronic zoom processor and reducing the zoom speed at the end of electronic zooming when the electronic zoom processor is controlled. This makes zoom control possible in which there is no difference in sensation between electronic zooming and optical control. According to a specific feature, the zoom controller does not perform zoom speed reduction at the end of electronic zooming in cases in which the zoom lens is controlled in continuation with the control of the electronic zoom processor. The difference in sensation at the end of zooming between electronic zooming and optical zooming can thereby be diminished and the transition when optical zooming continues into electronic zooming can thereby be performed smoothly.

As described above, according to the fourth technological features disclosed in the specification, an easily operated digital camera can be provided.

<Fifth Technological Features>

The fifth technological features disclosed in the specification relate to a digital camera. A problem the fifth technological features intend to solve is to provide an easily operated digital camera.

To solve the above problem, the fifth technological features disclosed in the specification provide a digital camera comprising a zoom lens, a touch-panel display screen having display and touch panel functions parallel with an optical axis of the zoom lens, an imaging part for imaging an optical image by the zoom lens and obtaining a digital image, a display controller for displaying a digital image obtained by the imaging part on the touch-panel display screen, a touch position sensor for sensing a touch state on the touch-panel display screen, and a controller for performing control based on a touch position sensed by the touch position sensor. Due to such a placement in which the touch-panel display screen is parallel with the optical zoom of the zoom lens, a zoom lens requiring the adequate total optical system length can be housed in a thin digital camera body.

According to a specific feature, the controller controls the driving of the zoom lens when the touch position sensor has sensed sliding of the touch position on the touch-panel display screen. The placement of the touch-panel display screen parallel with the optical axis of the zoom lens makes it possible for the drive operation of the zoom lens to be performed by a movement on a surface parallel with the optical axis of the zoom lens, and also makes it possible to avoid camera shake caused by a movement operation in a direction perpendicular to the optical axis. According to a more specific feature, the controller controls the driving of the zoom lens when the touch position sensor has sensed sliding of the touch position in a direction parallel with the zoom lens. According to another specific feature, the controller causes the zoom lens to perform zooming in when the touch position sensor has sensed movement of the touch position forward in parallel with the optical axis of the zoom lens, and causes the zoom lens to perform zooming out when the touch position sensor has sensed movement of the touch position rearward in parallel with the optical axis. These features make zoom operations possible that are easily understood intuitively.

According to another specific feature, the controller causes a shutter release to be performed based on sensing of a two-point simultaneous touch state by the touch position sensor. Mistaken operations can thereby be avoided and a shutter release operation can be performed within a natural flow. According to a more specific feature, the controller causes a shutter release to be performed when the touch position sensor has sensed the movement of at least one touch in a two-point simultaneous touch state. The possibility of a mistaken operation can thereby be reduced, and due to the shutter release by a movement on a surface parallel with the optical axis of the zoom lens, it is possible to avoid camera shake during a shutter release performed by a movement operation in a direction perpendicular to the optical axis.

According to another feature, provided is a digital camera comprising a zoom lens, a touch-panel display screen having display and touch panel functions, an imaging part for imaging an optical image by the zoom lens and obtaining a digital image, a display controller for displaying a digital image obtained by the imaging part on the touch-panel display screen, a touch position sensor for sensing a touch state on the touch-panel display screen, and a controller for performing a predetermined control on the basis of the sensing of sliding of the touch position by the touch position sensor. Such operations based on the sensing of sliding of the touch position are more beneficial in terms of preventing camera shake and preventing mistaken operations than operations at the time point of a touch that causes impact perpendicular to the touch-panel display screen.

According to a specific feature, the controller controls the driving of the zoom lens when the touch position sensor has sensed sliding of the touch position on the touch-panel display screen. More specifically, the controller controls the driving of the zoom lens when the touch position sensor has sensed sliding of the touch position in a direction parallel with the optical axis of the zoom lens. Zoom operations are thereby made possible that are easily understood intuitively. According to a more specific feature, the controller causes a shutter release to be performed when the touch position sensor has sensed sliding of the touch position on the touch-panel display screen. The possibility of mistaken operations can thereby be reduced, and the possibility of camera shake can be reduced by a shutter release caused by movement of a finger on the touch-panel display screen.

According to another feature, there is provided a digital camera comprising an imaging optical system, a display screen, an imaging part for imaging an optical image by the imaging optical system and obtaining a digital image, a display controller for displaying a digital image obtained by the imaging part on the touch-panel display screen, a gravity sensor, a storage part for storing the digital image obtained by the imaging part, and a storage controller for appending information relating to the optical axis direction of the imaging optical system sensed by the gravity sensor to the digital image and storing the image with the information in the storage part. Due to the information of the shooting direction of the digital camera being appended to the digital image and stored, the information can be beneficial when the digital image is viewed.

According to a specific feature, the digital camera further comprises a storage controller for appending information relating to the directivity of the display screen sensed by the gravity sensor to the digital image and storing the image with the information in the storage part. Thereby, particularly when the optical axis is nearly horizontal, angle information of the display screen around the optical axis can be made into information of benefit when the digital image is viewed by combining information of the optical axis direction and the information of the display screen directivity in such a state.

More specifically, the storage controller appends information relating to the optical axis direction of the imaging optical system and the display screen directivity sensed by the gravity sensor to a digital image as either landscape screen shooting information or portrait screen shooting information. It is thereby possible, when the digital image is played back in a digital photo frame, for example, to automatically play back the information image in an erect state during both landscape screen shooting and portrait screen shooting.

According to another specific feature, the storage controller appends information relating to the optical axis direction of the imaging optical system sensed by the gravity sensor to a digital image as upward-downward information of the image. It is thereby possible, when the digital image is played back in a digital photo frame, for example, to automatically play back the information image in an erect state particularly when portrait screen shooting is performed, whether it be shooting with the digital camera tilted 90 degrees to the right from the normal landscape screen shooting state or shooting with the digital camera tilted 90 degrees to the left.

According to a more specific feature, the optical axis of the imaging optical system is configured so as to be parallel with the display screen. Such a configuration is suitable for "waist-level" shooting, but shooting with differentiation between landscape screen shooting and portrait screen shooting is not possible as long as the display screen is performing shooting in a nearly horizontal state. When landscape screen shooting has been performed with the display screen in a nearly horizontal state, for example, there is a need for the display screen to be tilted in a nearly vertical state in order to perform portrait screen shooting. Consequently, information relating to the optical axis direction according to the gravitational acceleration sensor and information relating to the display screen directivity are beneficial as information indicating the erect directions of the digital images shot in these various conditions.

As described above, according to the first technological features disclosed in the specification, an easily operated digital camera can be provided.

<Sixth Technological Features>

The sixth technological features disclosed in the specification relate to a touch-panel input device capable of two-point sensing. A problem the sixth technological features intend to solve is to provide a practical touch-panel input device in which a touch panel capable of two-point sensing is put into practical application.

To solve the above problem, the sixth technological features disclosed in the specification provide a touch-panel input device capable of two-point sensing comprising a touch-panel display screen having display and touch panel functions, and an input controller for performing information input on the basis of a relative position relationship of a first direction component of the positions of the two points touched simultaneously on the touch-panel display screen, a relative position relationship of a second direction component different from the first direction component, and time duration information relating to the touches of the two points. This enables information input that yields the two-point sensing capability. According to a specific feature, the touch-panel display screen has a rectangular shape, the first direction component is a direction parallel with one edge of the rectangular shape, and the second direction component is a direction parallel with another edge perpendicular to the first edge.

According to another specific feature, the input controller performs input control on the basis of the relative size relationship of either the first direction component or the second direction component of the two points at the same time instant. This enables input based on the up-down relationship or the left-right relationship of the two points, for example, and also enables input that does not rely on the exact absolute positions of the two points because these relationships are relative.

According to another specific feature, the input controller performs input control on the basis of the point-to-point relative distance at the same time instant. This enables input based on the distance of the two points that does not depend on direction, and also enables input that does not rely on the exact absolute positions of the two points because the relative distance is information.

According to a more specific feature, the input of the input controller based on the either the first direction component or second direction component of the two points or the point-to-point relative distance at the same time instant is confirmed when the positions of the two points do not change for a predetermined time duration. It is thereby possible to prevent unforeseen input when two points are mistakenly touched, and to perform input when the touch positions of the two points are intentionally maintained without moving for a predetermined time duration.

According to another feature, the input controller performs input based on the absolute positions of the two points and changes in the relative positions of the two points that occur with the elapse of a time duration from the absolute positions, and also based on a combination of the absolute positions of the two points. It is thereby possible to reliably create a combination of the absolute positions of the two points that decides the input information, and to reliably execute the input thereof. According to a more specific feature, the input controller when the second point position changes with the first point as a fulcrum, the input controller senses this as a change in the relative positions of the two points that occurs with the elapse of the time duration.

According to another feature, the input controller performs input control based on a two-point touch when the two-point touch is sensed with a predetermined time duration, and also performs input control different from the input control based on the two-point touch when the time duration in which the second point touch is sensed exceeds a predetermined time duration following the sensing of the first point touch. It is thereby possible to perform input based on the two-point touch even when the two points are not touched exactly simultaneously, and to perform input separate from the two-point simultaneous touch with the first point touch and the second point touch. More specifically, the input controller performs input control different from the input control of the first point touch on the basis of the second point touch when the time duration in which the second point touch is sensed exceeds a predetermined time duration following the sensing of the first point touch. Mistaken operations can be eliminated and inputs better conforming to the intent of the operator can be performed when a predetermined time duration deemed as a two-point touch and a predetermined time duration for performing a separate input from the first point touch with the second point touch are set so as to be different.

According to another feature of the present invention, the input controller performs input control based on a two-point touch on the basis of the sensing of parallel movement of the two points that occurs with elapse of a time duration. Input by a two-point operation can thereby be performed in a state in which the load of the operation is not borne by the hand. According to a more specific feature, the input controller performed input control based on a two-point touch on the basis of the relative positions of the two points at the same time instant and the sensing of parallel movement that occurs with the elapse of a time duration. The two-point relative position information which decides the input information and execution of the input can thereby be performed reliably.

According to another feature, the input controller performs input control on the basis of a change in the relative relationship of either a first component or a second component of the two points that occurs with the elapse of a time duration. It is thereby possible to perform input easily due to the change in the relative relationship in either the one-dimensional first direction component or the second direction component even when the two-dimensional positions of the two points are not exact.

According to another feature, the input controller performs input control on the basis of the direction of change in the relative relationship of the first direction component of the two points that occurs with the elapse of a time duration and the direction of change in the relative relationship of the second direction component of the two points that occurs with the elapse of a time duration being reversed. It is thereby possible to perform input by an action of twisting the touch positions of the two points.

As a more specific example of the sensing of a twisting action of the touch positions of the two points described above, the input controller performs circular input control when the direction of change in the relative relationship of the first direction component of the two points that occurs with the elapse of a time duration and the direction of change in the relative relationship of the second direction component of the two points that occurs with the elapse of a time duration are reversed. It is thereby possible to perform a circular input by a natural action of drawing an arc with two fingers. According to another specific feature, the input controller uses the relative distance between the two points touched at a predetermined time point as a diameter of a circle. It is thereby possible, after the diameter has been established by first touching two points, for example, to input a circle by drawing a much shorter circle. This is a far more efficient and easier input means than drawing and inputting a circle with one finger.

As described above, according to the sixth technological features disclosed in the specification, it is possible to provide a touch-panel input device in which various useful information inputs are possible and operations are intuitive and easy.

INDUSTRIAL APPLICABILITY

The present invention can be applied to a touch-panel input device installed in an automobile navigation device of a vehicle, or a touch-panel input device installed in a digital camera or the like (for example, a touch-panel input device for performing a zoom operation or the like of a digital camera), for example. The present invention can also be applied to a digital camera or the like having a touch-panel input device.

LIST OF REFERENCE SIGNS

12 Touch panel
4, 204, 404 Input controller
12, 212 Touch panel (touch-panel display screen)
4, 10, 204, 210, 404 Display controller
4, 204 Sensor
4 Distinguishing part
64 Consonant of character
66 Vowel of character
76 Numeric keypad button
2 Automobile navigation device
470, 404 Zoom controller
472 Gravity direction sensor
258 Image storage part
204, 404 Imaging controller
256, 404 Electronic zoom processor
252, 452, 652 Lens (zoom lens)
653 Optical axis
612 Touch-panel display screen
254 Imaging part
404, 210 Display controller
212, 404 Touch position sensor
404 Controller
472 Gravity direction sensor
258 Storage part
404 Storage controller
252, 452, 652 Imaging optical system
212, 612 Display screen

The invention claimed is:

1. A digital camera comprising:
an optical system configured to capture an image;
an imaging part configured to take an image captured by the optical system;
a touch panel display screen having display and touch panel functions;
a display controller configure to provide the touch panel screen with a display image based on the imaging part;
an input controller for sensing a point of touch by a finger on the touch panel screen; and
a capture controller configured to have the imaging part take the image in response to the input controller sensing a predetermined slide of the point of touch on the touch panel screen caused by change in the point of touch by the finger without lifting the finger off the touch panel screen.

2. The digital camera according to claim 1, wherein the capture controller is configured to have the imaging part take the image in response to the input controller sensing the predetermined slide of the point of touch on the touch panel screen with the input controller simultaneously sensing another point of touch on the touch panel screen.

3. The digital camera according to claim 1 further comprising a drive controller configured to adjust movement of the optical system in response to the input controller sensing a predetermined slide of the point of touch on the touch panel screen.

4. The digital camera according to claim 3, wherein the drive controller is configured to adjust focusing movement of the optical system.

5. The digital camera according to claim 3, wherein the drive controller is configured to adjust zooming movement of the optical system.

6. The digital camera according to claim 3, wherein the drive controller is configured to adjust the movement of the optical system in response to the input controller sensing relative slides of a pair of points of touch on the touch panel screen.

7. The digital camera according to claim 6, wherein the drive controller is configured to adjust the movement of the optical system in response to the input controller sensing a slide of a point of touch of a right thumb on the touch panel screen from one side thereof relative to a point of touch of a left thumb on the touch panel screen from the other side thereof.

8. The digital camera according to claim 1, wherein an optical axis of the optical system is parallel to a surface of the touch panel display screen.

9. A digital camera comprising:
an optical system configured to capture an image;
an imaging part configured to take an image captured by the optical system;
a touch panel display screen having display and touch panel functions;
a display controller configure to provide the touch panel screen with a display image based on the imaging part;
an input controller for sensing a point of touch by a finger on the touch panel screen; and
a drive controller configured to adjust movement of the optical system in response to the input controller sensing a predetermined slide of the point of touch on the touch panel screen caused by change in the point of touch by the finger without lifting the finger off the touch panel screen, wherein the drive controller is configured to adjust focusing movement of the optical system.

10. The digital camera according to claim 9 wherein the drive controller is configured to adjust zooming movement of the optical system.

11. The digital camera according to claim 9, wherein the drive controller is configured to adjust the movement of the optical system in response to the input controller sensing relative slides of a pair of points of touch on the touch panel screen.

12. The digital camera according to claim 11, wherein the drive controller is configured to adjust the movement of the optical system in response to the input controller sensing a slide of a point of touch of a right thumb on the touch panel screen from one side thereof relative to a point of touch of a left thumb on the touch panel screen from the other side thereof.

* * * * *